United States Patent [19]

Zeuner et al.

[11] Patent Number: 5,359,836
[45] Date of Patent: Nov. 1, 1994

[54] AGRICULTURAL HARVESTER WITH CLOSED LOOP HEADER CONTROL

[75] Inventors: Kenneth W. Zeuner, New Hope; Thomas A. Chmielewski, Jr.; Mark K. Torbett, both of Langhorne; Carl E. Bohman; Charles P. Heisig, both of New Holland, all of Pa.

[73] Assignee: Control Concepts, Inc., Newtown, Pa.

[21] Appl. No.: 12,000

[22] Filed: Feb. 1, 1993

[51] Int. Cl.$^5$ ............................................. A01D 75/28
[52] U.S. Cl. ................................... 56/10.2 E; 56/208
[58] Field of Search .......... 56/10.2 D, 10.2 E, 10.2 F, 56/208

[56] References Cited

U.S. PATENT DOCUMENTS

| | | | |
|---|---|---|---|
| 3,980,002 | 9/1976 | Jarman et al. | 91/461 |
| 4,126,293 | 11/1978 | Zeuner et al. | 251/30 |
| 4,136,508 | 1/1979 | Coleman et al. | 56/10.2 E |
| 4,204,383 | 5/1980 | Milliken, Jr. | 56/10.2 |
| 4,211,057 | 7/1980 | Dougherty et al. | 56/10.2 |
| 4,227,363 | 10/1980 | Kerber et al. | 56/10.2 |
| 4,332,126 | 6/1982 | Van Auwelaer et al. | 56/10.2 |
| 4,401,009 | 8/1983 | Zeuner et al. | 91/28 |
| 4,541,229 | 9/1985 | Elijah | 56/10.2 |
| 4,573,308 | 3/1986 | Ehrecke et al. | 56/14.4 |
| 4,594,840 | 6/1986 | D'Almeida et al. | 56/11.2 |
| 4,598,718 | 7/1986 | Glaubitz et al. | 56/209 |
| 4,612,757 | 9/1986 | Halls et al. | 56/10.2 |
| 4,622,803 | 11/1986 | Lech | 56/10.2 E |
| 4,641,490 | 2/1987 | Wynn et al. | 56/10.2 |
| 4,651,118 | 3/1987 | Zeuner et al. | 335/258 |
| 4,663,921 | 5/1987 | Hagstrom et al. | 56/14.6 |
| 4,736,753 | 4/1988 | Glaubitz et al. | 56/209 |
| 4,776,153 | 10/1988 | DePauw et al. | 56/10.2 |
| 4,942,724 | 7/1990 | Diekhans et al. | 56/10.4 |

FOREIGN PATENT DOCUMENTS

0502411A2 9/1992 Germany .

OTHER PUBLICATIONS

"Robotic engineering: an integrated approach"/Richard Klafter, Thomas Chmielewski, Michael Negin, Library of Congress Cataloging-in-Publication Data; 1989; pp. 730–734.

*Primary Examiner*—Terry Lee Melius
*Attorney, Agent, or Firm*—Ratner & Prestia

[57] ABSTRACT

A method and apparatus for controlling an agricultural harvester having a cut crop receiving header coupled to a hydraulic cylinder. The header applies a force against the ground that is adjusted by applying pressure to the cylinder. A first proportional valve is fluidly coupled to the cylinder, and responds to a first input signal by increasing pressure in the cylinder to a setpoint value, when the pressure is less than the setpoint. A second proportional valve is also fluidly coupled to the cylinder, and responds to a second input signal by reducing pressure in the cylinder to the setpoint pressure value, when the pressure is greater than the setpoint. A pressure signal representing cylinder pressure is received. The difference between the measured pressure and the setpoint is used to compute the first and second input signals, which are transmitted to the valves. Cylinder pressure is maintained substantially at the setpoint, maintaining the force applied against the ground by the header substantially constant. Alternatively, header height may be measured and the valves controlled to maintain header position substantially constant relative to the ground or the harvester frame. Header lateral tilt is controlled while controlling either cylinder pressure or header height. A resume function returns the header from a raised position to a cutting position at the beginning of a new row.

12 Claims, 24 Drawing Sheets

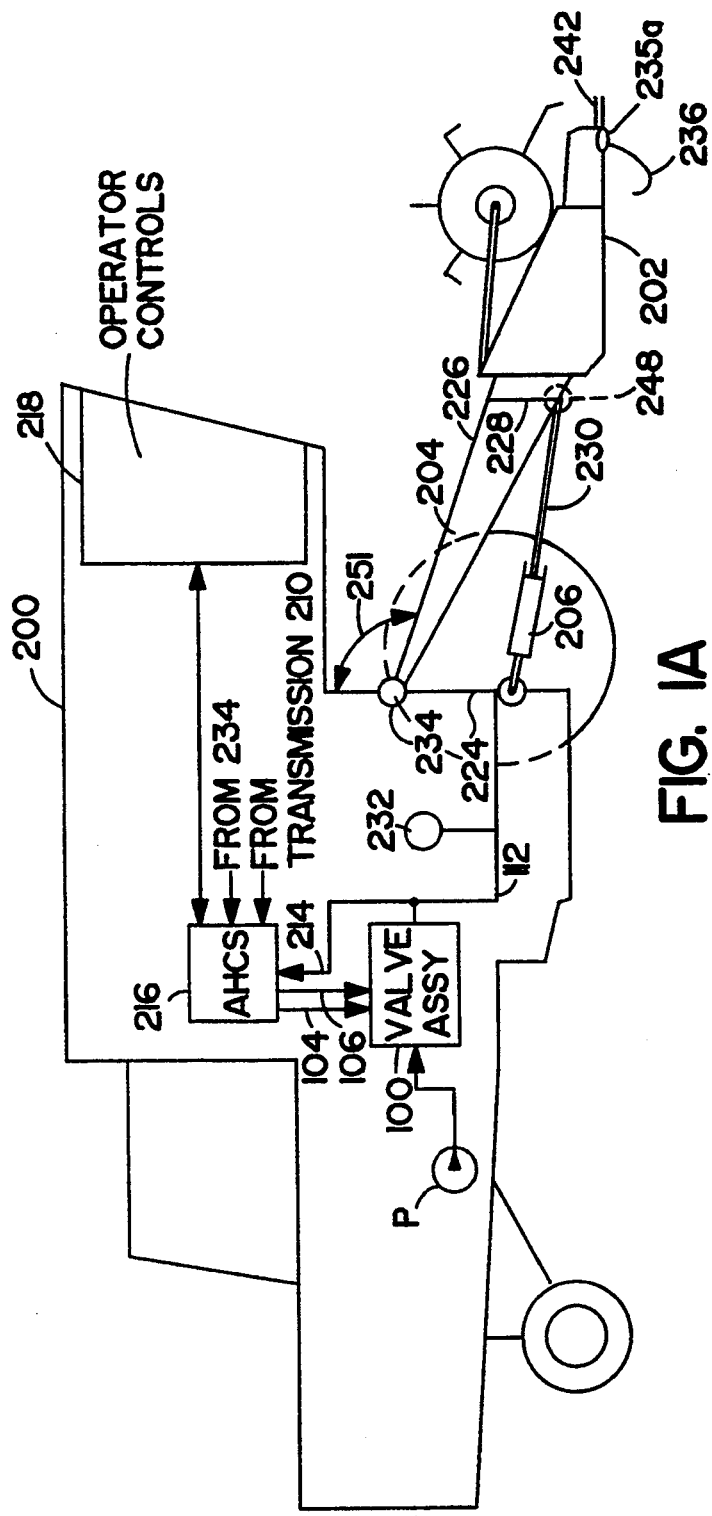
FIG. IA

AGRICULTURAL HARVESTER WITH CLOSED LOOP HEADER CONTROL

BACKGROUND OF THE INVENTION

1. Field of the Invention

This invention relates to agricultural equipment and in particular to the use of hydraulic control systems for regulating agricultural harvester header position and/or applied force of the header on the ground.

2. Description of the Related Art

In agricultural equipment such as combines and forage harvesters, automatic header position controls have been used for maintaining a desired header position relative to the ground in terrain which may be uneven and sloped. These control methods have been directed at maintaining a desired header height above the ground and swiveling the header in a vertical plane to match uneven ground contours. The header contains the cutting mechanism. Maintaining the header more closely within a narrow position range relative to the ground can potentially increase the yield of the crop harvested.

Typical closed loop hydraulic systems have used simple on-off solenoid valves to control the flow of fluid under pressure to an actuating cylinder for regulating the header height. For example, U.S. Pat. Nos. 4,204,383 to Milliken, Jr. and 4,211,057 to Dougherty disclose automatic height control systems in which the height is controlled by operating respective raise and lower solenoid valves, each solenoid having only two positions (open and closed). When the header reaches a rise in ground level, the raise solenoid will admit fluid into the actuating cylinder until a the header reaches a predetermined distance above the rise in ground level, at which point the solenoid is closed.

The sudden opening and closing of the raise and lower solenoids may produce a sudden change in header acceleration, causing stress on the combine components, and may be further transmitted to the tires, causing undesirable cab oscillations. Improved control systems are desirable to reduce the rate of change of header acceleration (jerk).

Another aspect of agricultural harvesters is the use of a floatation mode. It is often desirable to "ride the header" along the ground. This is also referred to as "header floatation," because the header floats on the ground. A variety of headers, which differ from one another in weight and functionality, may be attached to the feeder house. By allowing the header to follow the contour of the ground, the yield is enhanced for low lying crops such a soybeans.

U.S. Pat. No. 4,942,150 to Diekhans et al. discusses header control system in which the difference between ground clearance signals at the right and left ends of the header is used for regulating the swiveling, and the mean of the ground clearance signals serves as a component for regulation of the cutting bar height.

Mechanical floatation systems utilize a variety of mechanical counterbalance methods and are highly dependent on the kinematic structure of the agricultural equipment.

To harvest low lying crops, it may be desirable to keep the cutting bar as close to the ground as possible. An exemplary approach to implement the floatation function with the cutting bar on the ground is an open loop hydraulic system including an accumulator, cylinder and relief valve. In this passive floatation system, the header is lowered to touch the ground, and the resulting pressure in the cylinder is adjusted to some desired value. A given pressure in the cylinder is associated with an effective weight of the header on the ground. As the machine moves over the ground, the cylinder extends or retracts matching a rising or falling terrain. Since there is a fixed volume of oil in the system, the oil present in the cylinder is passed into or out of the accumulator. This oil exchange process between the accumulator and cylinder attempts to smooth pressure variations and provides the compliance so that the cylinders can move as the ground height varies. Without the accumulator, the compliance of the cylinder is non existent for rising terrain and the resultant forces on the ground could become extreme. A relief valve is included to prevent the maximum pressure in the closed system from exceeding some preset value.

While the passive system provides compliance for cylinder movement and a smoothing action, it does not provide a constant counterbalance force on the header. It is important to note that the pressure at the cylinder port can vary as the header moves over the terrain. This means that the effective weight of the header on the ground varies. If the harvester encounters a bump that is too high, the header may dig into the ground. The passive system also requires adjustment of the accumulator precharge pressure to accommodate different weight headers.

Another aspect of agricultural harvesters is the way in which the header height is controlled above, but near to, the ground. In conventional combine designs, an accumulator is included as part of the header cylinder circuit. The operator sets the header height using a raise/lower valve. If the header encounters reactive forces, as the harvester moves over the ground, the accumulator can source or sink hydraulic fluid to minimize pressure spikes in the header circuit. However this sourcing and sinking of oil also results in vertical motion of the header or cutting bar.

A further aspect of agricultural harvesters is the practice of raising the header at the end of a row so that the harvester may be rapidly moved to the start of the next row. When the harvester reaches the start of the next row, it is necessary to return the header to its operating height in order to continue cutting crops. This has been performed under manual operator control and has added to the delays in preparing the harvester for the next row.

SUMMARY OF THE INVENTION

The present invention is a method and apparatus for controlling an agricultural harvester. The harvester has a cut crop receiving header that is coupled to a hydraulic cylinder. The header applies a force against the ground that is adjusted by applying fluid under pressure to the cylinder.

A first proportional control valve is fluidly coupled to the cylinder. The first control valve is responsive to an input signal for increasing fluid pressure in the cylinder to a setpoint value, when the pressure in the cylinder is less than the setpoint value. A second proportional control valve is also fluidly coupled to the cylinder. The second control valve is responsive to a further input signal for reducing fluid pressure in the cylinder to the setpoint pressure value, when the pressure in the cylinder is greater than the setpoint value.

A pressure signal that represents fluid pressure in the cylinder is received. The difference between the pressure signal and the setpoint value is determined. The input signal and the further input signal are computed from the difference. The input signal and the further input signal are transmitted to the respective first and second control valves. Pressure in the cylinder is maintained substantially at the setpoint value, thereby maintaining the force applied against the ground by the header substantially constant.

BRIEF DESCRIPTION OF THE FIGURES

FIGS. 1A and 1B are schematic diagrams of an exemplary embodiment of the invention.

OVERVIEW

Figure 1B:
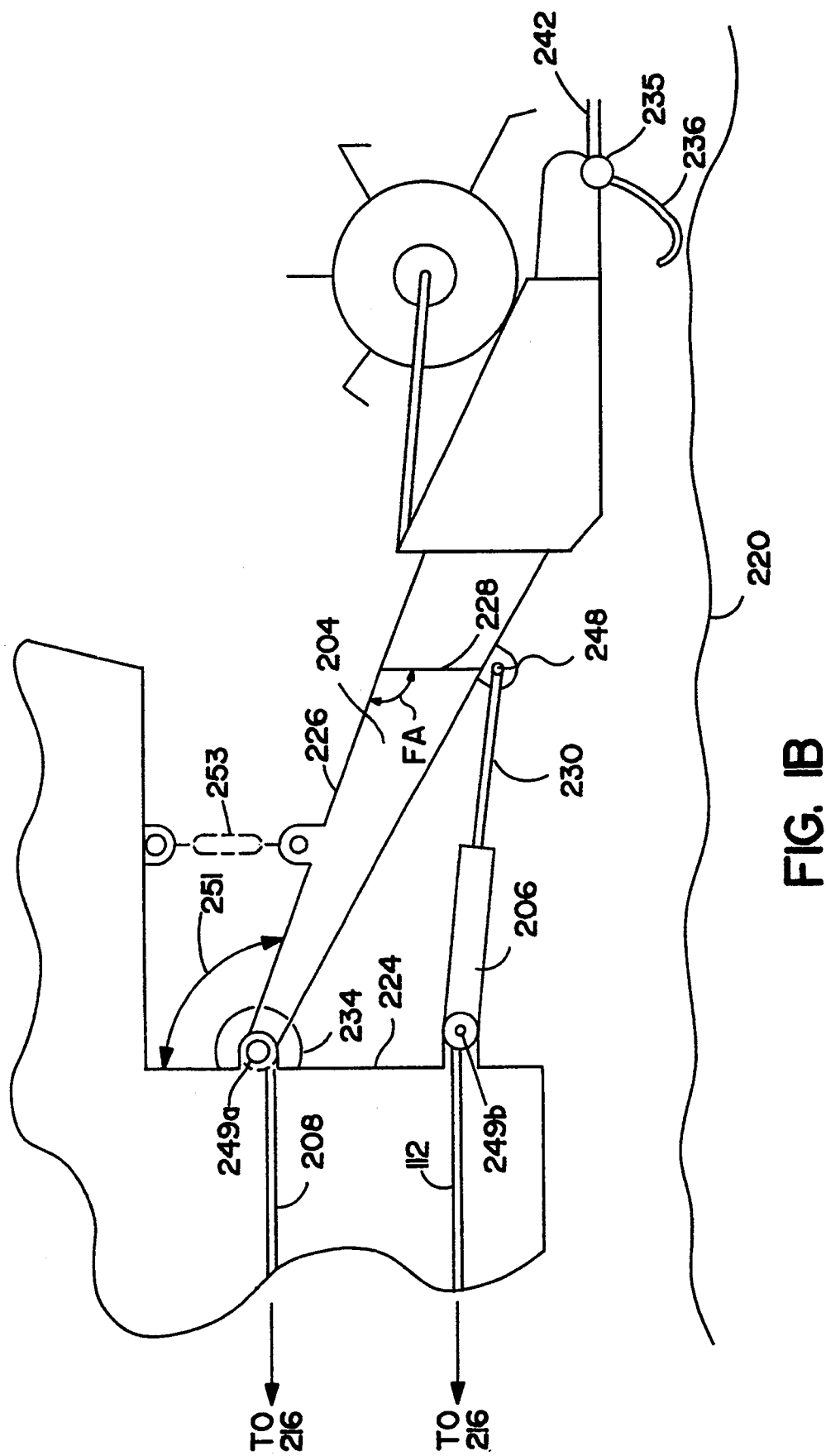
Figure 2A:
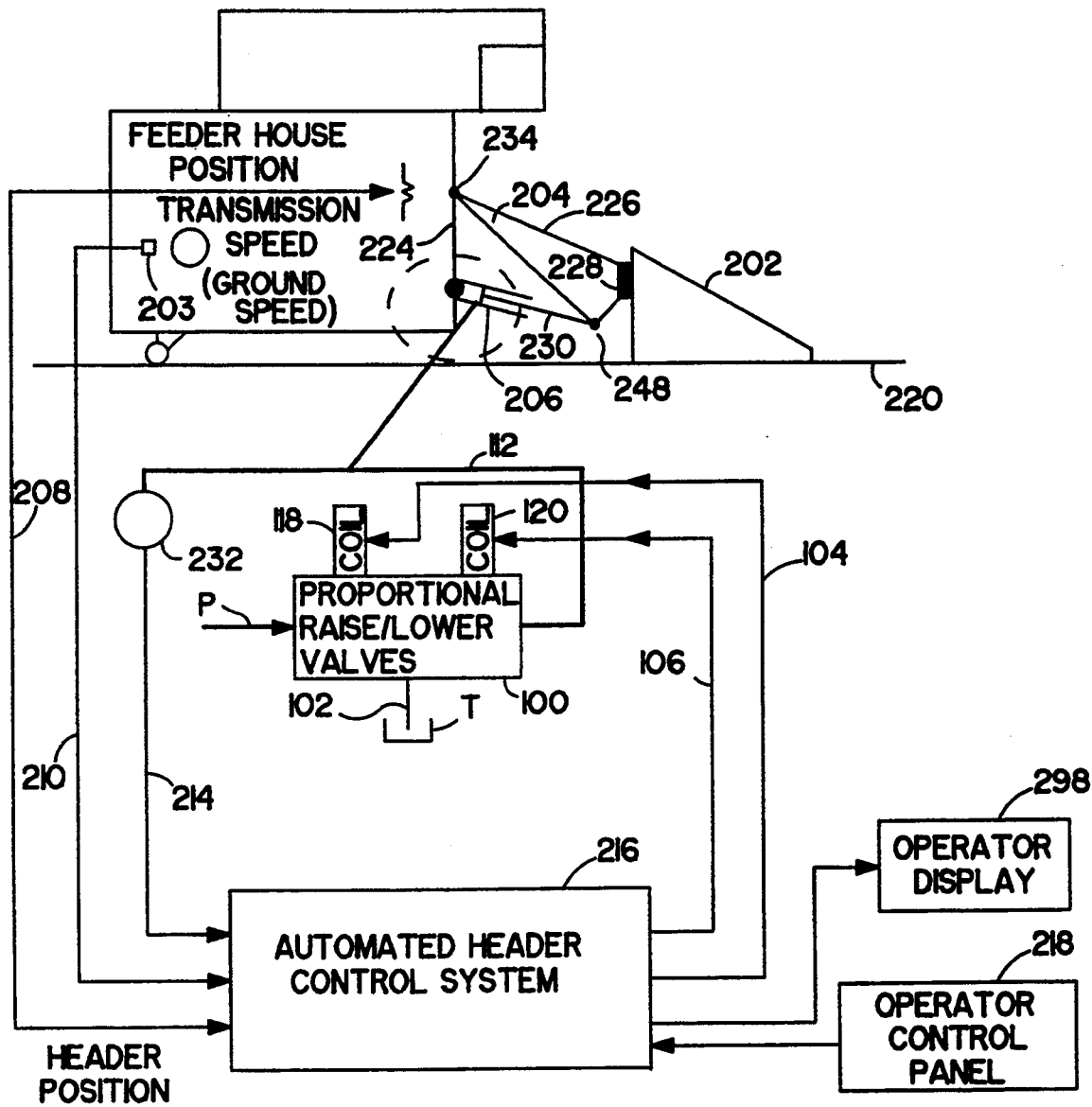
FIG. 2A. is a block diagram of the system shown in FIGS. 1A and 1B.

FIGS. 1A, 1B and 2A show an exemplary embodiment of the invention. An agricultural harvester 200 is shown, which may be a combine, having a cut crop receiving header 202. The crop is transferred from the header to a feeder house 204. A four bar linkage (shown in FIG. 1B) includes three fixed length members 224, 226 and 228 and a fourth member having a variable length 230. Member 224 is formed by a portion of the frame of harvester 200. Members 226 and 228 are formed by the top and the front of the feeder house, respectively. A hydraulic cylinder 206 forms a part of member 230. Extension and retraction of cylinder 206 results in a change in the length of member 230. The four bar linkage forms a quadrilateral with 1 fixed angle FA and 3 angles that vary when cylinder 206 extends or retracts.

An identical second actuating cylinder (not shown) is located on the opposite side of harvester 200 from cylinder 206. Cylinder 206 and the second actuating cylinder are symmetrically located and hydraulically coupled to provide equal force and torque for raising or lowering feeder house 204 without pivoting header 202.

The header 202 height and feeder house 204 height relative to the frame 224 of harvester 200 are directly related to the displacement of cylinder 206 (and the length of member 230). In addition to raising and lowering header 202, application of pressure to cylinder 206 may be used to counterbalance the combined weight of the header 202 and feeder house 204 when the header is making contact with the ground 220. An automated header control system (AHCS) 216 may be operated in several modes, as described below, to control the height and orientation of the header.

According to one aspect of the present invention, an active, closed loop AHCS 216 causes header 202 to "float" along the ground 220 by applying a counterbalancing force to header 202 through cylinder 206. The counterbalancing force reduces the effective weight force that header 202 applies to the ground 220, so that the weight force has a reduced value. This method of control is referred to herein as "floatation". Floatation control in accordance with the present invention differs from prior passive floatation systems, in that the header actually rests on the ground and the pressure in the actuating cylinder is maintained substantially constant to maintain a fixed counterbalancing force to support header 202. As a result, header 202 exerts a selectable, constant force against the ground, the force being substantially less than the weight of header 202. With the header in actual contact with the ground, the header tilt is controlled passively, allowing the header to swivel as the contours of the ground push against it.

Figure 9:
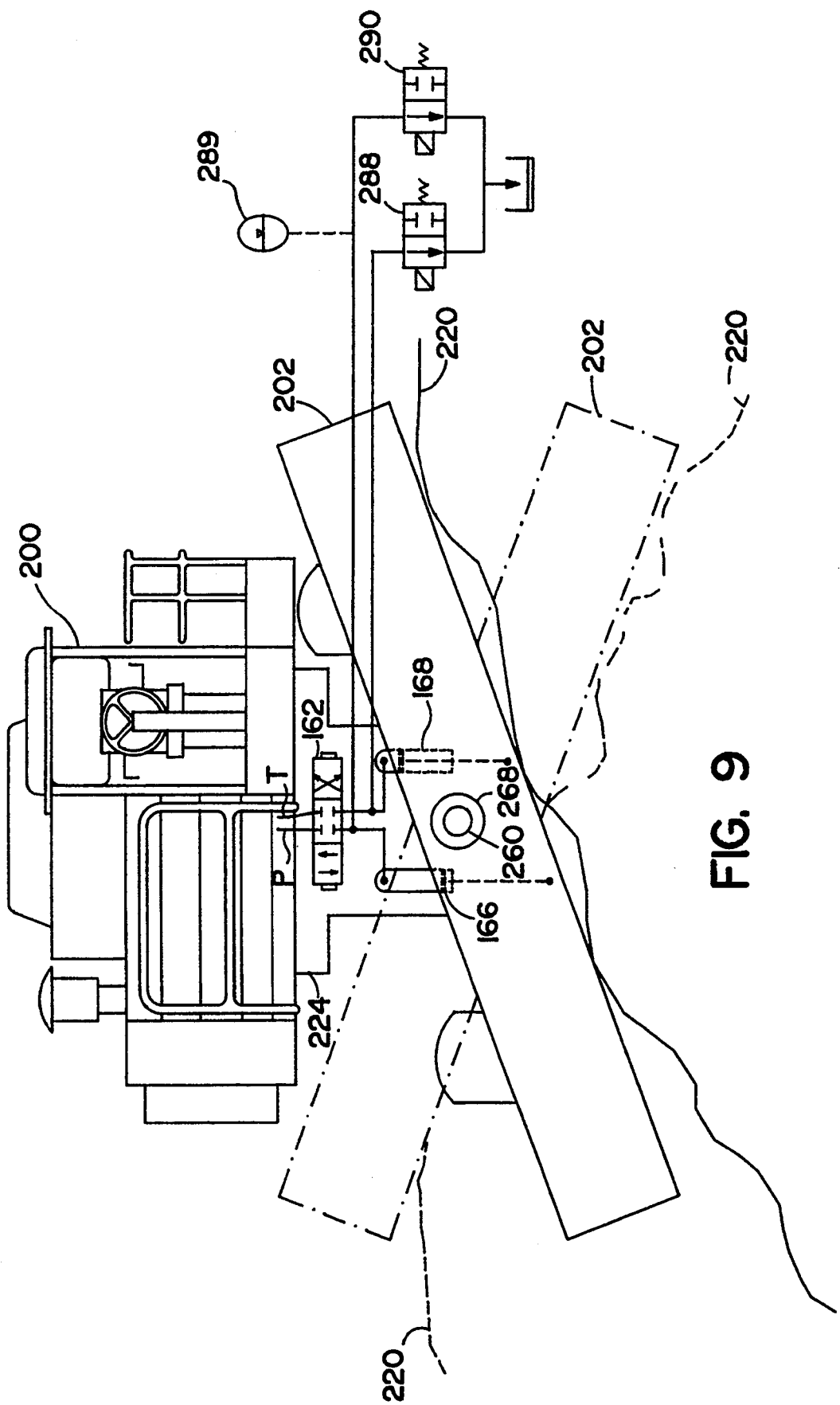
FIG. 9 is a front elevation view of the harvester shown in FIG. 2A, with floatation and lateral tilt functions operating.

Referring to FIG. 9, the valve 162 that controls the header tilt may be set in a "hydraulic float" position for passive lateral tilt. This allows the two cylinders 166 and 168 that control the header tilt to exchange oil either between themselves or between themselves and tank. For passive lateral tilt, valve 162 is placed in the center position and the two electrically operated on/off pilot valves 288 and 290 are energized so that fluid may be exchanged between cylinders 166 and 168 if torques produced by contact with the ground cause the header to rotate. Alternatively, a different three position valve (not shown) may be used in addition to valve 162; the additional valve having a "float position" that couples the two cylinders to one another. Such a valve could not, however, be used for both active and passive tilt control.

Referring again to FIGS. 1A, 1B and 2A, AHCS 216 receives a pressure feedback signal 214 (from a pressure transducer 232) identifying the pressure in cylinder 206. AHCS 216 receives a speed signal 210 representing the ground speed of harvester 200. The speed signal 210 may be provided by a sensor in the vehicle's transmission (not shown). The harvester operator inputs a pressure setpoint value using operator controls 218 for adjusting the setpoint value, such as a potentiometer. The cylinder pressure is compared to the setpoint value. Valve assembly 100 increases or decreases the pressure applied to cylinder 206 to maintain the pressure at the setpoint value. For example, if the ground 220 under header 204 rises, the cylinder pressure and counterbalancing force decrease, requiring the AHCS 216 to increase the pressure in cylinder 206. If the ground 220 falls off beneath header 202, the pressure and counterbalancing force increase, requiring At AHCS 216 to decrease the pressure in cylinder 206.

Valve assembly 100 includes a proportional raise control valve 118 (shown in FIG. 2A) and a proportional lower control valve 120 (also shown in FIG. 2A), both fluidly coupled to cylinder 206 to apply pressure corrections when the measured pressure 214 in cylinder 206 deviates from the setpoint value. AHCS 216 computes an input signal (for driving raise valve 118) and a further input signal (for driving lower valve 120) from the difference between the pressure signal and the setpoint value.

The present invention includes proportional control valves 118 and 120. A proportional integral derivative (PID) control algorithm is used to determine the rate at which the proportional valves 118 and 120 are opened and closed to keep the pressure in the cylinder 206 substantially constant, without imparting a jerk force to the apparatus. AHCS 216 generates proportional, integral and derivative signal components that are proportional, respectively to the difference, the integral of the difference and the derivative of the difference with respect to time. The proportional, integral and derivative components are combined to form the input signal 104 to raise valve 118 and the further input signal 106 to lower valve 120. Cylinder 206 compliance is achieved, because any pressure change in cylinder 206 (for example, a pressure decrease which occurs when header 202 goes over a rise in ground level) is immediately sensed by transducer 232. As soon as the pressure change is detected, oil is either applied to the cylinder 206 or released from cylinder 206 at a controlled rate, allowing header 202 Go follow the contours of the ground 220. An exemplary pressure transducer suitable for use in a system embodying the invention is the pressure transducer model No. SA-3000, manufactured by Data Instruments, Inc., of Acton, Mass.

The PID control smooths the opening and closing of valves 118 and 120 so as to avoid jerk force due to changes in the acceleration of the header. In addition, the coefficients used in the PID algorithm are varied as the speed of harvester 200 (identified by speed signal 210) changes, effectively changing the response time (bandwidth) of the system. If the header 202 is too responsive at slow speeds, then valves 118 and 120 (shown in FIG. 2A) are constantly opening and closing, wasting energy. If the response time is too great in a rapidly moving vehicle, the system lags and the header 202 does not track the ground properly.

According to another aspect of the invention, AHCS includes means for applying respective first, second and third gains to modify the respective first (proportional), second (integral) and third (derivative) signal components before combining them. The modified proportional, integral and derivative signal components are then combined and the combined signal is used to generate the input signal 104 and further input signal 106. AHCS includes means for varying the first, second and third gains when a driving condition of the agricultural harvester, such as the harvester speed, changes.

According to another aspect of the invention, AHCS 216 receives a position signal 208 representing the position of the feeder house and header relative to frame 224 of harvester 200. Header height may be maintained at a desired value relative to the ground 220 or frame 224 for crop cutting. Position signal 208 may be provided by a variety of different types of sensors. The position signal may represent the position of the header relative to the ground, as measured by devices such as contact sensors 236, 237. Alternatively, the position signal may measure the angle of the feeder house with respect to the frame 224 of the harvester, as measured by devices such as potentiometer 234. The latter measurement is used for "stubble height" control of the header position, as explained below. The input signal 104 to raise valve 118 and the second input signal 106 to lower valve 120 may be controlled in order to maintain the header at a desired setpoint height.

In accordance with the present invention, two different methods may be used to sense the height of the header 202 and feeder house 204 relative to the ground. If header 202 is within a few centimeters of the ground, then conventional sensors attached to bottom of the header can contact the ground and measure the actual header height. This type of header position control is referred to herein as "header height" control, because the actual header height is measured directly. Header height control is advantageous if the ground height changes rapidly; the ground below frame 224 may have a different ground height than the ground below header 202.

If header 202 is held at a height well above the ground, the contact type sensors lose contact with the ground and cannot measure the height. This may occur, for example, when cutting the top of a tall crop such as corn or wheat. According to the present invention, a position sensor which measures the position of the header 202 and/or feeder house 204 relative to frame 224 of the harvester 200 is used for cutting the top of a tall crop. This type of control is referred to herein as "stubble height" control. Stubble height control maintains a fixed position of header 202 or the cutter bar (not shown) relative to frame 224.

In the exemplary embodiment, stubble height control maintains a fixed angle 251 between feeder house 204 and frame 224 of harvester 200. Any increase in the length of member 230 causes a decrease in angle 251 and an associated increase in the height of header 202. There is a one-to-one correspondence between angle 251 and the height of header 202 relative to frame 224. Stubble height control provides a wide range of height control, because the sensor 234 is rotary in nature (e.g., a potentiometer, or an incremental optical encoder with a reference pulse) and can measure the angle 251 throughout the full operating range of header positions. Alternatively, angle 251 may be measured indirectly by a sensor 253 which may be a linear potentiometer or linear variable displacement transformer (LVDT), as shown in FIG. 1B. Each position of LVDT 253 represents a respective feeder house angle 251 that may be computed from trigonometric relationships and stored in a look-up table in memory 140. Although stubble height may be used throughout the range of header heights, it may be advantageous to use stubble height control at large header heights and use header height control relative to the ground 220 (using position sensors) at lower header heights.

According to another aspect of the invention, header height may be combined with active control of the tilt of the header (and the cutter bar) relative to the frame 224 of harvester 200. Tilt control uses multiple position sensors on the bottom of header 202 to determine the angle of the ground below the header, relative to frame 224. Both the header height and the tilt are controlled using PID control. Depending on the ground conditions, either header height or tilt control may be given precedence. This is accomplished by applying corrections in response to feedback and adjusting the PID gains more often for the control mode (header height or tilt) having precedence.

According to another aspect of the invention, the control system includes an automatic resume function 294, for switching from manual height control to automated stubble height control. In a typical application, the operator maintains header 202 near the usable portion of the crop while driving the combine across a crop row. At the end of the row, a memory retains the height of header 202, as measured by angle 251. Then the operator raises header 202 high above the ground under operator control, so that he or she can rapidly move harvester 200 to the beginning of the next row. In response to the operator action, AHCS interrupts transmission of the input signal 104 and the second input signal 106 to the first (raise) and second (lower) control valves 118 and 120, respectively. AHCS 216 generates and transmits a raise signal to cause valve 118 to apply sufficient fluid to cylinder 206 to raise header 202 to a predetermined raised position.

After the vehicle reaches the next row, in response to a further operator command (or action), the resume function 294 repositions header 202 at the desired crop cutting height. The angle 251, and therefore the position of header 202, are measured even at the highest header height. It is thus possible to automatically lower header 202 back down to cutting height under PID control. Above a predetermined transition position (i.e., while high above the ground), header 202 moves according to a predetermined velocity profile, which may be rapid. After the transition position, the normal operation, including generation of the input signal 104 and second input signal 106 to maintain the header at the desired position. Thus AHCS 216 gradually reduces the height as header 202 nears the desired cutting height retained in memory, without any jerk.

A variety of velocity profiles may be used for the initial lowering of the header by the resume function 294, above the transition point at which control returns to the control mode (stubble height, header height or floatation) that was being used before raising the header at the end of the previous row. Respectively different sequences of events may occur when the resume function is used to return to respectively different (stubble height, header height or floatation) control modes. For example, if the header position retained in the memory is a low position, it may be desirable to move the header at the maximum speed until it is close to the setpoint, and then to reduce the speed.

According to another aspect of the invention, an automated calibration capability is provided by the header control system. This allows the operator to calibrate the sensors without leaving the cab of harvester 200. Routine calibration is extremely important due to variations between different headers that may be placed on a combine, and due to variations in the combine, header and sensors that occur during and after each use in the field. The calibration capability correlates the header position and cylinder pressure signals returned by the sensors as the header is moved through its range of motion and the cylinder pressure is varied. Through this calibration process, the transition points between control modes, the limits of feeder house 204 motion, and deadband are determined.

According to another aspect of the exemplary embodiment of the invention, a single electrohydraulic valve assembly 100 may be used to control the header height in the floatation, stubble height, header height, resume and calibrate modes.

DETAILED DESCRIPTION

Referring to FIGS. 1A and 2A, the method used for raising and lowering the header includes a four-bar linkage. The four-bar linkage consists of three fixed length links 224, 226 and 228 and one variable length link 230 formed by the header cylinder 206. One of the four angles associated with the four-bar linkage is fixed with the remaining three free to vary. Typically, two cylinders 206 are used, one on each side of the machine; however they are connected to the same pressure source. For the discussion herein, reference is only made to a single cylinder 206. The feeder house 204 is raised as the header cylinder extends, and the feeder house is lowered when the cylinder retracts.

Flotation Control

Typical headers weigh in the order of 2000 lb., therefore it is desirable to counterbalance the actual header weight in order to minimize the effective weight or force on the ground. This allows the header to be placed right at ground level, instead of above the ground. By reducing the effective force on the ground, the agricultural harvester 200 does not destroy the field by unnecessarily plowing it up, nor does dirt enter the sensitive separator mechanism of a combine. Additionally, forces produced by the ground on header 202 are minimized thus reducing the required power to drive harvester 200.

As shown in FIG. 1A, the system includes two sensors. The pressure transducer 232 is used to measure the pressure in the actuating cylinder 206 to control the cylinder pressure. The feeder house position sensor 234 is used to measure the position of the feeder house when the header height is too great for contact sensors 236 to reach the ground.

The proportional valves 118 and 120 may be implemented as either pressure/flow control valves or as flow control valves. In the exemplary embodiment, the valves 118 and 120 are pressure/flow control valves, as described below in greater detail.

The operator controls 218 include electrical switches (not shown) to control the raise and lower functions. These switches are designed to operate independently of the AHCS 216 to provide a manual operation mode. The control system includes a multifunction display that shows the setpoint pressure, the actual pressure on the cylinder, or the computed effective weight of the header on the ground. Means are provided for adjusting the setpoint, such as a potentiometer, or arrow keys. A further switch initiates calibration procedures.

The AHCS 216 allows the operator to manually control the raise and lower functions of header 202 during the automatic sequence or during the calibration process. Manual control is typically used to allow the operator to raise the header 202 at the end of a row. Once the operator touches the manual controls, the AHCS 216 enters a standby mode. The operator subsequently issues a resume command to continue automatic operation. Once manual control is invoked by the operator both raise and lower functions operate. If invoked during calibration, the resume function 294 is not operational and the calibration sequence is reinstated.

The AHCS 216 allows the operator to depress a single control to resume automatic operation of the automatic function after the control system has been placed in standby mode. This process utilizes a mode switching technique to ensure a smooth transition from the raised header height to a first predetermined height prescribed by the automatic control. The resume function 294 causes the header 202 to lower at a predetermined rate until initial ground contact is attained (the transition point). Once this transition point is detected, the floatation control function 250 takes over and adjusts the cylinder 206 pressure to ensure that the proper counterbalance force is applied.

As previously described, header 202 floatation is achieved by actively counterbalancing the weight of the header 202 on the ground 220 by the application of pressure to the header cylinders 206. This results in an effective weight of the header 202 and feeder house 204 on the ground 220 which is less than the actual weight of the header 202 and feeder house 204.

The counterbalancing process only applies when the header 202 is contacting the ground 220. If the header 202 is raised and is stationary, the pressure in the raise cylinder 206 exactly balances the weight of the header 202 and feeder house 204.

Because a four-bar linkage 224, 226, 228 and 230 is utilized to raise the header 202, the actual pressure that is applied to the cylinder 206 to balance the header 202 and feeder house 204 varies as a function of the height of the header 202 above its reference. This relationship is due to the mechanical advantage of the mechanism and also the non-linear relationship between cylinder 206 stroke and header 202 height.

Friction is present on the joints and in the cylinder 206. The static component of the friction tends to introduce a deadband. The deadband may also vary with position and contributes to the actual pressure needed to keep the header 202 stationary.

The concept for floatation is based on regulating the pressure in cylinder 206 to remain constant. In typical field conditions, terrain variations are about 6 inches.

The system provides compliance (using, for example, an accumulator or a control system), allowing cylinder 202 to extend and retract as the header moves over the ground. The size of the cylinder motion depends on the parameters of the four-bar linkage and the amount of fluid that is exchanged between cylinder 206 and tank T or pressure source P in while maintaining a constant pressure.

The difference in pressure needed to counterbalance the header 202 at the extreme ranges of motion caused by field variations is small. Thus, by using a closed loop control system to maintain a constant pressure in cylinder 206, the effective weight on the ground 220 is controlled. Variations in the effective weight are small.

The cylinder pressure header height relationship is generally flat, assuming that the pressure in cylinder is the only force balancing the weight of the header and feeder house. The curve is not perfectly flat due to the mechanical advantage of the four-bar linkage. Increasing or decreasing the cylinder 206 pressure results in linear velocity of the cylinder and ultimately the header rises or falls. Depending on the magnitude of the pressure change, the system may reach a new equilibrium point or continue to move.

Once the header 202 contacts the ground 220, further reduction in cylinder 206 pressure does not change the header 202 height. As the cylinder 206 pressure decreases, more of the header 202 weight is applied to the ground 220. Active counterbalancing is possible. If the cylinder pressure is increased above the point where ground contact is made, cylinder velocity results.

If the header 202 height is adjusted to a given level with respect to a reference point on the frame 224, there is an associated cylinder pressure and an associated cylinder extension. If header 202 is lowered, it eventually contacts the ground 220. A force balance occurs when header 202 just contacts the ground 220. This corresponds to a effective force on the ground 220 of zero (because the cylinder is producing all the balance force). As the cylinder pressure continues to decreased the header does not lower, but the force applied to the header is decreased, thereby increasing the effective force on the ground. This continues until the entire weight of header 202 is applied to the ground. The effective force on the ground is the actual weight of the header minus the force applied by the header cylinder.

Because cylinder pressure is nearly constant at different header heights (while header 202 is stationary), the effective force on the ground is essentially the same for a given cylinder pressure regardless of header heights with respect to some reference. When the ground falls (and consequently causes header 202 to fall), cylinder 206 retracts due to the motion of the header and the cylinder pressure rises. When the ground rises, causing header 202 to rise, cylinder 206 extends and cylinder pressure decreases. For a fixed cylinder pressure, the effective force on the ground varies, because the nominal operating point is modified by the increase or decrease in the cylinder pressure caused by header motion due to terrain changes. Thus there is the potential for wide fluctuations in the effective force on the around as the header traverses the field.

Variations in the counterbalance operating point (or effective force on the ground) are minimized by maintaining the cylinder 206 pressure at a constant level. This regulating process maintains the nominal cylinder pressure. With the nominal cylinder pressure substantially constant, actual effective weight on the ground still varies slightly, but the variation is significantly less than that due cylinder movement. On the average, the effective ground force remains near the set point. The result of this system increases crop yield for low lying crops and minimizes disturbances to the ground in the field.

Figure 2B:
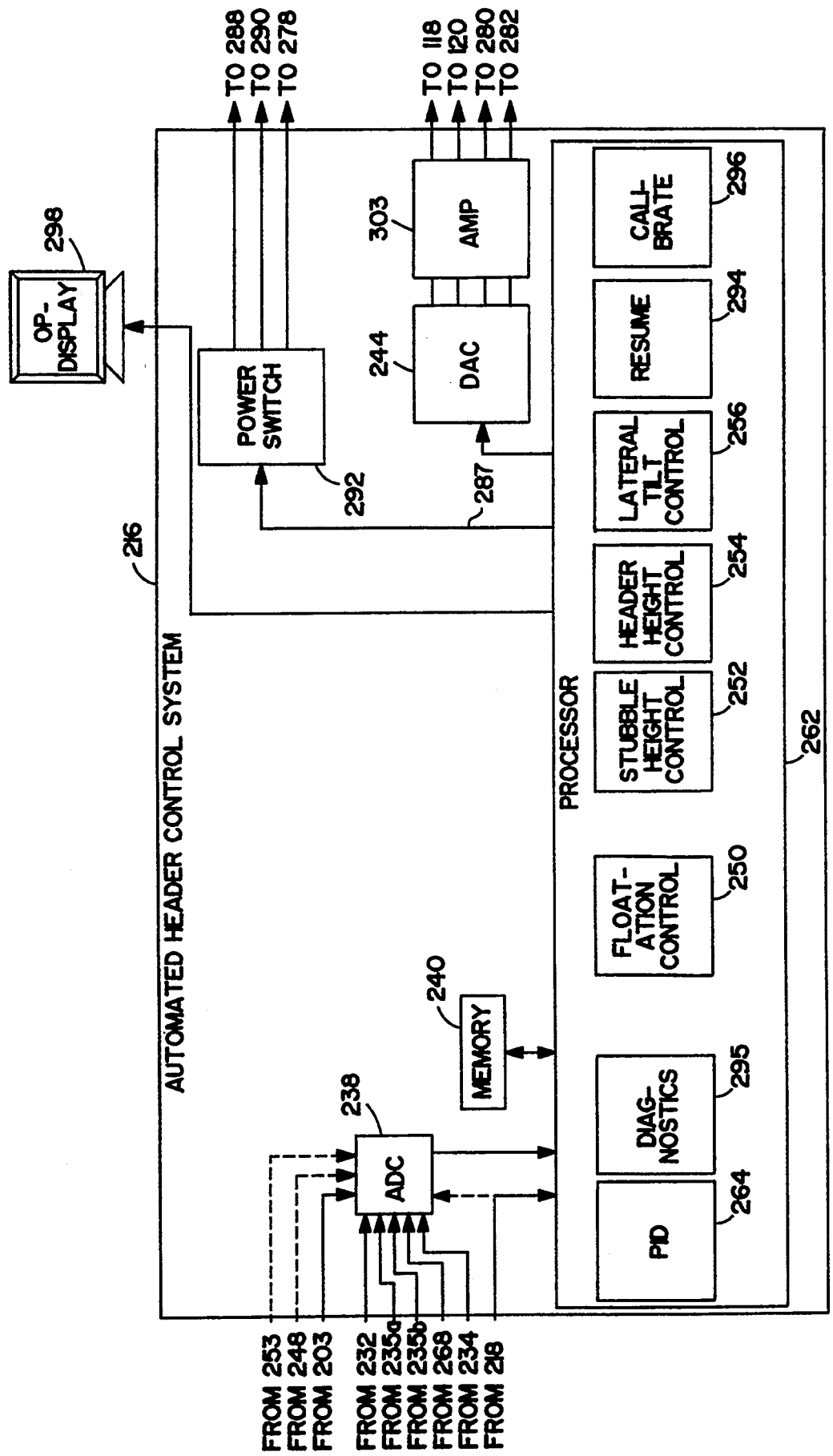
FIG. 2B is a block diagram of the automated header control system (AHCS) shown in FIG. 2A.

FIG. 2B is a block diagram of AHCS 216, shown in FIG. 2A. AHCS 216 receives input signals from sensors and commands from the operator. AHCS processes the signals and commands and controls the hydraulic system to maintain a desired header position.

Sensors provide analog input signals to AHCS 216. The sensors include vehicle speed sensor 203, load pressure sensor 232, header pivot angle sensor 268, feeder house angle sensor 234, and the potentiometers 235a and 235b of left and right ground contact sensors 236 and 237. An optional draft pin 248 (shown in FIG. 1B) may be used to resolve and measure the effective weight of header 202 on the ground 220, instead of deriving the effective weight from the load pressure sensed by transducer 232 in line 112. Also, an optional linear potentiometer 253 or LVDT (shown in phantom in FIG. 1B) may be used to measure the feeder house angle instead of rotary potentiometer 234.

The analog sensor input signals are provided to an analog/digital (A/D) converter 238, which converts the signals to digital form and provides the digital signals to a processor 262. An exemplary processor suitable for use in the AHCS is the Motorola 68HC11 processor. The 68HC11 processor includes an internal A/D converter, so that a separate converter 238 is not required with the 68HC11. The operator input signals may be provided in a digital form directly to processor 218. Alternatively, the operator may use analog input devices to input commands to processor 262 by way of A/D converter 238.

The processor 262 executes several control functions. Floatation control 250 commands the control valves to maintain a substantially constant header weight on the ground. Lateral tilt control 256 may operate in a passive mode to allow the header 202 to pivot freely while the floatation function is operating. Stubble height control function 252 maintains the angle 251 between feeder house 204 and frame 224 at a substantially constant value. Header height control function 254 maintains a substantially constant distance between header 202 and the ground. Lateral tilt control function 256 may operate in an active mode while header height 254 is active, to maintain the header pivot angle substantially parallel to the average ground angle.

Additional functions executed by processor 262 are used in conjunction with all of the above functions. The PID function 264 determines adjustments to the control valves that will provide jerk free header movement, based on operator supplied setpoints and sensor data. The diagnostics function 295 periodically checks the state of health of several subsystems to detect malfunctions and deviations from normal performance. The resume function 294 may be activated at the beginning of a row to automatically return header 202 from a raised position to the position it was in immediately prior to raising the header 202 (typically, the position at the end of the most recent previous row). Resume function 294 may be used to return AHCS to floatation, stubble height or header height operating mode. The calibration function 296 may be executed to automatically command the hydraulics to position the header as necessary to calibrate the feeder house potentiometer 234, the header contact sensors 236 and 237. The data are automatically stored in memory 240.

The output signals from AHCS 216 drive the hydraulic system and the operator display 298. The invention includes both on/off valves 288, 290, 278 and proportional valves 118, 120, 280 and 282. To drive the on/off valves, processor 262 provides on and off signals to a power switch 292, which closes an appropriate switch to actuate one of the respective valves 288, 290 or 278. To drive the proportional valves, processor 262 provides digital signals to digital/analog converter (DAC) 244, which provides analog output signals for each respective proportional valve that is actuated. The analog signals are amplified by amplifier 484 and transmitted to the respective valves 118, 120, 280 and 282.

Figure 3:
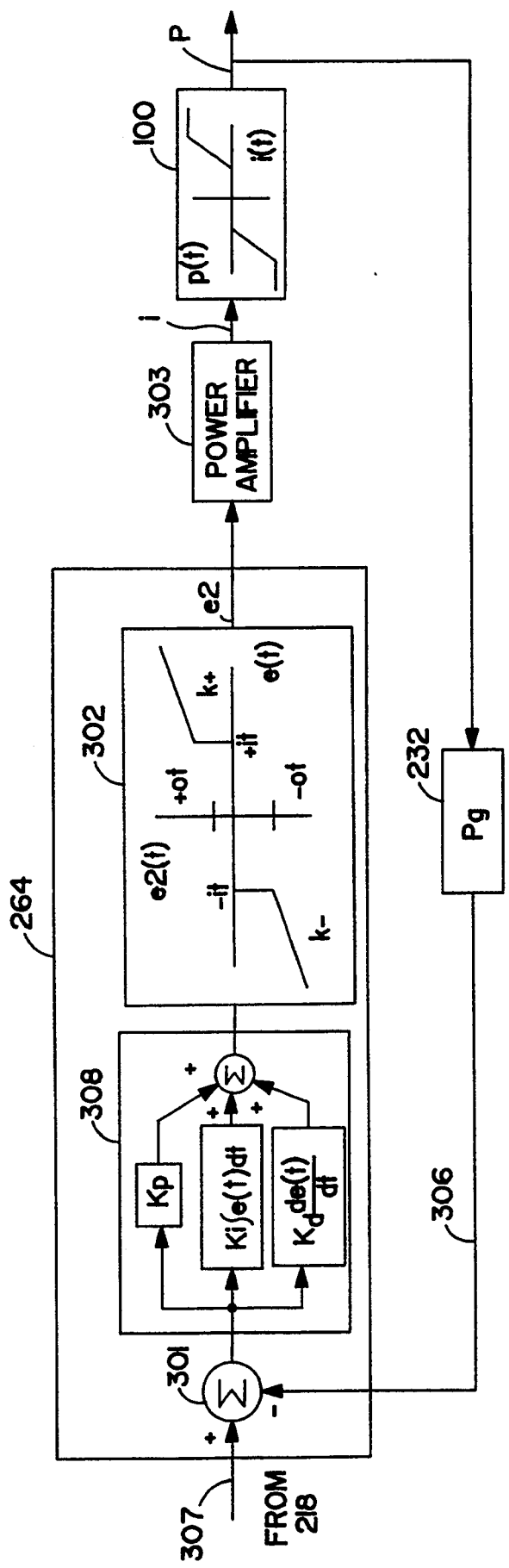
FIG. 3 is a block diagram of an exemplary embodiment of the floatation control function shown in FIG. 2A.

FIG. 3 is a block diagram of the floatation control function 250. A summing junction 301 receives a setpoint value 307 from the operator controls 218, and a feedback signal 306 from pressure transducer 232. Summing junction 301 generates an error signal e(t) by subtracting the measured cylinder pressure 306 from the setpoint 307 (or desired cylinder pressure). The error signal e(t) is applied to a PID control function 308 with deadband 302. The deadband function 302 provides an output signal if e(t) is greater than a positive input threshold, (+it) or less than a negative input threshold, (−it). Thus certain values of e(t) do not cause any action in the control loop. The output signal of deadband function 302 is essentially described by the following equations:

if $e(t) > +it$ $$e2(t) = K + *[e(t) - (+it)] + (+ot) \qquad (1)$$

if $e(t) < -it$ $$e2(t) = K - *[e(t) - (-t)] + (-t) \qquad (2)$$

if $+i > e(t) > it$ $$e2(t) = 0 \qquad (3)$$

where:
  e2(t) = error signal with deadband
  K = a constant
  it = input threshold
  ot = output threshold This relationship defines an error band of pressure between p(t) and the setpoint which does not cause the system to respond, but also guarantees that the proportional pressure control valve assembly 100 receives the proper control current in the event that the deadband is exceeded. A power amplifier 303 converts error signal e2(t) into a current to operate the proportional hydraulic pressure valves in valve assembly 100. Pressure transducer 232 has a gain, Pg, that transforms the actual cylinder pressure controlled by the valve into the correct units for comparison with the set point.

The deadband function 302 includes six adjustable parameters. The parameters K+, K−, positive input threshold +it, positive output threshold +ot, negative input threshold −it, and negative output threshold −ot, that define the relationship between e2(t) and the input error signal i. These parameters influence the stability, response time, rise time and other control system parameters of the pressure loop (the electrohydraulic control system). The relationship between deadband function 302, amplifier 303 and valve assembly 100 allows the user to select from a variety of error to pressure relationships.

Those skilled in the art will understand that the system may be implemented in a variety of ways. Analog hardware, dedicated digital hardware or a computer or micro controller may be used to "close the loop" with the appropriate interfaces to control the valve coils, and input the set point 307 and feedback pressure 306 signals. Power amplifier 303 may be implemented as a voltage to current converter using commercially available power operational amplifiers or may be implemented as a closed loop control utilizing pulse width modulation techniques to convert a voltage into a current in the coils of the valves in valve assembly 100. Additionally, a dither signal may be introduced as part of the power amplifier 303 to minimize friction in the valves in assembly 100.

Typical operation of an agricultural harvester 200 (such as a combine) requires raising the header 202 at the end of a row of crops so that the harvester may be positioned for operation at the next row. Raising of header 202 is accomplished by the operator depressing the manual raise switch. The control system senses this switch closure and immediately goes into a standby mode in which the pressure control loop associated with floatation 250 is deactivated. Once the machine is positioned properly at the next row, the operator actuates the resume switch (not shown) included in operator controls 218 (shown in FIGS. 1A and 2A) to signal the control system that the header should be automatically lowered and the automatic floatation control function 250 is reactivated.

The transition from active floatation to standby as soon as the header is manually raised (using the manual controls shown in FIG. 18) is easily accomplished. Based on the manual override capability of the control system, the automatic drive electronics 40 senses the operator's action by means of the voltage sense line and, turns off the pressure loop. All automatic signals to the valves through the coil drivers are removed. Thus valve control is only performed by direct wired manual switches 218 (operator controls). Transitioning smoothly back into active floatation from the raised header height requires a more sophisticated process and is discussed in subsequent paragraphs.

The nominal value of the feeder house potentiometer 234 corresponding to ground contact is known. While this nominal value differs from the actual value depending on ground contact at the instant the resume switch (not shown) is actuated, the nominal value does provide a bounding range.

The feeder house feedback potentiometer measures one of the angles of the links 224, 226, 228 and 230 comprising the four bar linkage. It has a nonlinear but monotonic relationship to the actual header height. Due to the small variations in ground height, it is possible to define a linear input-to-output relationship for the potentiometer about the nominal operating point (defined during calibration). An upper bound of contact is defined approximately 1–2 inches above the nominal value determined during calibration of the particular header 202. This upper bound is then used to define the transition from header lower to the floatation modes.

Mode transition into active floatation is described below. Once the operator actuates the resume switch (not shown), controller 264 in AHCS 216 lowers header 202 at a predetermined rate until the transition point is reached at which point the floatation function 250 is enabled. The floatation function 250 takes control of further lowering of header 202 and then resumes regulating cylinder pressure for proper counterbalance once ground contact is made.

Multiple solutions exist for the controlled lowering of header 202. One method incorporates a fixed orifice into the design of valve assembly 100 to control the flow rate and the speed. In proportional valves (such as used in the exemplary embodiment of the invention), the flow rate may be controlled by varying the current to the pilot valve 120. Alternatively, a closed loop flow control may be included and the actual speed of lowering controlled by applying a desired velocity profile as the command signal. Another alternative is to use an open loop scheme.

While the header is lowering, AHCS 216 constantly monitors the feeder house potentiometer 234 signal. Once the transition point is sensed, the signal to the lower valve 120 is discontinued and the pressure control loop is activated.

In the event that the current to the proportional pilot 120 is used to control the lowering, more than one transition point may be used. In this alternative, the flow my start at a large level (corresponding to a fast rate of height reduction), transition to a medium level, and ultimately be reduced to a small level at a position just above the transition point. The distance from the actual height of header 202 in the raised position (when changing rows) to the predetermined transition point may be divided into regions. The regions correspond to a set of desired speeds and different values of current applied to the lower valve 120 as the header 202 moves through these regions. This also allows variations in the actual height to which the header 202 is raised, and reduces the time to perform the resume function.

Once the transition point is reached, the desired cylinder 206 pressure for counterbalancing the weight of header 202 is less than the pressure in the cylinder 206 corresponding to the exact balance value at the transition point. Due to this difference, a pressure error signal exists. Because the pressure control loop is activated at the transition point, the pressure control loop "servos" to maintain the cylinder 206 pressure at the desired setpoint level.

Due to the substantially constant force applied by header 202 to the cylinder 206 (when not making contact) pressure control valves 118 and 120 also regulate flow. The pressure control loop relieves the pressure causing cylinder 206 to retract and ultimately causes header 202 to contact the ground 220, reaching the commanded counterbalance point. Once the counterbalance point is reached, the floatation system remains activated. The appropriate values of the control parameters $K_p$, $K_d$ and $K_i$ are then scheduled as a function of travel speed.

The gains used to accomplish this transition smoothly (according to a desired profile) may be gain scheduled into the PID algorithm based on the fact that mode switching is in progress. Thus the values of $K_p$, $K_d$, and $K_i$ used to obtain the initial ground contact and counterbalance may be tuned for smooth header repositioning and may be significantly different from those used for active floatation while the combine is moving over the field.

An exemplary method for providing the gain values is to store them in a table, so that at each position in the profile, there is a set of gain values $K_p$, $K_i$ and. $K_d$ that are used while header 202 is between that position and the next position. For each entry in the table, the three gain values $K_p$, $K_i$ and $K_d$ are stored along with a velocity profile data pair, including a position coordinate and a time coordinate. These five data identify the desired position and control state that is desired in each region or range between the raised position and the transition position. A velocity verses time profile is implicit in the specification of the position coordinates. A separate table may include the gain values $K_p$, $K_i$ and $K_d$ that are used during normal harvesting operations. Each entry in this table includes a vehicle speed and the associated values of $K_p$, $K_i$ and $K_d$ are used for PID control of the valves at that speed.

Figure 4:
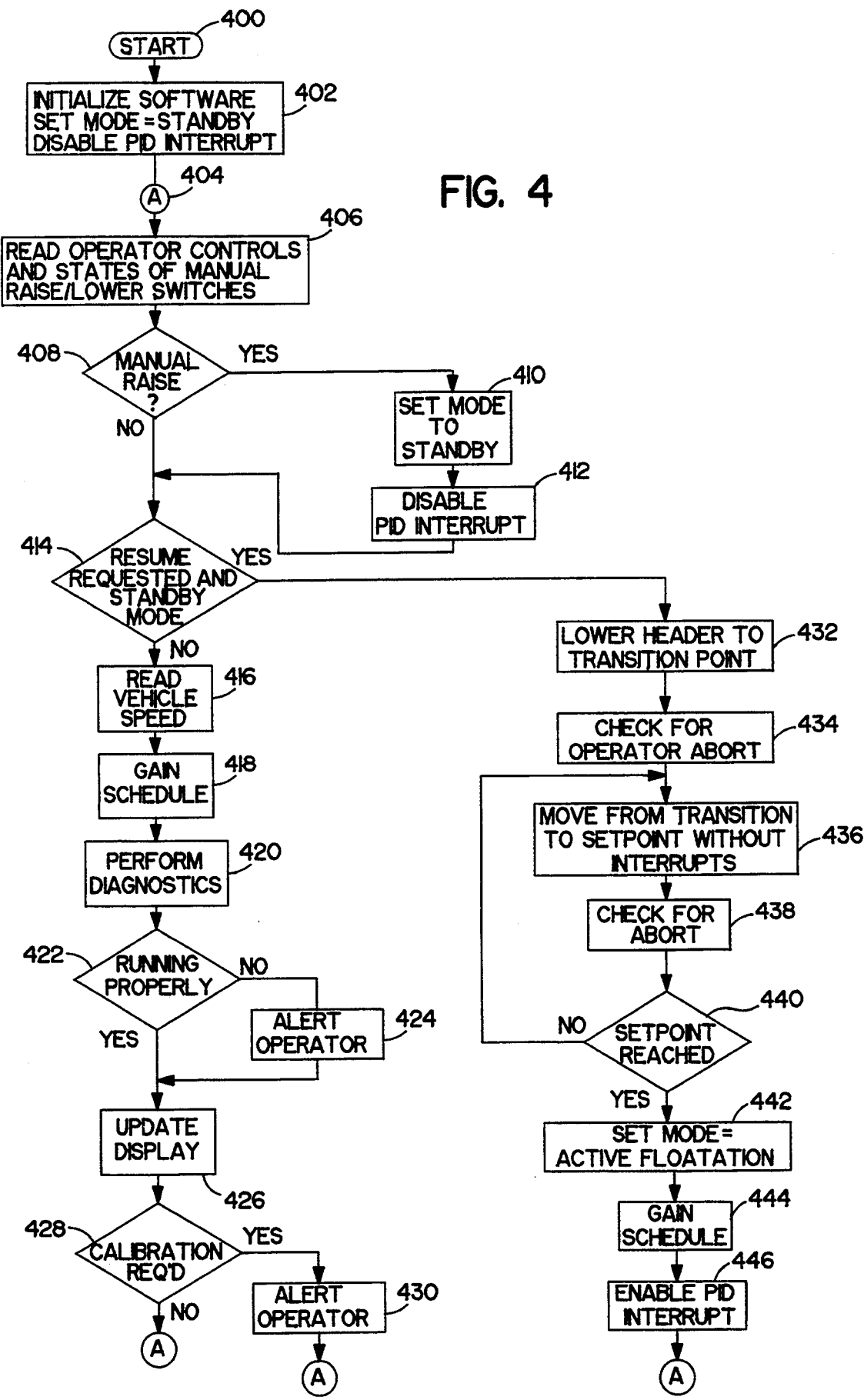
FIG. 4 is a flow diagram showing the functions performed by the floatation control system shown in FIG. 2A.
Figure 5:
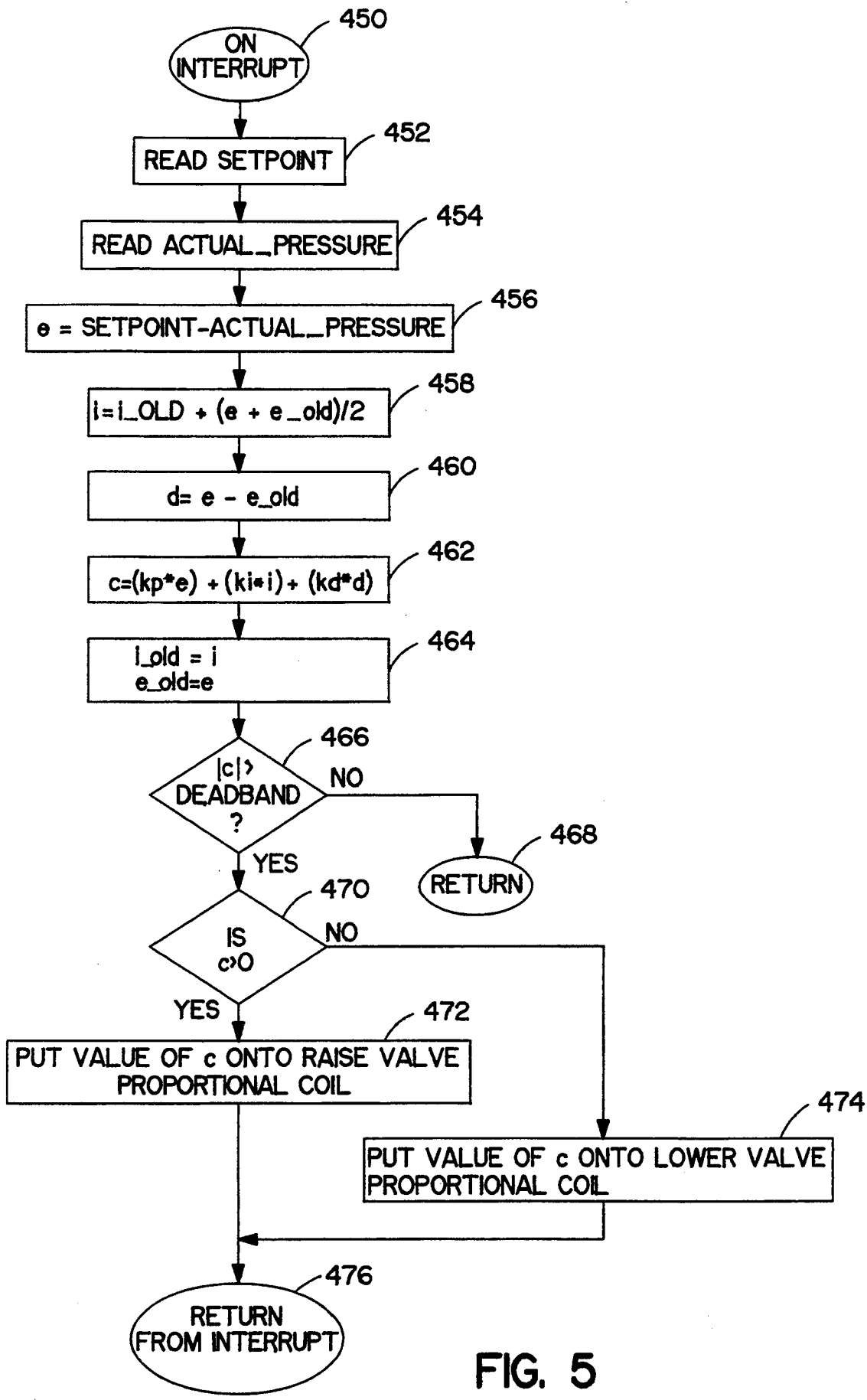
FIG. 5 is a flow diagram of the PID control function of the control system shown in FIG. 3.

The floatation control function 250 is shown in detail in FIGS. 4 and 5. FIG. 4 is a flow chart of the floatation control function steps which update the operator display, sample the operator controls, sample vehicle speed and modify the PID parameters based on a gain scheduling technique. The flow chart also shows how calibration mode may be entered, mode switching occurs and diagnostics are executed. In the exemplary embodiment, the steps are implemented in software and executed in a microprocessor 262. These steps may also be implemented in dedicated hardware or firmware.

Referring to FIG. 4, at step 400, the system is started. At step 402, the control loop is activated. The mode is set to standby and the PID control interrupt is reset. At step 406, the settings of the operator controls and manual switch 218 settings are read. At step 408, if the operator initiates a manual header raising operation, than control is switched to standby mode at step 410, and at step 412, the PID loop interrupt is disabled, if previously enabled.

At step 414, if the operator initiates the resume function to return from standby mode to active floatation control, step 432 is performed. At step 432, the header is lowered to the transition point for floatation control, which is preferably the point at which the header 202 first touches the ground 220 (i.e., where the entire header 202 weight is counterbalanced by the hydraulic system). At step 434 a check is made to determine whether the operator has aborted the resume operation before continuing.

At step 436, the header is lowered between the transition point and the setpoint. After a short predetermined interval, a further check is performed to determine whether the operator has aborted the operation, at step 438, and the height of the header is compared to the setpoint value at step 440. At step 440, if the setpoint has not been reached, then steps 436 through 440 are repeated until the setpoint is reached.

At step 442, once the desired (setpoint) effective force between the header 202 and the ground 220 is achieved, the control mode is switched to active floatation. While in the active floatation mode, the pressure in cylinder 206 is regulated to keep the force between the header and the ground constant. The details of the PID control in this mode are discussed below with reference to FIG. 5.

Figure 21:
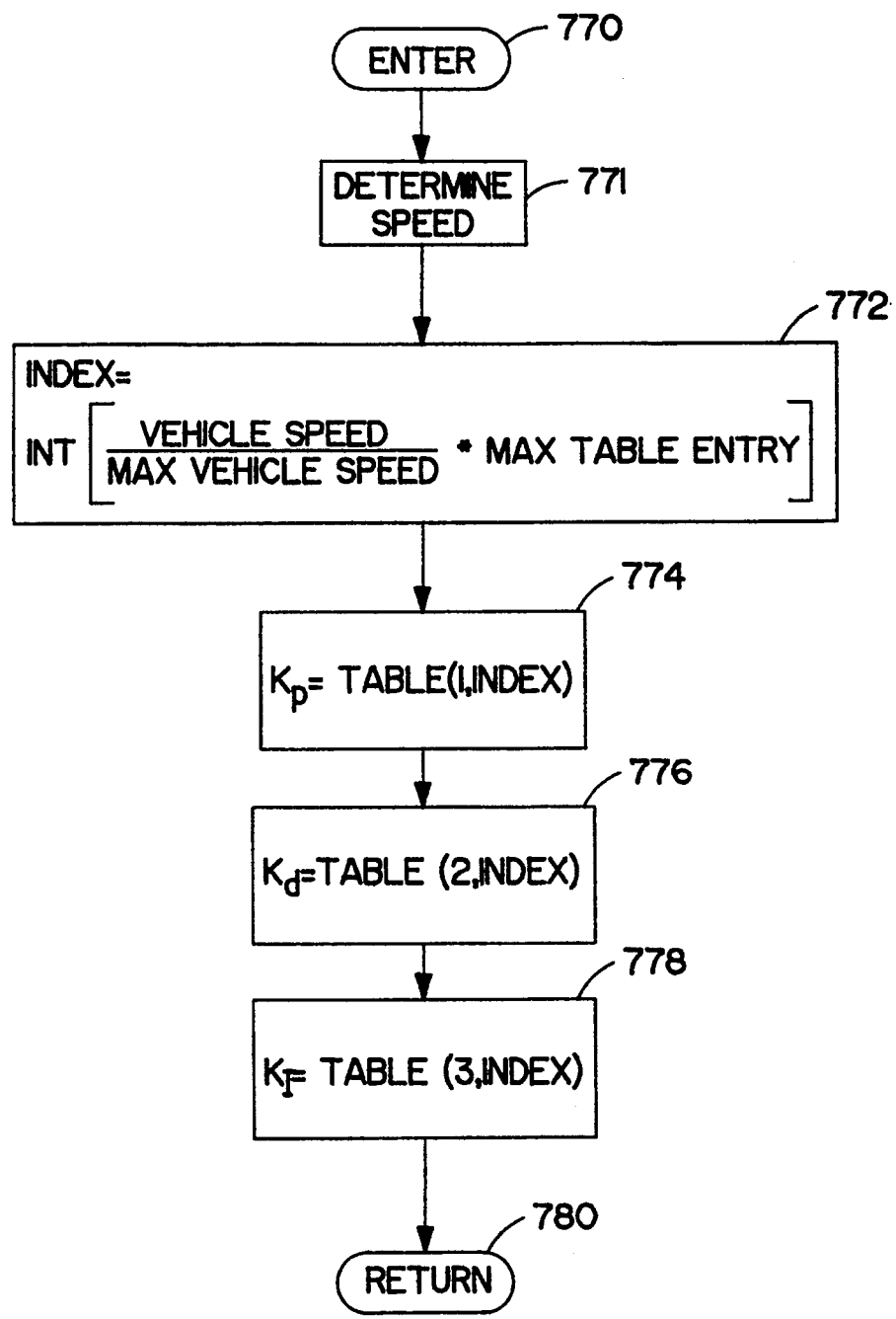
FIG. 21 is a flow chart of the exemplary method for varying PID coefficients as a function of vehicle speed in the PID function shown in FIG. 2B.

At step 444, a gain schedule operation is performed. The gain schedule operation adjusts the gains used in the PID control, i.e., the constants Kp, Ki, and Kd by which the respective proportional, integral and derivative components of the pressure corrections are multiplied. These constants are changed when the speed of the harvester changes. The details of the gain schedule operation are shown in FIG. 21. In the exemplary embodiment of step 444, a table of values for Kp, Ki and Kd is maintained in a memory. When the gain schedule operation is performed, at step 771, the harvester 200 speed is determined from the speed signal 210 from the harvester's transmission (not shown). A set of values for Kp, Ki and Kd is associated with each harvester speed range. At step 772, an index value is computed, representing the speed of the vehicle, as a fraction of the maximum vehicle speed, and multiplied by the number of speed ranges. The table includes three constants, Kp, Ki and Kd for each value of the index. At step 774, Kp is read from the table. At step 776, Kd is read. At step 778, Ki is read. It is understood by those skilled in the art that other gain scheduling algorithms may be used in accordance with the invention, to best match the response time of the system to the current operating conditions.

Referring again to FIG. 4, at step 446, the PID interrupt is enabled. In the exemplary embodiment, a timed interrupt causes execution of the code implementing the pressure regulation loop. As shown in FIG. 5, the timed interrupt may occur every 25 ms. At each interrupt, the steps beginning with step 450 through 476 are executed. After step 446, step 406 and the subsequent steps are executed (or repeated, if previously executed) in a loop fashion with the interrupt operation in the background.

At step 414, if the system is already under active floatation control, then steps 416 through 430 are executed. At step 416, the harvester speed is determined. At step 418, the PID constants Kp, Ki and Kd are adjusted, as in step 444. At step 420, hardware status is checked. At step 422, if an irregular condition is detected, the operator is alerted at step 424, and the system shuts down in the event of a catastrophic failure such as the loss of a sensor. At step 426, the display is updated. Similarly, at step 428, if a calibration is required, the operator is notified at step 430.

FIG. 5 is a flow chart of the linear control loop that is repeated when the PID interrupt is enabled at step 446 of FIG. 4. At step 450, each time the loop is executed, the program obtains the set point value from a memory 240, at step 452. This digital register may be a memory location or a memory mapped register connected to an A/D converter 238 and a potentiometer. A variety of methods my be used to input the set point to the program. In the exemplary embodiment, the operator selects the setpoint.

At step 454, the program reads the actual pressure at the port of cylinder 206. This may be a memory mapped register 240 connected to an A/D converter 238 and an analog pressure transducer 232. Alternatively, signal processing my be performed on the data from the register. Those skilled in the art will understand that more than one reading my be taken to ensure that a register is not changing at the exact instant that the data are sampled. Additionally, a digital filter (not shown) or averaging technique may also be utilized. Furthermore, the filtering may utilize processed data from a previous execution of the code.

At step 456, the error signal, e, is computed as the difference between the set point and the actual pressure. At step 458, the error signal is integrated utilizing a trapezoidal integration method. Other integration approximations could also be used, but the trapezoidal scheme provides the same stability and instability mapping between the s-domain and z-domain and makes analysis of the system easier. At step 460, the derivative of the error signal is computed. At step 162, the control signal, c, is computed from the error, the integral i and the derivative d.

As previously indicated, the constants Kp, Ki and Kd may be updated at steps 418 and 444 shown in FIG. 4, to match the control loop responsiveness to the vehicle speed. At step 464, the values of the integral component and the error component are stored for use when the PID interrupt is again processed.

At step 466, the system verifies that the magnitude of the control signal c is greater than some predefined deadband. If so, the control signal, c, is applied to the proportional pressure control valves at step 472 or step 474. If not, then at step 468, then no correction is applied. It is understood by one skilled in the art that the deadband value should be small enough so that the header counterbalance force does not vary widely, but large enough so that the hydraulic valves are not continuously open.

At step 470, in the case of a positive error, an input signal representing the value of c is provided to the raise valve 118 (shown in FIG. 2A), and the raise valve is opened to admit fluid under pressure into cylinder 206. Otherwise, at step 474, a second input signal representing the value of the correction signal is placed on the lower valve's coil, to release fluid to tank. To produce the input signal and second input signal from the value of c, the value may be directly placed into a memory mapped register which is coupled to a D/A converter. The output signal of the D/A converter is provided to a power amplifier. Alternatively, the value of c may be converted into a pulse duration and then fed into a timer/counter register in order to generate a voltage Pulse Width Modulated signal that drives the coils.

As described above, the exemplary embodiment of the header floatation system 250 includes a closed loop system in which the pressure in cylinder 206 is regulated to a setpoint value. A pressure transducer 232 connected to the cylinder port is used as the feedback device. There is a inverse relationship between the pressure applied to cylinder 206 and the effective weight of header 202 on the ground 220. As the pressure is increased, the effective weight of the header on the ground is reduced until the header begins to raise and ground contact is lost.

An alternative sensor 248 (shown in phantom in FIG. 1A) which directly measures the effective weight of header 202 may alternatively be used. Sensor 248 measures the effective weight of header 202 directly. Sensor 248 may be a commercially available "Draft Pin" at one of the pivot points associated with the four-bar linkage, between members 228 and 230. Draft pin 248 comprises a stiff rod (not shown) and an arrangement of strain gauges (not shown). The strain gauges are arranged so that a force applied to the draft pin is resolved in a particular direction.

Draft pin 248 is arranged so that it resolves forces in the vertical direction, corresponding to the position of the linkage at which header 202 makes ground contact. With draft pin 248 aligned to the vertical, its output signal indicates the combined weight of header 202 and feeder house 204 with respect to the frame 224 of harvester 200, which is mechanical ground. Thus the output signal of draft pin 248 provides the effective weight of header 202 and feeder house 204 on the ground 220. An exemplary draft pin suitable for use in the invention is the Bosch 830-304-03 draft pin. Other draft pins may also be used.

Because motion of the four-bar linkage 224, 226, 228 and 230 causes the forward pivot point to arc, the alignment of draft pin 248 with respect to the absolute vertical may change as cylinder 206 extends or retracts. However, over the operating range of floatation (i.e., header making ground contact), this alignment error is small. The resulting force resolution error is also small and provides the desired weight measure within acceptable error bounds.

In the exemplary embodiment, the four bar linkage includes four members 224, 226, 228, and 230 on the right side and four additional similar members (not shown) on the left side. Due to the actual implementation of the combine's four-bar linkage, it a second draft pin (not shown) are used on the left side of feeder house

204. Because the header may not be perfectly balanced, a combination of the signals from the draft pins (such as by averaging) may be used to determine the effective weight applied to the ground.

It is possible to more accurately control the effective force of header 202 on the ground 220 by using sensor fusion techniques. Sensor fusion of both the pressure transducer 232 and the combined draft pin 248 may be accomplished in a variety of ways.

In the simplest method, the effective weight on the ground is determined from the pressure transducer signal and empirical data relating to the value of the pressure at the point of perfect counterbalance, according to equation (4).

Effective Wt=(Pressure at Counterbalance Point−Cylinder Pressure)*cylinder area.  (4)

This value of "Effective Header Weight" is then averaged with the effective weight value obtained from the draft pin sensor(s) 248. This averaged signal is then used to regulate the pressure control loop.

More sophisticated combination techniques based on the variances of the two transducers may also be used. Those familiar with these techniques will understand that the optimal combination (ys) of two independent estimates (y1 and y2) with corresponding error covariances (P1 and P2) is given by equations (5) and (6).

$$y_s = P_s*[P1^{-1}*y_1 + P2^{-1}*y_2] \quad (5)$$

$$P_s = = [P1^{-1} + P2^{-1}]^{-1} \quad (6)$$

It is also possible to consider a variety of multiple input control strategies as a form of sensor fusion. One possibility is to use the pressure transducer 232 for feedback to close an inner loop and to form an outer loop closed by the feedback signal from draft pins 248.

Floatation with Lateral Tilt

In some conditions, the ground beneath the header malt be laterally tilted relative to the frame of the harvester, as shown in FIG. 9. While it is conceptually possible to use an active lateral tilt control function in combination with floatation control, such a system presents major control problems. This is due to the fact that with floatation control the header is always in contact with the ground. Thus, active rotation of the header could produce reactive forces on the harvester 200 and the ground which are detrimental to the harvesting process and/or operation of the harvester 200. Additionally conventional field tracker sensors would be of limited utility, and more expensive position sensors would be needed.

A unique and novel solution to include lateral tilt with floatation is based on using a passive control method for the rotation of the header when the floatation control is activated.

As described above, floatation provides a counterbalancing force on header 202 so that the effective weight applied to the ground 220 is controlled. Since header 202 does not contact the ground over its entire length, certain "high spots" are the points of contact. In fact, if the ground is sloped with respect to the header then it is possible that only one side may make contact. While floatation controls the force applied to the ground by sensing the pressure in cylinder 206, the distribution of force on the ground is controlled by the area of contact.

It is desirable to maximize the area of contact by positioning the header to be as parallel to the contour of the ground as possible, thereby covering the largest possible area.

FIG. 9 shows additional apparatus for controlling the lateral tilt of header 202 with respect to frame 224. Lateral tilt 256 provides an extra degree of freedom to header 202 in that instead of header 202 being rigidly fixed to the feeder house 204, header 202 is attached with a rotary joint 260 so that it can rotate/pivot in the transverse (perpendicular to direction of travel) direction. A three position control valve 162 controls the flow of fluid to neither or one of two cylinders 166 and 168. Two cylinders 166 and 168 may be used, one cylinder on each side of the header pivot joint 260, as shown in FIG. 9. In an alternative configuration (not shown), a control valve may control the flow of fluid to both sides and of a double actuating cylinder.

As shown in FIG. 9, the displacement of each cylinder 166 and 168 determines the tilt angle of header 202 with respect to frame 224. In one position of valve 162, cylinder side 166 is coupled to pressure and cylinder side 168 coupled to tank, tilting header 202 clockwise. In a second position of valve 162, cylinder side 166 is coupled to tank and cylinder side 168 is coupled to pressure, tilting header 202 counterclockwise.

When lateral tilt 256 is activated in conjunction with floatation control 250, Lateral tilt signals power switch 292 (shown in FIG. 2A) to actuate valves 288 and 290 to their open positions, while valve 162 is moved to the neutral position. When valve 162 is in the neutral position and valves 288 and 290 are open, the valve 162 associated with rotating the header is said to be in the hydraulic float mode. An optional small accumulator 289 may be included in the circuit.

If valve 162 is in the third position and the pilot valves 288 and 290 are activated, the header is free to pivot. Both cylinders 166 and 168 are coupled to tank, and header 202 self levels as the harvester 200 moves over the field with floatation activated. This occurs because the forces exerted by the ground provide torques about the header rotation point 260, which will in turn cause rotation and the self alignment of header 202 with the ground. The degree of self alignment depends on the friction associated with the pivot 260. Preferably, bearings which minimize friction are used.

Operation of floatation with passive lateral tilt uses additional logic for changing to standby mode and the resume function. At the end of the row, when the raise switch (not shown) is actuated, the cylinders controlling lateral tilt should be locked to prevent rotation of the header as it is raised. Locking is accomplished by closing pilot valves 288 and 290, and keeping valve 162 in the neutral (center) position. An additional control loop may then be used to level header 202 relative to the machine frame 224. Valve 162 is activated to apply fluid to either cylinder 166 or 168, until header 202 is level. Valve 162 is then returned to its neutral, or locked, position. This ensures that header 202 is in a known position for transport and also provides a good starting point for returning to lateral tilt. When the resume function 294 is activated, header 202 lowers as previously described. As soon as the header contacts the ground, both cylinders 166 and 168 are once again placed in the hydraulic float mode thereby enabling the passive lateral tilt function.

If floatation control and lateral tilt control are used, header 202 rotates with respect to feeder house 204. In the alternative embodiment in which a draft pin 248 is used to measure effective header weight, lateral tilt will require the use of two draft pins, as well as a signal defining the rotation of the header with respect to the frame of the machine. By utilizing geometric and force relationships of a simplified model, the effective weight of the header on the ground may be determined.

Stubble Height Control

Stubble Height Control maintains a fixed angle of the feeder house 204 with respect to the frame 224 of the machine 200. This control action maintains a fixed cutter bar 242 height relative to the frame 224 of harvester 200. It also maintains a fixed header height relative to the frame 224.

Referring again to FIGS. 1A and 2A, the closed loop position control system 252 in conjunction with the header's proportional raise/lower valves 118 and 120 maintains the angle 251 of feeder house 204 to the frame 224 constant. The resulting kinematics of the four bar linkage arrangement 224, 226, 228 and 230 define the vertical position of header 204 or cutting bar 242 with respect to the machine frame 224. FIG. 1 shows the position of the transducer 234 that measures the angle 251. The stubble height control function 252 of AHCS 216 provides stubble height control using the same hydraulic system to raise and lower header 202 as is used with floatation control function, and described below.

Stubble height control 252 provides a wide range of height control since the sensor 234 attached to the pivot is rotary in nature and can measure the full operating range of the pivot. The cutting bar 242 is positionable both at relatively high and low levels with respect to the frame 224.

According to an aspect of the invention, stubble height control 252 regulates the linkage angle with respect to the machine. In a typical application, the operator raises header 202 at the end of a row, before moving harvester 200 to the beginning of the next row. If it is desirable to maintain the cutting bar 242 above the ground level or near the usable portion of the crop (such as when the ground or stalks are wet) it is important for the operator to quickly return the header to the cutting position once the harvester 200 is aligned to cut the next row. Stubble height control 252 provides a "memory function". When the operator actuates a resume switch (not shown) the control system repositions the header.

A secondary advantage of stubble height control 252 is that the closed loop nature of the system minimizes height variations due to inertial loading as harvester 200 moves over rough terrain. As compared to the conventional implementation, stubble height control 252 immediately detects and compensates for variations in header height relative to frame 224 due to reactive forces encountered as the combine moves across the field. In the present invention, the accumulator 207 (shown in FIG. 16) still provides the spike suppressing function, but the naturally resulting motion of the header that occurred in prior art systems is suppressed in the present invention.

Figure 6:
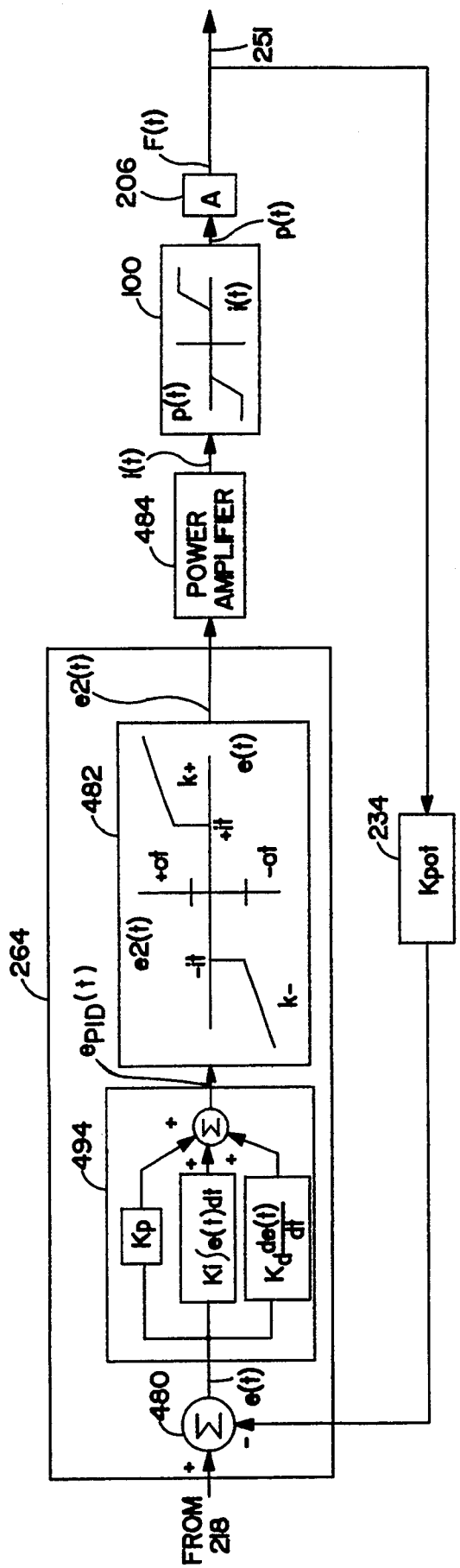
FIG. 6 is a block diagram of the stubble height control function shown in FIG. 2A.

FIG. 6 shows a closed loop position control for regulation of stubble height. Preferably, function 100 is a pressure control valve assembly. This allows the same control valve assembly 100 to be used with both floatation control and stubble height control. It is understood by those skilled in the art that the regulation of stubble height is not limited to the use of a pressure control valve and may use any type of proportional valve such as a proportional flow control valve. If a proportional flow valve is used, the input signal to valve assembly 100 (e.g., a current signal) controls the flow through the valves. This flow in turn produces a velocity in cylinder 206 which causes movement of header 202. For flow valve applications, the amplifier function 488 and coupling linkages 490 are modified appropriately.

The system includes a summing junction 480 which receives the position signal from transducer 234 and generates a position error signal e(t) by subtracting the measured position of feeder house 204 from the setpoint (or desired stubble height). The position error signal is applied to a PID compensator 494. The use of the PID compensator 494 allows more control over stability, transient response and increases the system type due to the inclusion of a integrator. The PID compensator 494 is of the analog variety. Its operation and tuning are well known to those skilled in the art. The output signal $e_{PID}(t)$ from the PID compensator is input to a deadband function 482. The deadband function 482 produces an output signal if e(t) is greater than the positive input threshold, (+it) or less than the negative input threshold, (−it). Thus certain values of e(t) do not cause any action by the control loop. The output of the deadband function 482 is described by equations (1), (2) and (3), set forth above. The constants and gains used for stubble height control are different from those used when controlling cylinder pressure for floatation control function.

Equations (1) through (3) define an error band of position between $\Theta(t)$ and the position of stubble height setpoint 480 that does not cause the system to respond, but also ensures that the proportional pressure control valve 100 receives the proper control current in the event that the deadband is exceeded. Power amplifier 484 converts e2(t) into the correct current to operate the proportional hydraulic valves. Gain function 488 is associated with the physical dimensions of the header cylinder, and converts cylinder pressure, controlled by the valve 100, into a force, F(t). Force F(t) is applied to the load dynamics and coupling linkages 490 (i.e., the four bar linkage, feeder house, bearings and header components). A feedback transducer 234 senses the actual position of the feeder house angle 251 and converts the angle into the appropriate units for use with the summing junction.

The stability and response of a control loop is influenced by the parameters of the plant. In this case the plant consists of the linkages 490, and the dynamics associated with the feeder house 204 and header 202. Conventional methods of stabilization include but are not limited to the use of PID, Phase-Lead, Phase-Lag or velocity compensation techniques. A velocity signal may be obtained from a velocity sensor attached at the position monitoring point or by other appropriate means.

As is the case for the system shown in FIG. 3, the control loop shown in FIG. 6 may be implemented in a variety of ways. Typically, analog hardware, dedicated digital hardware or a computer or micro controller can be used to 'close the loop' with the appropriate interfaces to control the valve coils, and input the set point and feedback pressure signals. In the exemplary embodiment, the stubble height control logic is implemented in software and executed in a processor 262. The power amplifier 484 could be implemented as a voltage to current converter using commercially available power operational amplifiers or could itself be implemented as a closed loop control utilizing pulse width modulation techniques to convert a voltage into a current in the coils of the valve assembly 100. Additionally, a dither signal may be introduced as part of amplifier 484 to minimize friction in the valves.

Figure 7:
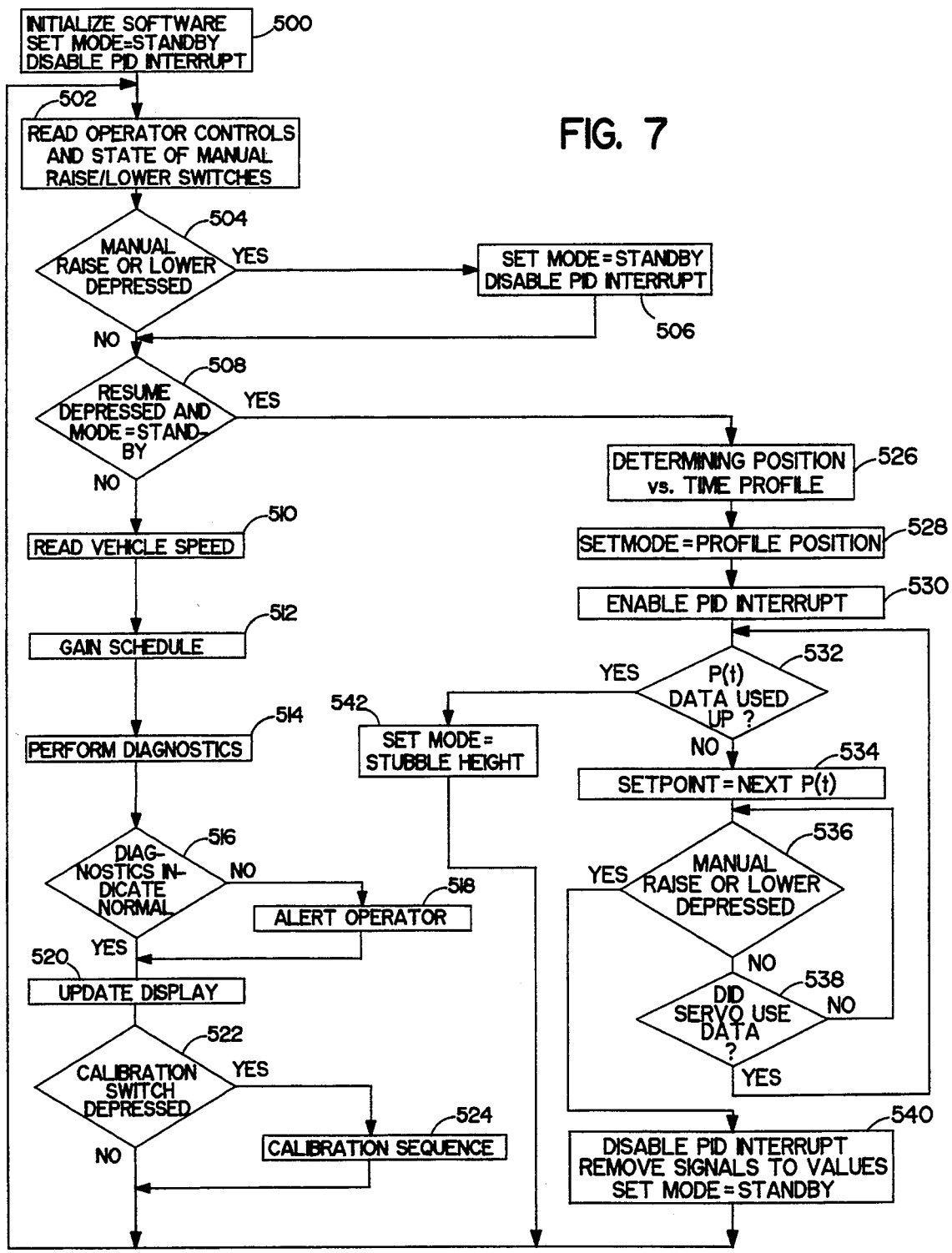
FIG. 7 is a flow diagram showing the functions performed by the stubble height control system shown in FIG. 2A.

FIG. 7 is a flow chart showing an exemplary embodiment of a main loop which updates the operator display, samples the operator controls, samples vehicle speed and modifies the PID parameters based on a gain scheduling technique. The flow chart also shows how a calibration mode may be entered, how mode switching occurs and diagnostics are executed.

Stubble height control 252 has three modes of operation. Standby mode occurs when the servo loop is disabled and only manual controls are operational. Stubble height mode defines when the servo loop uses the stubble height as its set point. This is the mode which is operational as the harvester 200 moves over the ground 220. The profile position mode is a transition mode that is entered by actuating the resume switch (not shown). In this mode the control system 216 transmits position versus time profile points as set points to the servo loop and controls the lowering (or raising) of header 202 to the last stubble height setpoint. Once the setpoint is achieved, the mode is automatically returned to the stubble height mode. If the operator aborts the profile position mode by actuating the manual raise or lower switch, the standby mode is entered.

Referring to FIG. 7, the main polling loop of stubble height control 252 includes the major steps 502, 504, 508, 510, 512, 514, 516, and 520. At step 500, the system is started up and standby mode is entered. At step 502, the operator control values are determined. At step 504, if a manual raise or lower operation has been commanded, then at step 506, the mode is set to standby and the PID control is discontinued. At step 508 the system determines whether to initiate the resume function from the standby mode. If not, then at step 510, the harvester speed is determined. At step 512, the PID gains are adjusted. At steps 516 diagnostics are run. At step 520, the operator display is updated to reflect the diagnostic results.

Step 518 is executed if a diagnostic failure occurs. In this event the system notifies the operator, and shuts down the system in the case of a catastrophic failure such as the loss of a sensor. The loop consisting of steps 526, 528, 530, 532, 534 and 536 (the resume function) performs the switch from standby mode, to profile position mode to stubble height mode. When the resume switch (not shown) is actuated, the algorithm of function 526 determines a set of position versus time data which implicitly include information relating to the jerk, acceleration and velocity that the feeder house will experience. These position versus time data are fed as a stream of set points to the PID servo control loop.

At step 528, the mode is set to profile position mode. In this mode, the position verses time p(t) data are used as the "setpoint" values. Each time the PID interrupt loop (steps 532, 534, 536 and 538) is executed, the "setpoint" changes. A test is made at step 532 to exit the automatic lowering of the header and return to Stubble Height mode. At step 532, the system determines whether there are further p(t) data. If not, the mode returns to stubble height control at step 542. If there are further p(t), at step 534 the next datum is used. At step 536, if the operator has not aborted the operation by starting an manual operation, the height is checked to determine whether header 202 has reached the current p(t) "setpoint" yet. When the current p(t) position is reached, then step 532 is repeated. Step 538 is used to synchronize the position data stream with the servo update rate so that data arrive at the correct time (i.e., at each interrupt).

A continuous polling of the manual raise/lower switch at step 536 is required for safety considerations, in the event that the operator uses the manual raise or lower switch the system falls back into standby mode and the header is stationary. This is accomplished at step 540.

Figure 8:
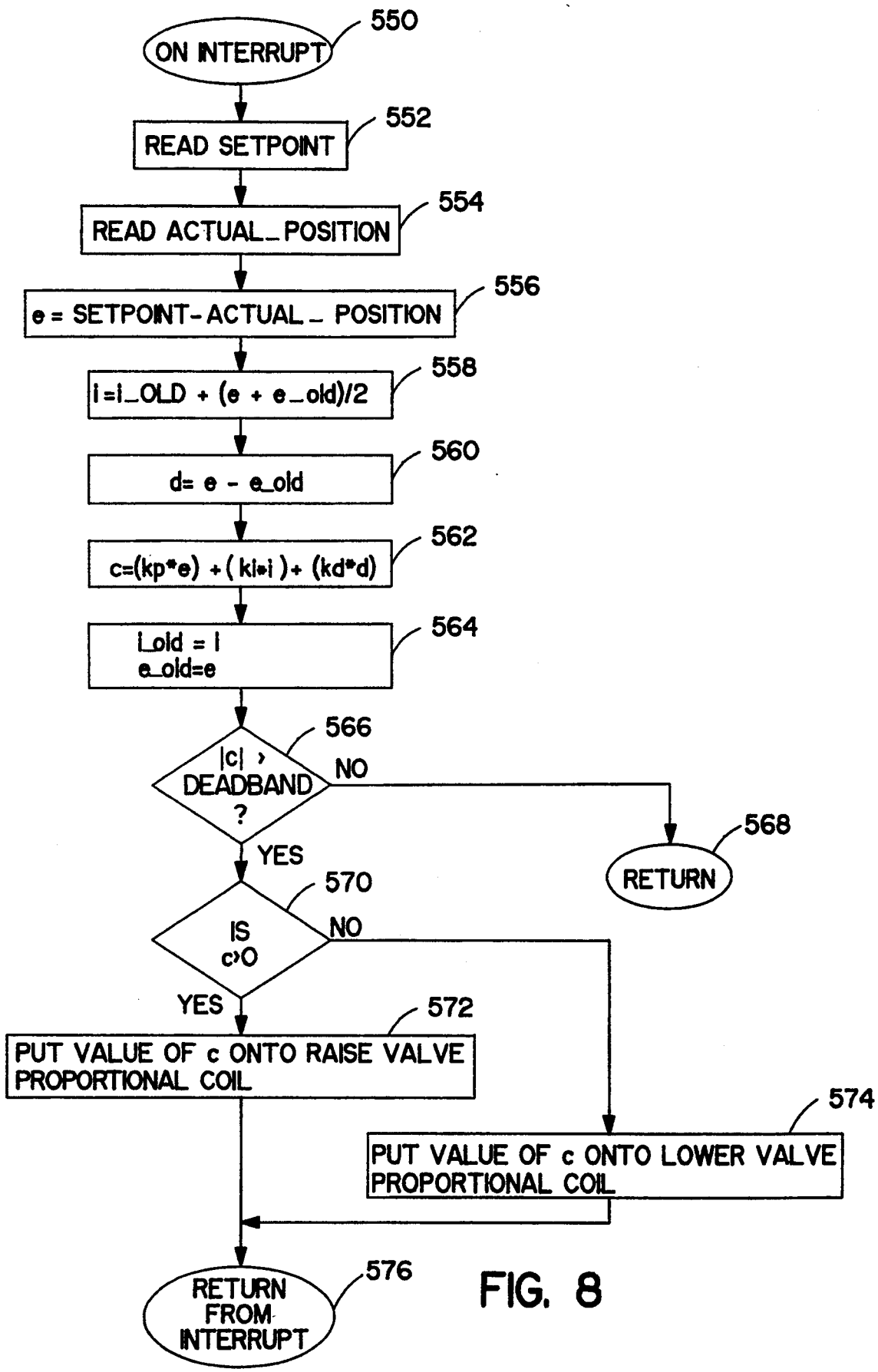
FIG. 8 is a flow diagram of the control system shown in FIG. 6.

FIG. 8 is a flow chart of the control loop that is repeated when the PID interrupt is executed. The control method for stubble height control is nearly the same as the PID method shown in FIG. 5. The only differences are: in step 552, the program reads a position setpoint from the operator panel 218; at step 554, the actual feeder house position is read via the feedback transducer 234 (a potentiometer), instead of the cylinder pressure, as shown in step 454 in FIG. 5; and at step 556, the error is calculated as the difference between the setpoint and the feeder house position. The rest of the description of FIG. 5 applies to FIG. 7 as well.

A resume function is provided between a raised header position and active stubble control. This function is similar to the resume function used with floatation control, as discussed above with reference to FIG. 4. Specific differences exist between the floatation resume function and the stubble height resume function. These differences relate to the transition point and use of a position control loop to profile the header position from the raised position to active stubble height control.

As previously discussed, typical operation of an agricultural machine (such as a combine) includes raising the header at the end of a row of crops so that the machine can be positioned for operation at the next row. Raising of the header is accomplished by the operator depressing the manual raise switch. The overall control system senses this switch closure and immediately goes into a standby mode in which the position control loop associated with stubble height control is deactivated. Once the machine is positioned properly at the next row, the operator actuates the resume switch (not shown) to signal the control system that the header should be automatically lowered to the correct height and the stubble height control 252 is reactivated.

The transition from stubble height control to standby as soon as the header is manually raised is accomplished using the manual override capability of the control system (see step 506 of FIG. 7). The automatic drive electronics 40 in AHCS 216 senses the operator's action by means of the voltage sense line and, deactivates the stubble height control loop 252. All automatic signals to the valves 118 and 120 through the coil drivers are deactivated. Thus valve 118 and 120 control is only performed by direct wired manual switches 218.

Transitioning smoothly back into stubble height control from the raised header height is discussed in the following section. The feeder house feedback potentiometer 234 measures one of the angles 251 of the links comprising the four bar linkage 224, 226, 228 and 230. There is a nonlinear but monotonic relationship between angle 251 and the actual header height. A linear function is formed to relate the potentiometer output signal to its input signal near the nominal operating point (i.e., the desired stubble height). A position, approximately 4-6 inches (10-15 centimeters) above the nominal stubble height operating point is defined as the transition point from header lower to stubble height control. For stubble height control, the exact location of the transition point is not critical as long as it is above the desired setpoint, so a value of 1 inch above the desired setpoint works equally well.

Once the operator actuates the resume switch (not shown), the controller 264 in AHCS 216 lowers header 202 at a predetermined rate until the transition point is reached, at which point the stubble height control function 252 is enabled. The closed loop position system 252 then controls lowering of header 202 further and regulating the linkage angle 251 with respect to frame 224.

A variety of solutions exist for the controlled lowering of the header. In proportional valves (such as valves 118 and 120 in the exemplary embodiment), the flow rate is controlled by varying the current to the pilot 120. If desired, the stubble height control 252 may be used to control the position of feeder house 204 with respect to time. The actual speed of lowering is controlled by applying a desired set of position versus time commands to the position loop 252. This implicitly defines a velocity profile and controls the descent of the header.

The position data may be stored in the memory 140 in the form of a look-up table having respective pairs of position coordinates and time coordinates. In this case, time is measured relative the when the operator activates the resume function; and position is measured relative to the height of the header when the resume function is activated (as opposed to the maximum header height).

An alternative method is to compute the position by performing numerical integration digitally in real time. For example, if the jerk function J is to be controlled so that there are no impulses in the jerk function, then the acceleration, velocity and position at any discrete time N are approximated by equations (7) through (9).

$$ACC(N) = ACC(N-1) + J(N) \tag{7}$$

$$VEL(N) = VEL(N-1) + ACC(N) \tag{8}$$

$$POS(N) = POS(N-1) + VEL(N) \tag{9}$$

where:
J = Jerk
ACC = Acceleration
VEL = Velocity
and
POS = Position.

Figure 22:
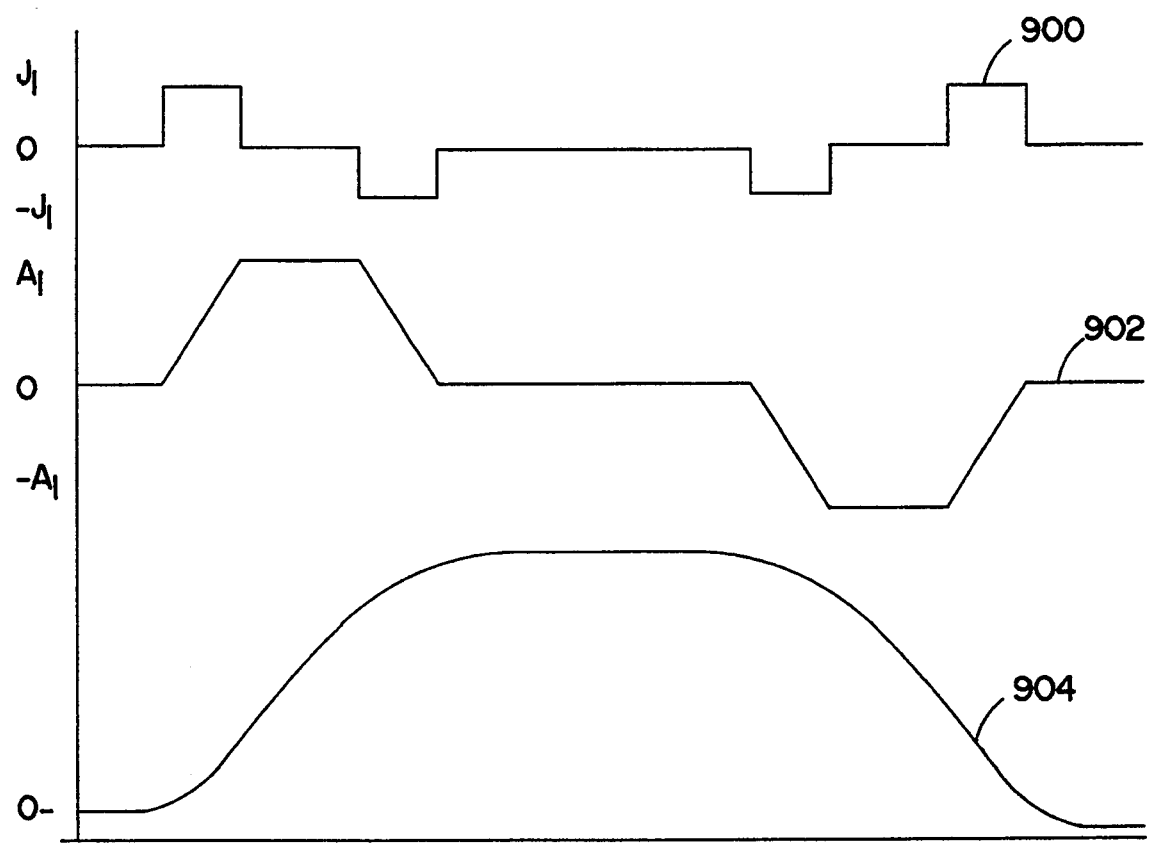
FIG. 22 is a timing diagram showing velocity, acceleration and jerk profiles over time.

An exemplary set of profiles for velocity, acceleration and jerk is shown in FIG. 22. Curve 902 shows the acceleration. The acceleration curve is continuous, with no step changes. This avoids any impulses in the jerk function. The resulting jerk curve 900 is finite at all times. By limiting the changes in the jerk function 900 to finite step changes (no impulses), smooth operation is assured. The velocity profile 904 is also shown.

If equations (7) through (9) are used, equation (7) is exact, while equations (8) and (9) have errors due to the omission of higher order polynomial terms. These errors are small if the integration rate is fast. Alternatively, the error terms may be included, at the expense of requiring more time to complete the integration for each point in the profile.

The position profile can implicitly limit the jerk function and therefore guarantee smooth velocity and acceleration of header 202. This approach can also drive header 202 from its actual position at the raised height to the desired height corresponding to the nominal operating point, without use of a transition point (i.e., without changing to stubble height control before the setpoint is reached). Using these actual end points also reduces the time to perform the resume function since variations in the header velocity are automatically taken into account by the position profile.

One alternative method incorporates a fixed orifice (not shown) into the design of the lower valve (not shown) to control the flow rate and the speed. Alternatively an open loop scheme may also be suitable.

While header 202 is lowering, controller 264 in processor 262 constantly monitors the feeder house potentiometer signal 208. Once the transition point is sensed, the signal that keeps lower valve 120 open is deactivated and the stubble height control loop 252 is activated. Once the nominal control point is reached, the appropriate values of the control parameters Kp, Kd and Ki are then scheduled as a function of the speed of harvester 200.

The gains used to accomplish this transition smoothly may be gain scheduled into the PID algorithm, based on the fact that mode switching is in process. Thus the values of Kp, Kd, and Ki used to move from the raised position to the nominal stubble height setpoint position can be tuned for smooth operation and may be significantly different that those used for stubble height control while the combine is moving over the field.

System Calibration for Stubble Height

Calibration of the Stubble Height system is performed after the initial transducer 234 installation process. The calibration procedure includes determining the span or range of the sensor 234 with respect to its extreme values as defined by the particular header 202 installed on the harvester 200. Additionally ground contact at the counterbalance point is also defined. The calibration information for stubble height is also used for other AHCS 216 functions such as when returning header 202 from a raised position to active control using floatation, described above, or header height control 254 described below.

As previously indicated, the feeder house 204 pivot point is connected to a rotary position transducer 234. Transducer 234 may be a potentiometer, incremental optical encoder with reference pulse (index pulse), absolute optical encoder, rotary LVDT or any other of the many available rotary encoding units. Alternatively a linear potentiometer 253, as shown in FIG. 1B (or other type of transducer) may be connected to frame 224 of harvester 200 and used to measure the distance that feeder house 204 moves with respect to frame 224. The feeder house angle 251, and thus the header height relative to the frame 224 of harvester 200, is calculated based on the feedback signal from transducer 253. The remaining discussion refers to transducer 234 as an absolute rotary position transducer, such as a potentiometer.

Transducer 234 is mounted on frame 224 of harvester 200 and its measuring shaft connected to feeder house 204 using a minimum backlash gear arrangement (not shown). For the initial transducer installation and calibration, header 202 is removed. This allows the angle 251 of feeder house 204 to move across its maximum range. The sensor shaft (not shown) is positioned so that the absolute movement of feeder house angle 251 with respect to the harvester frame is always within the absolute angle defined by the position transducer 234. That is, the feeder house range of motion is always within the transducer range. The sensor is connected so that an increasing voltage defines upward motion of the feeder house.

The values corresponding to feeder house fully lowered and feeder house fully raised positions are saved by the control system. These are bounding values and are used to define limit checks in automatic calibration procedures and may also be used define error conditions in diagnostic testing.

The objective of the calibration process is to define the range of transducer output corresponding to the particular header 202 that is installed on harvester 200. Each header has a different mechanical configuration which will typically change the actual range of motion. The possible range of header motion is bounded by the interval between the feeder house fully lowered and feeder house fully raised positions. There are two distinct position points for calibration with header 202 attached: upper limit of header motion and nominal header position on ground. As previously discussed the nominal header position on ground is used to define the transition point for mode switching (resume) to floatation control. Once header 202 is installed on harvester 200, the calibration sequence is initiated by the operator. The automatically assisted calibration sequence moves header 202 through its range of motion, from ground position to a fully raised position, and records the end points discussed above to calibrate transducer 234.

Preferably, valve assembly 100 includes a relief valve, so that at the upper limit of header motion, the relief function of the raise valve occurs. Then the hydraulic control system does not increase the applied pressure. The nominal header position on ground is the point at which the header is approximately counterbalanced, and exerts zero force on the ground.

Alternatively, the calibration sequence may be performed under manual control. For instance, the AHCS 216 is directed by the operator to enter calibration mode, and AHCS 216 queries the operator to demonstrate the two points. The operator manually raises header 202 to the upper limit of header motion (which may or may not coincide with the relief function) and then actuates a "learn" or "teach" or "record" switch. The controller 216 records the potentiometer 234 voltage corresponding the this point. Similarly, the operator can position header 202 so it just makes contact with the ground and identify this position as nominal header position on ground to the AHCS.

Header Height Control

Referring again to FIGS. 1A and 2A, for some crops, header height control is often preferred. Using header height control function 254, control system 216 actively controls the position of header 202 relative to the ground, at a lower height (e.g., less than 30 centimeters) than that for which stubble height control is used. This control strategy enables the header 202 to follow the contour of the ground at a fixed offset distance as the harvester moves over the field. Header height is maintained at an adjustable fixed distance relative to the average ground height. Since the cutting bar 242 is fixed to the header, use of header height control allows the operator to set the effective cutting height of harvester 200 at relatively small distances from the ground. Header height control maximizes the yield for low lying crops (such as soybeans).

The small distance between header 202 and the ground in the header height control mode permits the use of a variety of sensors for measuring header height, one of the least expensive types being the contact sensor 236, as shown in FIG. 1A.

Figure 10:
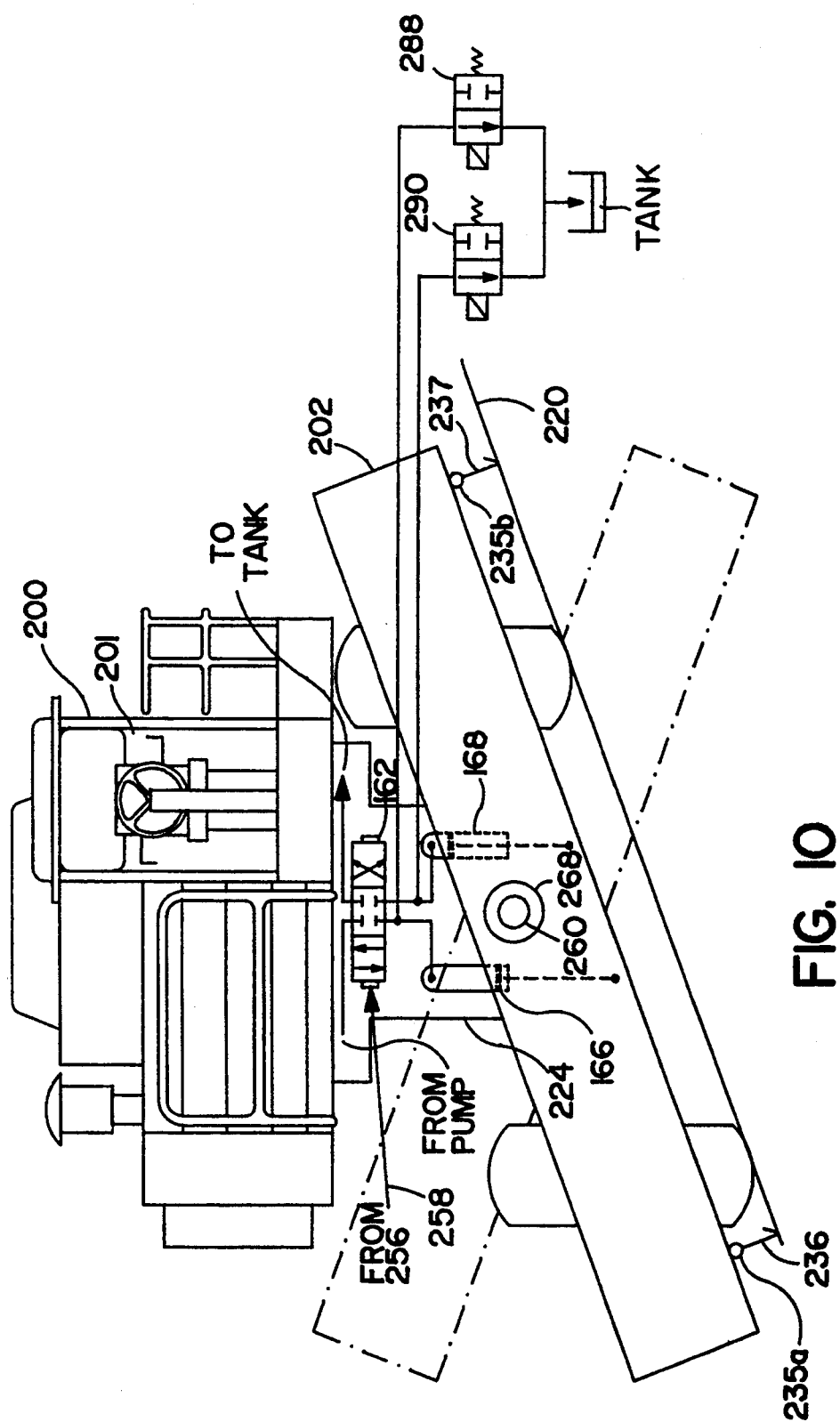
FIG. 10 is a front elevation view of the harvester shown in FIG. 2A, with header height and lateral tilt functions operating.

Referring to FIG. 10, header height control may be combined with a secondary control function, lateral tilt 256. Typically two hydraulic cylinders 166 and 168 are utilized to provide the force needed to rotate the header. As described above with reference to FIG. 9, lateral tilt, when operated in a passive mode, allows flow of fluid between two actuating cylinders 166 and 168 and tank. When combined with header height control, lateral tilt 256 operates in an active mode. Valve 162 applies pressure to one of the cylinders 166 (or 168), and couples the other of the two cylinders 168 (or 166) to tank, to rotate header 202 in the transverse direction. Once header 202 is rotated to the desired position, valve 162 is returned to its neutral (center) position, to maintain the header's rotational position.

In this active tilt control mode, as shown in FIG. 10, both of the floatation valves 288 and 290 are closed at all times, so that they do not provide a fluid path between either cylinder 166 or 168 and the tank. In the exemplary embodiment, floatation valves 288 and 290 are controlled electrically by AHCS 216. Control valve 162 is controlled by two separate proportional pilot valves 280 and 282 (shown in FIG. 17), which are in turn controlled by AHCS 216. There are no control pressure fluid couplings between valve 162 and either of valves 288 and 290; i.e., closing valve 288 and/or 290 does not provide a pilot pressure to actuate valve 162 from the neutral position to an open position.

In the third position, neither cylinder side 166 or 168 is coupled to pressure or tank, a neutral position. In the neutral position, the tilt angle of header 202 is substantially locked. This is useful when the header is manually raised (e.g., at the end of the row), so that the header does not pivot while being raised, and while using the resume function to return to active control.

Lateral tilt of the header may be used on both level-land combines and hillside combines. As shown in FIG. 10, harvester 200 is a hillside combine, in which the cab remains vertical, while the axles of the vehicle is oriented parallel to the ground. The application to hillside combines may be more useful in that the hillside combine is arranged so that the separator (not shown), grain tank (not shown) and operator cab 201 stay level while hydraulic cylinders (not shown) pivot the axles of the wheels. Due to this arrangement, it becomes preferable to pivot the header so that it can follow the slope of the ground.

Alternatively, lateral tilt with level-land combines allows the header to adapt to uneven ground. Generally this maximizes crop yield. For example, the length of the header may be on the order of 30 feet. The flatness of the ground at the wheels of the combine and that under the header's cutting bar may differ. The ground under the header may not be flat and may actually have a small slope or may drop off on one end. Lateral tilt allows the header to adapt to the angle that keeps each extreme end of the header at the same distance from the ground.

By using control signals from ground contact sensors 236 as shown in FIG. 1A (also called field tracker sensors), located on opposite ends of the header, the header is rotated to equalize the error signal from the left and right side sensors. This allows the header to both align itself with transverse variations in the ground and still maintain the appropriate cutting height. By using proportional electrohydraulic valves for both header height and optional lateral tilt, true closed loop PID control is achieved.

Sensors 236 and 237 include hoops connected to respective potentiometers 235a and 235b (shown in FIG. 10). This type of sensor only provides information when contacting the ground and at both the extreme points of contact does not provide any further usable signal. That is, when the header is fully on the ground, the contact sensor provides the same signal regardless of the counterbalancing force exerted on header 202 by cylinder 206. One skilled in the art understands that non contact (such as ultrasonic sensors etc.) may also be used in place of the contact sensors 236 and 237, but these may be more expensive.

Referring again to FIG. 2B, a header height function 254 within closed loop control system 216 is used in conjunction with the header's proportional raise/lower valves 118 and 120 to maintain the position of header 202 (or cutter bar 242) fixed relative to the average surface of the ground 220. Ground tracking sensors 236 sample the height. The ground tracking sensors are located on opposite ends of the header.

For using header height control 254 without lateral tilt 256, a single degree of freedom (i.e. raising/lowering of header 202) is used. The control input signals 104 and 106 are based on an average ground signal obtained by the two contact sensors. Signals 104 and 106 are used to raise and lower the header to the height value set by the combine operator.

Referring again to FIG. 10, with lateral tilt 256 active, rotation about the pivot point 260 is also controlled. In the exemplary embodiment, the header height function 254 and the header tilt function 256 work independently of one another, but use the same sensors 236. Tilt control 256 is used so that the value of the signals from the left header ground sensor 237 and right header ground sensor 236 are equalized. Thus, if the height of the left sensor 237 is greater than that of the right sensor 236, a control signal 287 (shown in FIG. 2B) is generated that causes header 202 to rotate left sensor 237 towards the ground and thereby reduce the height of left sensor 237. The controlled header height as defined by the average of the left and right sensors 237 and 236 is used to control the vertical motion of the header.

Some advantages of using proportional hydraulic valves in the exemplary embodiments of the present invention are:

1) The use of proportional electrohydraulic valves for header height and lateral tilt provide finer control resolution than achieved in the prior art. This makes the present invention more responsive, minimizes wasted power and eliminates inherent vibrations that were caused by the rapid turn-on and turn-off of conventional on/off electrohydraulic valves used in the prior art.

2) Due to the closed loop nature of the system, use of header height control 254 minimizes height variations due to inertial loading as the combine moves over rough terrain. As compared to the prior art or a non proportional valve implementation, header height control 254 immediately detects and compensates for variations in header height relative to the ground due to both changes in ground elevation and reactive forces encountered as the combine moves across the field. An optional accumulator 207 (shown in FIG. 16) can still provides the spike suppressing function, but the naturally resulting motion of header 202 is suppressed.

3) The use of proportional valves to perform the lateral tilt function 256 also compensates for inertial loading effects, for the same reason described in paragraph (2) above.

5) Additionally the use of proportional valves allows the position versus time profile of header 202 to be accurately controlled while returning the header to cutting height, thus minimizing vibration and shock to the entire harvester 200.

Figure 11:
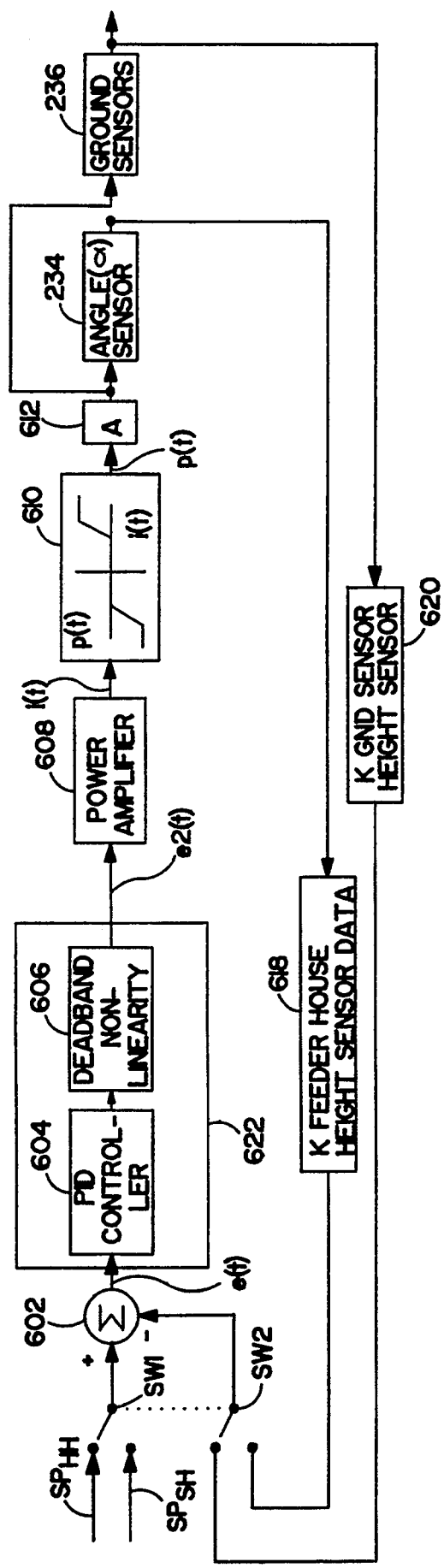
FIG. 11 is a block diagram of the header height control function shown in FIG. 2A.
Figure 12:
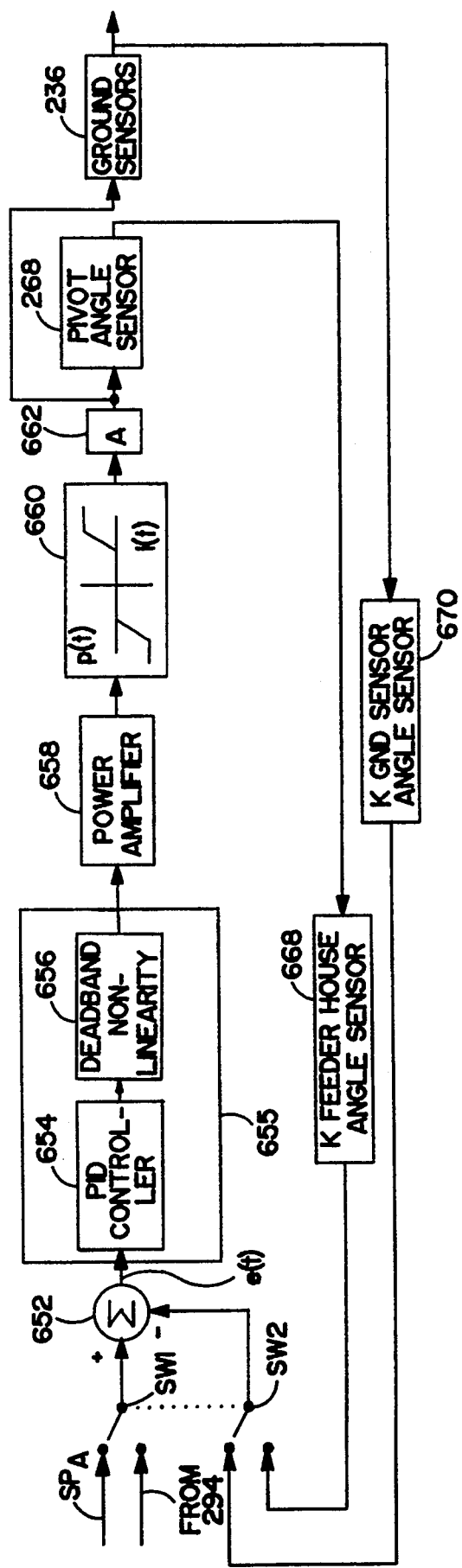
FIG. 12 is a block diagram of the lateral tilt control function shown in FIG. 2A.

FIGS. 11 and 12 show the respective feedback control loops that perform both the header height function 254 and lateral tilt function 256. These two loops exercise independent control of the vertical and rotational positioning of the header. They may be considered independent except that both obtain their feedback (with appropriate processing) from the left and right sensors 237 and 236 beneath the header 202.

Figure 19:
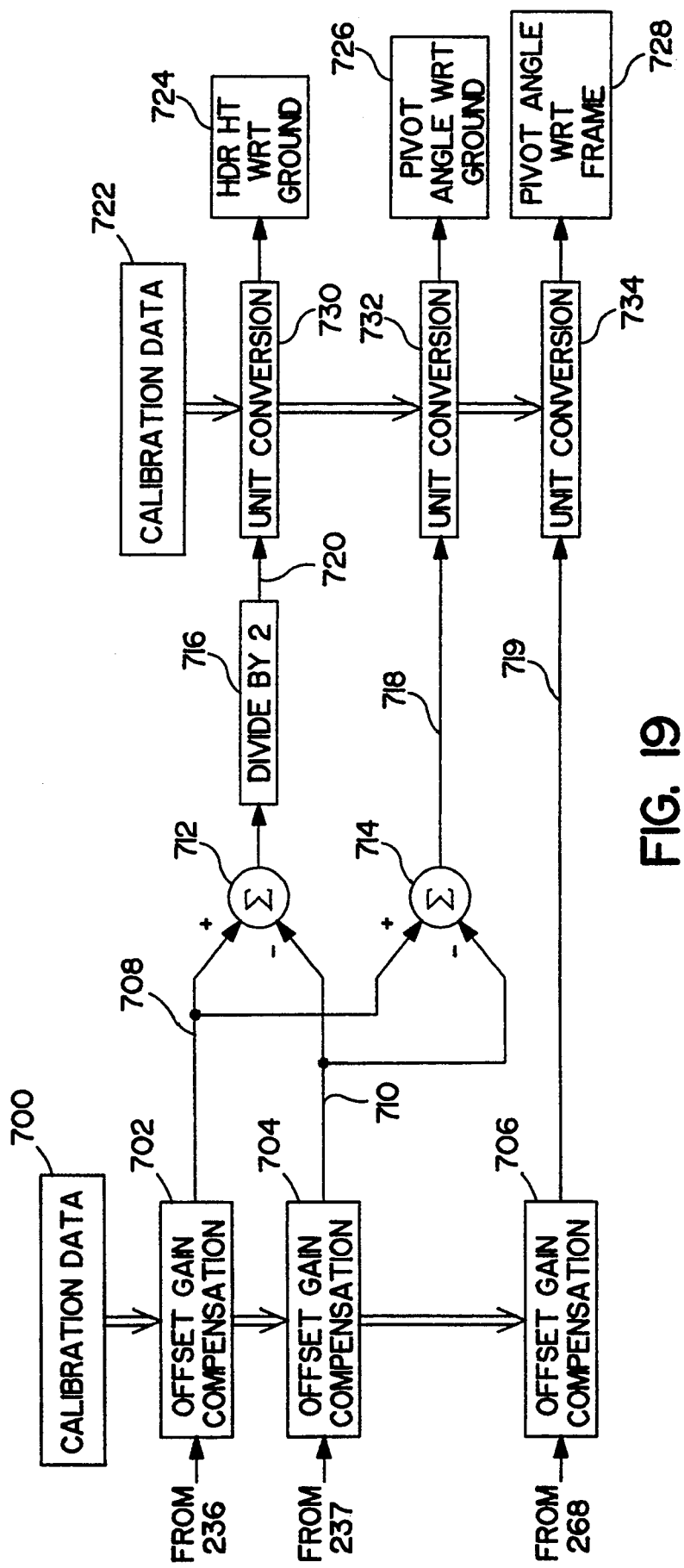
FIG. 19 is a block diagram of processing performed using header height control with lateral tilt.

FIG. 19 shows computations performed in processor 262 for header height with lateral tilt. This processing generates the derived inputs header height with respect to ground and measured header angle with respect to ground contour. These signals are used as the feedback signals for the vertical and rotary positioning loops, respectively. As shown calibration data 700 and 722 are used both to change the gain and offset 702 and 704 of the raw sensor signals, producing processed left and right sensor data 708 and 710, respectively. The average 720 of the left and right data 708 and 710 defines the header height and the difference 718 between the left and right data 708 and 710 defines the pivot angle in sensor coordinates. Unit conversion 730 converts the output measure 718 from sensor coordinates to linear header height 724. Unit conversion 732 converts the output measure 718 to the pivot angle 726 with respect to the ground.

Also shown in FIG. 19 is the signal processing and calibration interface for a rotary position transducer 268 that measures the angle of the header 202 with respect to the frame 224 of the combine. This signal from sensor 268 is used if the field trackers 236 and 237 fail to contact the ground and as part of the mode control functions.

The control functions shown in FIGS. 11 and 12 are similar to those shown in FIGS. 3 and 6 for floatation control and stubble height control 252. As shown in FIG. 11, the PID control function 604 and the deadband function 606 may be a performed by a combined PID and deadband controller 622. Functions 618 (668) and 620 (670) are feedback gains which may be used to alter system bandwidth. Note that summing junction 602 is only switched to receive feedback from one of the two feedback signals 618 and 620 at a time, depending on the type of sensor used. This function could be used to switch between stubble height control and header height control. It is understood by those skilled in the art that a single set of software instructions may be used with respectively different inputs and outputs to implement the PID control function. Thus a single PID controller may be used for the functions 264 (FIG. 2B), 494 and 482 (FIG. 6) 622 (FIG. 11), and 655 (FIG. 12).

FIG. 12 shows the control functions for implementing tilt control function 256 (shown in FIG. 2A). It is similar to FIG. 11 with the following exceptions: angle sensor 268 (which may be a potentiometer) measures the pivot angle of header 202 with respect to frame 224, as opposed to the feeder house angle 251 that is measured by sensor 234 and used to define stubble height (shown in FIG. 11). Summing junction 652 can receive header angle feedback from one of the two feedback loops at a time. Feedback 668 from the angle sensor 268 provides the angle with respect to frame 224, whereas feedback 670 from sensors 236 and 237 measures the angle with respect to the ground contour. The feedback from pivot angle sensor 268 may be the only one available if the ground sensors 236 and 237 fail to contact the ground due to variations in the ground contour.

When header height with lateral tilt is operational, the ganged setpoint and feedback switches of each loop (SW1 and SW2 shown in FIG. 11) are in the upper position. Setpoint data to the vertical positioning loop ($SP_{HH}$ for header height and $SP_{SH}$ for stubble height) is defined by the operator in terms of average height from the ground. As shown in FIG. 12, Setpoint data $S_{PA}$ to the rotational loop is set to zero for a level land combine. For the case of a hillside machine, the nominal combine angle or an operator supplied value is used as the rotational loop's setpoint. The setpoint and feedback switches are automatically placed in the lower position during certain mode changes. This specifically occurs when the overall controller needs to automatically control the tilt and height during the resume function.

There is an inherent coupling between the header height function shown in FIG. 11 and the tilt function shown in FIG. 12. This coupling is due to the method in which the feedback signals are derived and the mechanical nature of the system. The height control loop in FIG. 11 positions the pivot point 260 (shown in FIG. 10) of the header 202 at a distance from the ground defined by the average value of ground sensors 236 and 237. The lateral tilt loop in FIG. 12 rotates header 202 to be substantially parallel to a line between the two sensor points of contact with ground 220. Both loops (FIGS. 11 and 12) are active when header 202 is maintained parallel to the ground at a constant header height due to the mechanical system. The response times of the two loops may vary. This may cause undesirable vibrating motion (either vertical or rotary) of the header. One simple method to reduce this vibration is to select a precedence for operation of the two loops.

The position data from each sample of the left and right sensors 237 and 236 may vary. The variation from left to right may, in some cases, be quite high. When the sensor returns vary (on rough terrain) maintaining the height at the average value will not maximize the harvest, because the cutter bar 242 tends to cut the crop at an angle. With lateral tilt 256 enabled and operating at a faster rate than height control 254, the yield is enhanced. For example, the feedback loop shown in FIG. 8 may executed every 50 milliseconds for the tilt control, and every 200 milliseconds for header height control.

In an alternative method for establishing precedence, the header height and lateral tilt functions (loops) may be executed with the same frequency. In this alternative method, the values of the PID constants Kp, Ki and Kd may be modified to vary the response of each loop, so that the tilt is faster in responding than header height, or vice versa.

Alternatively, the elevation seen by the left and right sensors may be substantially constant (with small variations), while the path has gradual height variations (rising and falling). In this case, maintaining the average height maximizes crop yield, because the cutting bar is positioned at the desired height. Lateral tilt 256 in this case is only of secondary importance. To apply precedence in this case, the feedback loop shown in FIG. 8 may executed every 50 milliseconds for header height control, and every 200 milliseconds for tilt control.

Based on these two extreme scenarios, certain conditions may warrant precedence of tilt control 256 while others warrant precedence of height control 254. As described above, a predefined precedence can reduce coupling between the rotational and height control loops 256 and 254, thereby reducing or eliminating vibrations. A supervisory controller provides the operator with a choice for precedence.

Precedence is accomplished by modifying the response time of either or both of the header height function 254 and the tilt function 256. Additionally, the response times of each loop 254 and 256 are modified as a function of ground speed. Thus a gain scheduling approach or an algorithmic adaptation approach may be used to modify PID gains (for each loop), similar to the method discussed above for the floatation function (FIG. 4) and the stubble height function 252 (FIG. 7). Finally a self learning approach can be used in which variations of both height and tilt are accumulated during the operation of the combine and the precedence or timing is modified to optimize operation with respect to minimizing parallel error to the ground surface.

Referring again to FIG. 7, the control sequence for header height is similar to that used for stubble height control, except that (1) in header height control, feedback is provided by a different sensor; (2) gain schedule (step 512) and moving the header from a raised position to an operating position (step 528) involve the header tilt (pivot) angle as well as header height; and (3) the mode is set to header height with lateral tilt (step 542). In particular, the header height function 254 and lateral tilt function 256 include a resume function similar to that shown in steps 526, 528, 530, 532, 534, 536, 538 and 540 of FIG. 7. In this case, the purpose of the resume function is to automatically return header 202 to the last height and pivot angle in which it was positioned before being raised, when harvester 200 reaches the start of a new row. Header height control 254 and lateral tilt control 256 are then reactivated.

Mode transition into header height Control occurs as described below. Once the operator depresses the resume switch (step 508), at steps 526, 528 and 530, the controller 622 uses a position feedback loop (steps 532, 534, 536 and 538) around the feeder house position transducer 234 to lower header 202 with a predefined velocity profile until at step 532 a transition point defined by the value of the feeder house position transducer 234 corresponding to the maximum working height of the field tracker sensors 236 and 237 is reached. At this point, at step 542 the header height control function 252 is enabled. The closed loop position system then switches from controlling the header via the transducer 234 to control by the field tracker sensors 236 and 237. Control of further lowering of header 202 is accomplished by the error signal, from the desired setpoint and the processed signals header height with respect to ground 724, from sensor 236 and 237, as shown in FIG. 19.

Referring again to FIG. 8, the same steps are executed for header height control as described above for stubble height control, except that for header height control, the ground sensors 236 and 237 provide the actual position 724 (see FIG. 19) at step 554 instead of the angle sensor 234. Furthermore, the same steps are executed for lateral tilt control, except that the tilt is computed from the processed data provided by ground sensors 236 and 237, as pivot angle 726 (as shown in FIG. 19).

Like floatation 250 and stubble height control 252, header height 254 with lateral tilt control 256 may be implemented via analog hardware or a combination of analog and digital hardware, or using a microprocessor 262 or computer with the appropriate interface circuitry. Furthermore, processing and process control equipment my be shared by the four control functions 250, 252, 254 and 256.

System Calibration for Header Height and Lateral Tilt

Because agricultural equipment such as harvesters may use different headers to accommodate different crops, it is important to provide a simple method of providing the control system 216 with the operating ranges of the sensors 236, 237, and 268. Contact sensors 236 and 237 are attached to header 202 and their alignment may vary between headers. Additionally, normal use can bend the sensing arm of sensors 236 and 237 and actually change the output signal values even though the sensors are still be functional. Thus the sensors should be re-calibrated at the beginning of each shift or day in order to ensure that the sensory signals are correct. The left and right sensors 237 and 236 may have different output signal ranges and may provide different signals for the same height measurement.

It is also important to determine the relationship between the value of the feeder house sensor 234 and the point where the ground sensors 236 and 237 begin to operate. This provides a transition point for the resume function to change modes from lowering the header via closed loop control about the feeder house position sensor 234 to vertical height control from the ground sensors 236 and 237.

The ground contact sensors 236 and 237 begin to provide a signal once the header is raised off the ground and will continue to provide a signal until they are fully out of contact with the ground. The nominal position of the header on the ground may change based on the contour of the ground with respect to frame 224 and the location of header 202. The ground contact sensors 236 and 237 measure the absolute distance of the header from the ground.

Before calibrating ground sensors 236 and 237, the feeder house sensor 234 is calibrated, as described above with reference to the calibration of the stubble height sensor. The calibration sequence collects values from each sensor 236 and 237 for maximum working height and minimum working height, which are the extreme ranges of their sensing capabilities. For example, the maximum working height is the point at which the sensor begins to provide data (i.e., the value of its output signal begins to change in response to a change in header position).

The values obtained for the above heights are in the sensor coordinates or domain. For example, if potentiometers (not shown) are used within the sensors 236 and 237, and their extreme theoretical range is from 0 to 10 volts, then it is possible that the nominal minimum height of the left sensor may cause a signal of 2.6 volts and the nominal maximum height for the same sensor causes a signal of 9.5 volts. This variation in ranges may be due to mechanical linkages which may restrict the full range of sensor potentiometer rotation. Additionally, the minimum and maximum working heights are bounded by the nominal maximum and minimum ranges and differ for the left and right sensors. Because the sensor coordinate signals provided by the left and right sensors 237 and 236 may vary, based on physical alignment of the parts or tolerances, the control system 216 also accommodates these variations.

For calibration, header 202 is attached to feeder house 204. Header 202 is rotated to be parallel to the ground and harvester 200 should sit on relatively level ground.

When the calibration sequence is initiated, header 202 is raised so that sensors 236 and 237 are fully extended by the weight of gravity. The value associated with each transducer signal defines the left and right sensors' nominal maximum heights. These values are automatically stored by AHCS 216. Header 202 is slowly lowered while monitoring the value of the transducer 234 and each contact sensor 236 and 237. The point where the signal of either the left transducer 237 or right transducer 236 changes (i.e., reduces in value) from the nominal maximum height defines the upper limit of the respective sensor. This is the point where the sensor 236 or 237 makes contact with the ground. Processor 262 stores this point as the maximum working height along with the value from transducer 234. AHCS 216 continues lowering header 202 until a change in the value associated with the nominal maximum height of the other sensor (right or left) is obtained. This value is stored as the maximum working height along with the value from transducer 234.

Once these maximum height values are established, the lower end values corresponding to "just making ground contact" need to be established. Header 202 is lowered to a few inches (about 10 cm) above the nominal header position on ground as established by transducer 234. Next, AHCS 216 slowly lowers header 202 while monitoring the value of each of the contact sensors 236 and 237. The point where the signal reaches its minimum and no longer changes for small motion of header 202 defines the minimum working height for each contact sensor 236 and 237. AHCS 216 stores each of these points as the minimum working height of the respective sensor along with the value from transducer 234. The signals from transducer 234 are cross correlated with the signals for contact sensors 236 and 237.

Typically, the harvester operator adjusts the setpoint for the desired cut and does not care about the absolute height. Alternatively, one may cross calibrate he ground contact sensor values with absolute height. The physical vertical range of each sensor may be measured (or the nominal value used) and related to the operational range in sensor voltage coordinates. This provides a reasonable approximation relating sensor coordinates to linear measurement. Alternatively, absolute position transducers (e.g., ultrasonic) could be used in place of transducer 234.

Electrohydraulic Control Valve Assembly

Figure 16:
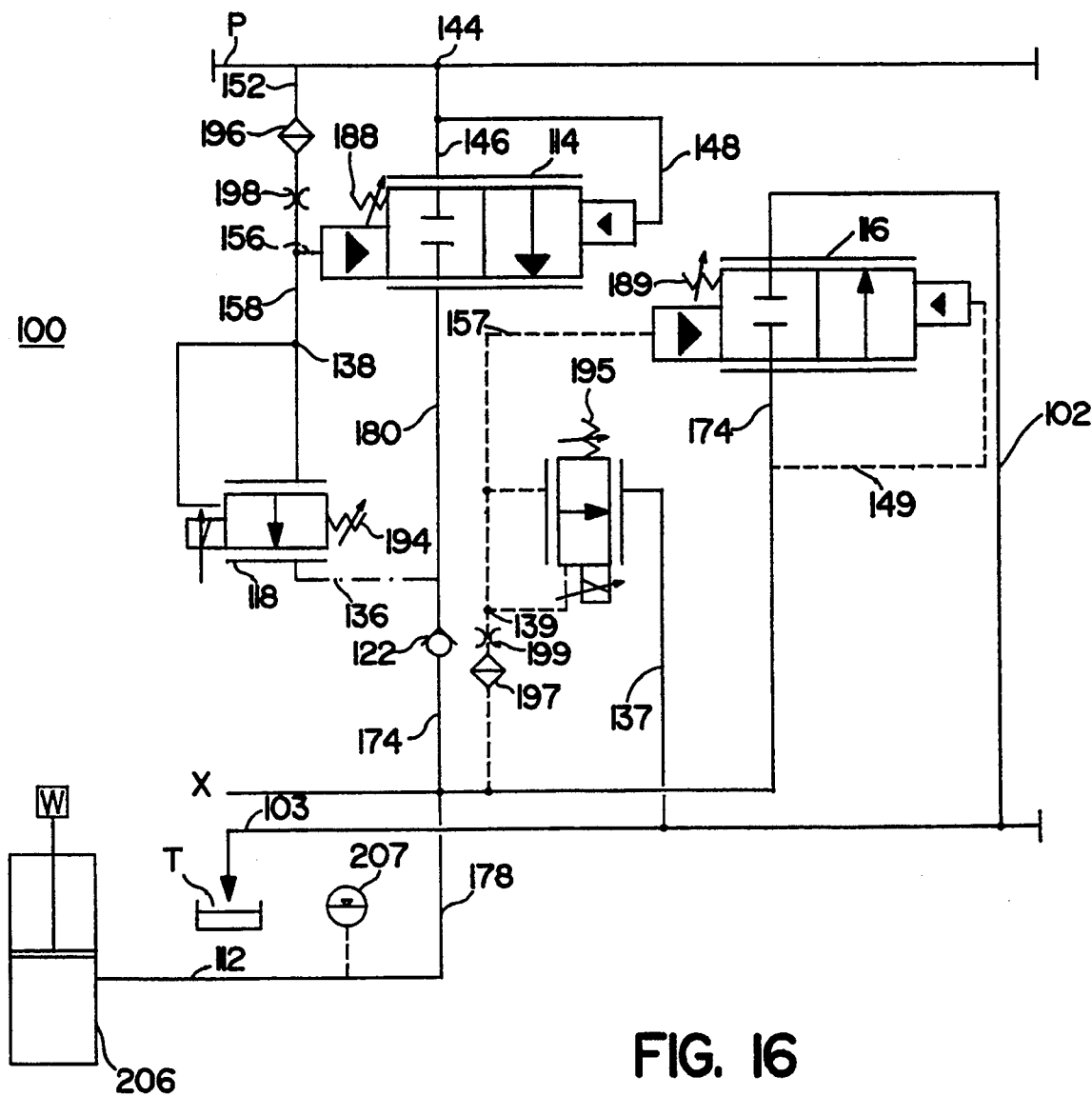
FIG. 16 is a schematic diagram of the valve assembly shown in FIG. 13.
Figure 17:
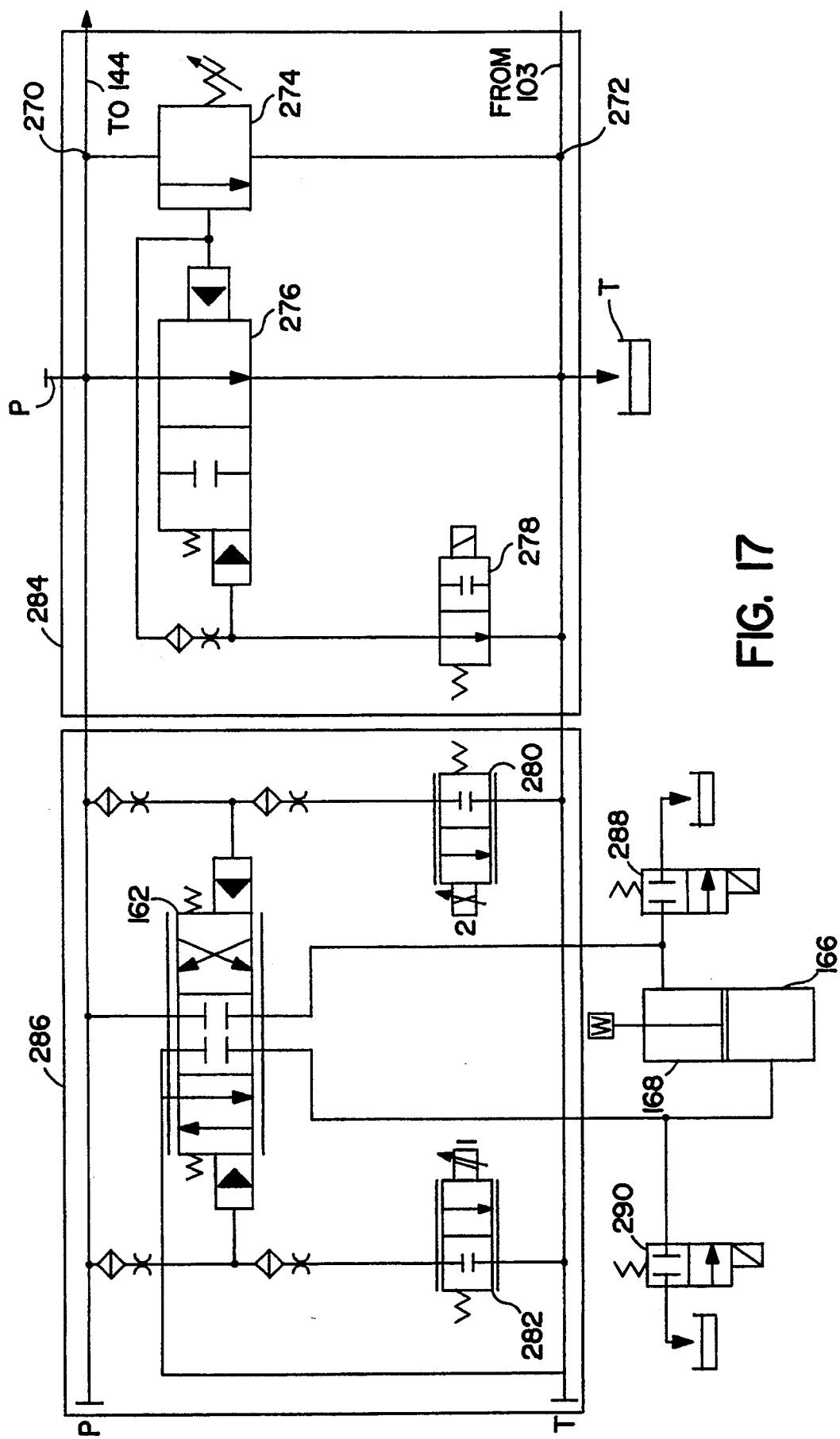
FIG. 17 is a schematic diagram of the valve assembly and passive floatation system shown in FIGS. 9 and 10.

FIGS. 16 and 17 are schematic diagrams of two portions of the valve stack 100 of harvester 200. FIG. 16 shows the raise and lower valve assemblies used for header control. FIG. 17 shows the unload valve 284 and the three position four-way spool valve assembly 286 used for lateral tilt. U.S. patent application Ser. No. 08/012,002, filed Feb. 1, 1993, entitled "PROPORTIONAL HEADER HYDRAULIC SYSTEM AND CONTROL METHOD" is hereby incorporated by reference for its teachings on the construction of a hydraulic system providing accurate control of both flow and cylinder pressure.

A three position, four way pilot operated spool valve assembly 286 (shown in FIG. 17) is also coupled to the pressure line 270, for controlling the lateral tilt of header 202, as shown in FIGS. 10. The system as shown is an open center system. In an open center system the pump P (see FIG. 1) is always operating and furnishing pressure and flow to the pressure galley 144 of FIG. 16 and 270 of FIG. 17. An unload module 284 provides a path to tank for the hydraulic fluid. When either the raise valve 118 or the spool valve 162 needs to be activated, the unload valve 284 is activated, thus closing the path to tank so that fluid and pressure can go to either the raise valve 118 or spool valve 162. As soon as either the raise valve 118 or spool valve 162 is deenergized, the unload must again be deenergized.

Figure 13:
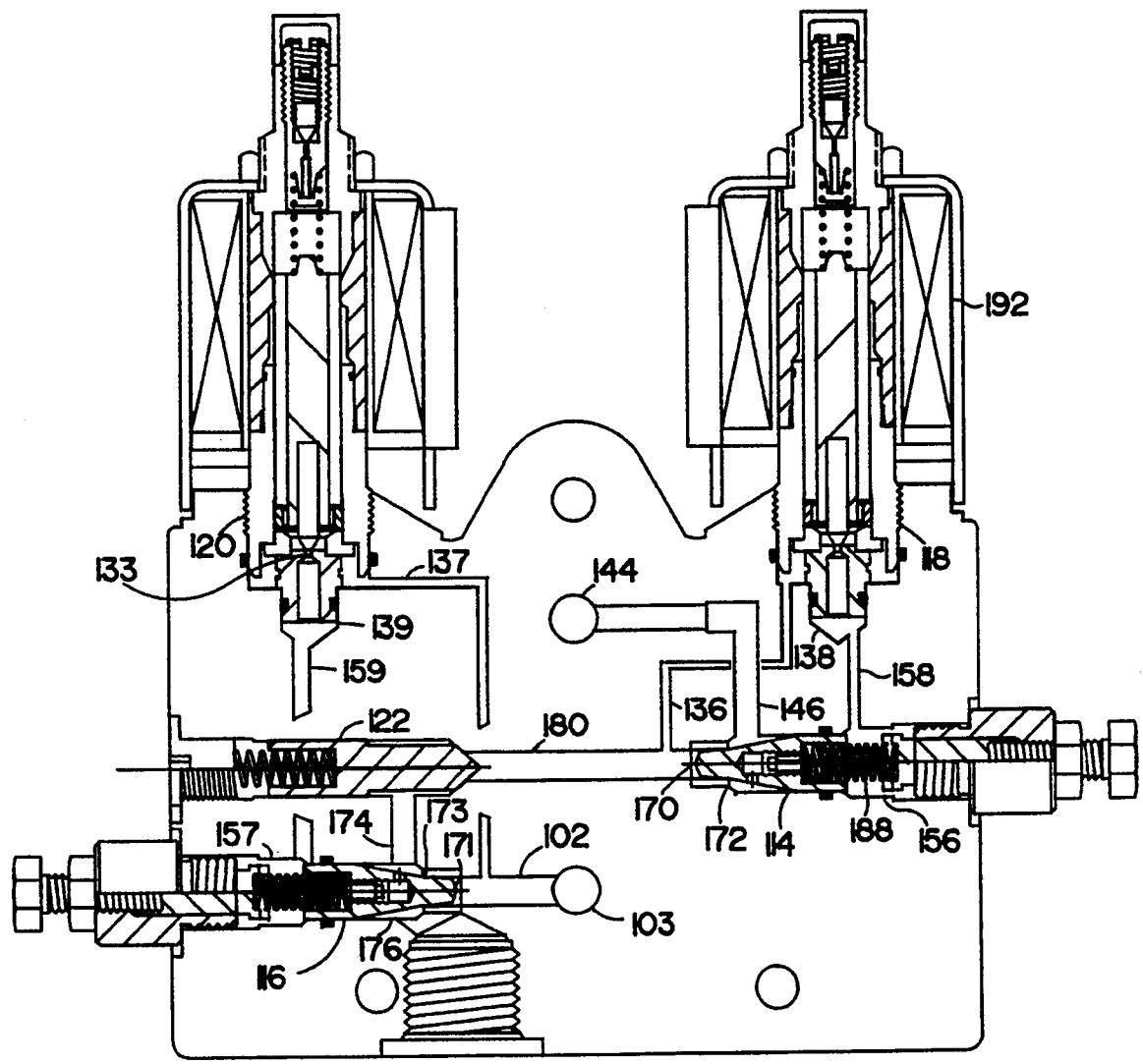
FIG. 13 is a cross sectional view of the valve assembly shown in FIG. 1A.

FIG. 13 shows the proportional valve assembly 100 for use in the exemplary embodiment. Valve assembly 100 includes a first two stage valve assembly 114 and 118 for raising header 202 and a second two stage valve assembly 116 and 120 for lowering header 202. Each of the second stages 114 and 116 of respective raise and lower valve assemblies has a poppet with a parabolic contour which is dimensioned with orifice parameters to provide a substantially linear flow rate change when the second stage poppet moves, to provide substantially zero flow jerk. Construction of a second stage poppet having these characteristics is taught by U.S. Pat. No. 3,980,002 to Jarman et al., which is hereby incorporated by reference for its teachings on programmed variation of the unbalanced programmed valves. Also incorporated by reference is U.S. Pat. No. 4,202,250 to Zeuner et al. for its teachings on the application of programmed poppet valves to construction of valve systems having raise and lower valve assemblies.

In accordance with the present invention the, the first stage 118 and 120 of each valve assembly is a proportional solenoid valve. U.S. Pat. No. 4,651,118 is hereby incorporated by reference for its teachings on the construction of solenoids having a high degree of proportionality. Variations in control input signals 104 and 106 define the time of shift of the second stage poppet systems. By varying the input signals 104 and 106, the fraction of the maximum flow rate that is admitted through pilot valves 118 and 120 is varied.

Any desired profile of pilot valve position over time may be used by varying the input signal. For any given open position of the pilot valve 118 or 120, the respective second stage valve 114 or 116 opens at a predetermined rate in accordance with the second stage valve configuration. The proportional solenoid valves 118 and 120 are proportional pressure relieving valves. That is, valves 118 and 120 open when the sum of the electromotive force from the solenoid 192 plus the pressure force below poppet 160 (in orifice seat 132) exceed the bias force of spring 194. The stroke of poppet 160 is short, so that the force from spring 194 is substantially constant whether poppet 160 is open or closed. Therefore, the pressure force in orifice seat 132 varies as a function of the current input to the solenoid 192. The inherent characteristics of the second stage valve substantially eliminates jerk as the valve moves between closed and open positions. By combining the proportional pilot with the programmed second stage valve, the reduction in jerk is enhanced even further, regardless of the actual header position verses time profile.

The second stage poppet can be tailored so that the valve is either an optimal pressure or flow control device. This is a characteristic of the valve alone and is independent of the closed loop control.

For applications where the primary operation is floatation, the second stage poppet nose should be optimized for pressure control functionality (e.g., a blunt contour). The use of closed loop control also allows the valve to operate for header height or stubble height control.

For applications in which the primary operation is header height or stubble height control, the second stage poppet nose should be optimized for flow control functionality (e.g., a more pointed contour). The use of closed loop control also allows the valve to operate in a pressure control mode for floatation control.

The exemplary valve has both characteristics of pressure and flow control. The use of closed loop control allows either functionality. Optimization for flow or pressure (whichever is used most often) minimizes error signals in the closed loop configuration.

An important aspect of the invention is the ability of the valve assembly 100 to remove the control of the second stage spools 114 and 116 from the fixed mechanical aspects of the valves 114 and 116. Instead, control of the second stage is accomplished through electrical control of the first stage proportional pilots 118 and 120. This makes valve assembly 100 more versatile and eliminates the need (as in prior art programmed valves) to tailor the poppet profile of the programmed second stage valves 114 and 116 uniquely for each application. Another important aspect of the present invention is the method in which the pilot (first) stages 118 and 120 of the valve assembly are supplied fluid pressure and the method used to control fluid pressure, as explained below.

A combine header system is an unbalanced gravity load which is preferably operated with constant header acceleration and deceleration for proper control. The constant acceleration and deceleration of the mass eliminates potential shock loading of the system due to instantaneous acceleration of the fluid when the header is above the ground. The header of the combine is not touching any surface and all weight is counterbalanced by the hydraulic pressure in the cylinder 206 controlled by valve assembly 100. The exemplary valve assembly 100 can (1) control pressure by way of the proportional pilot assembly 118 and 120; (2) flow by the contour of the second stage valves 114 and 116, as well as by the pressure control behind the second stage poppet as defined by the current supplied to the first stage; and (3) jerk by the effective area produced by the second stage poppet 170 (171) and the poppet seat 172 (173), as well as by the pressure control behind the second stage poppet as defined by the current supplied to the first stage. The exemplary valve substantially eliminates jerk. The acceleration function is continuous and has a continuous derivative.

"Jerk" is defined as the time derivative of acceleration of the header system. Jerk is produced when a significant change in acceleration of the mass is observed, so that the acceleration is not continuous. Jerk creates shock loading to the frame of the harvester 200 which is detrimental to the substructures and the performance of harvester 200.

Figure 14:
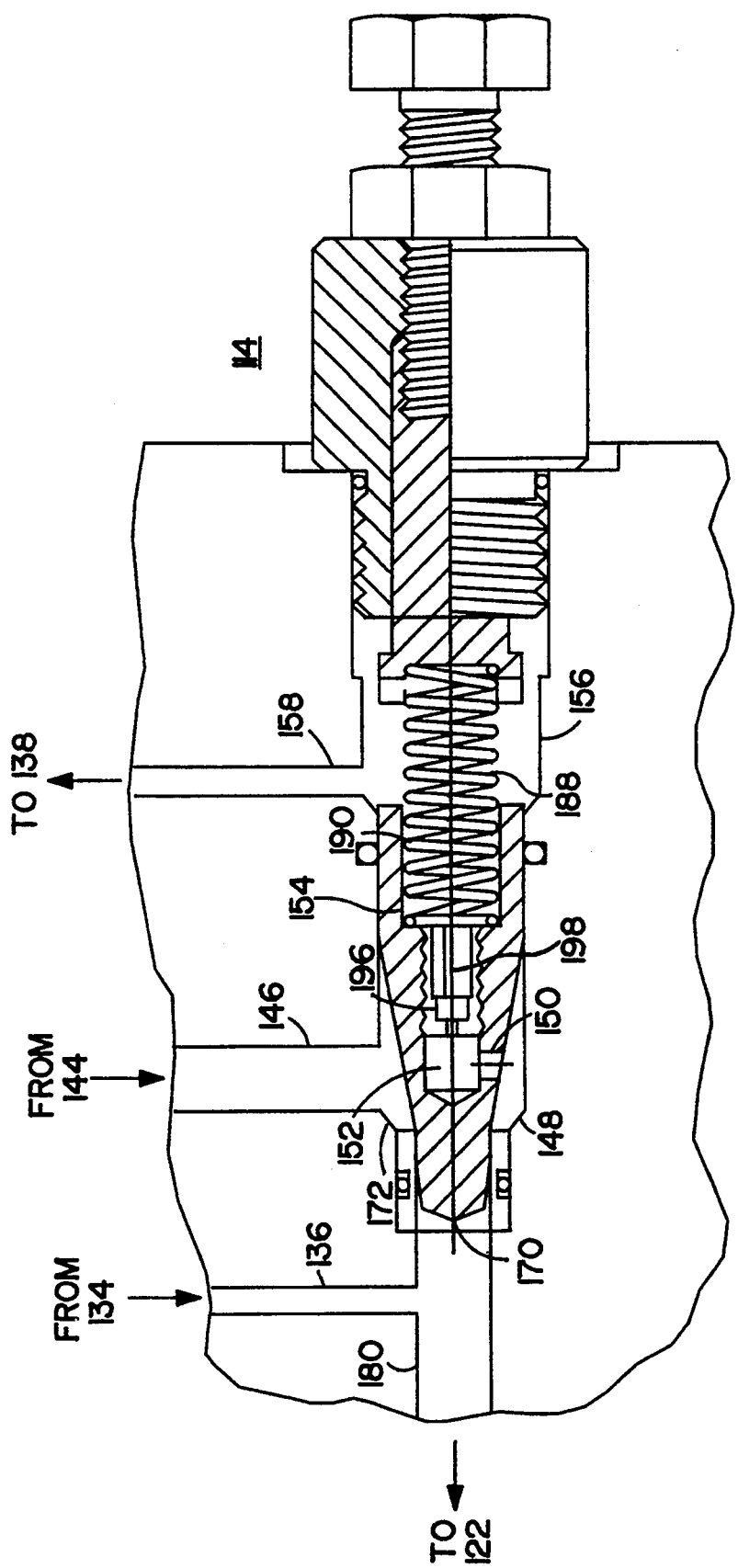
FIG. 14 is an enlarged cross sectional view of the raise second valve stage shown in FIG. 13.
Figure 15:
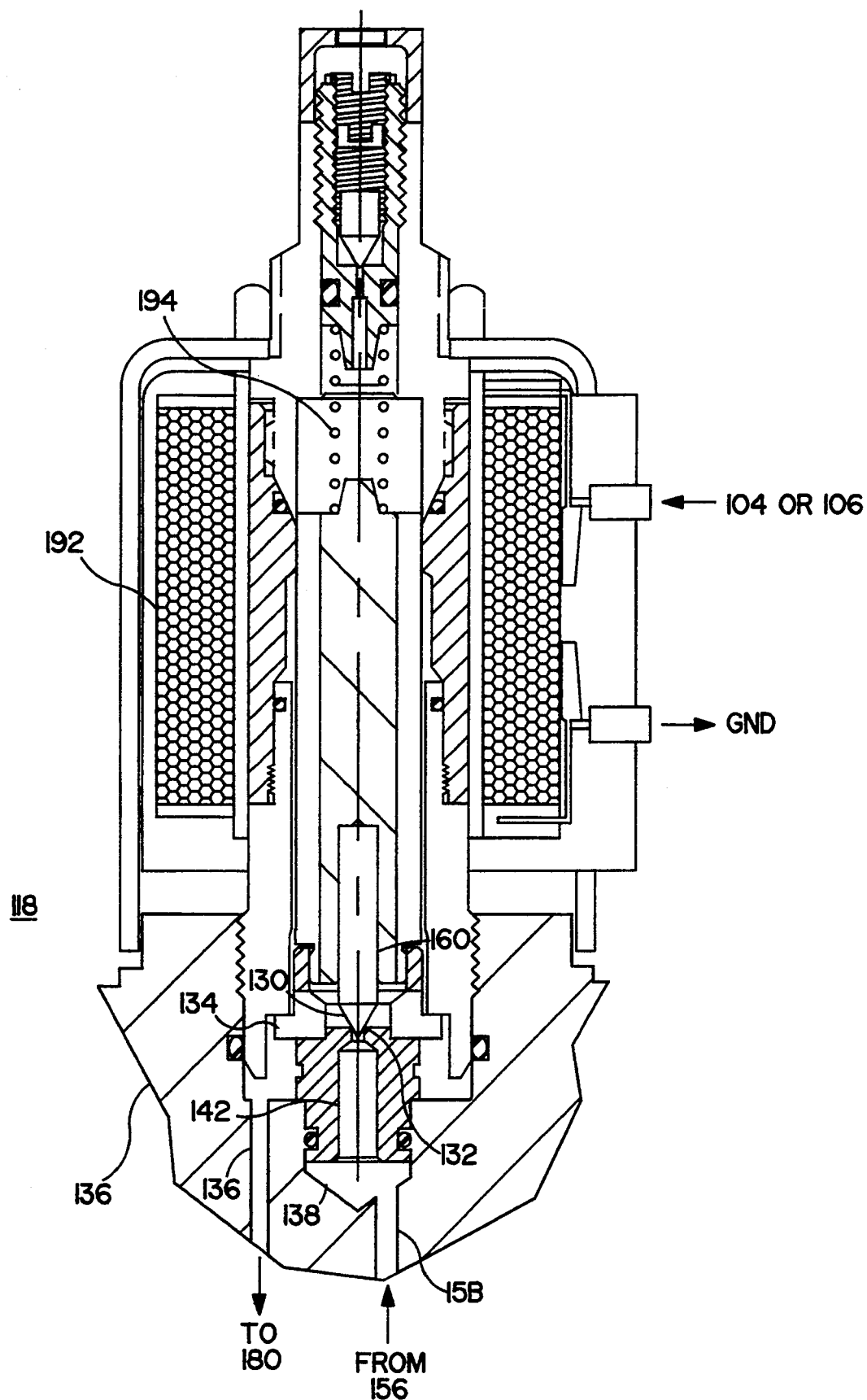
FIG. 15 is an enlarged cross sectional view of the raise pilot valve stage shown in FIG. 13.

Referring now to FIGS. 14 and 15, FIG. 14 is an enlarged cross sectional view of the raise second valve stage 114. FIG. 15 is an enlarged cross sectional view of the raise pilot valve stage 118. Fluid under pressure enters the valve assembly 100 through a fluid inlet 144. The fluid flows through a passage 146 to a chamber 148 that surrounds a portion of second stage poppet 170. Chamber 148 is adjacent to the orifice 172 in which poppet 170 seats. Popper 170 includes a central passage 152 fluidly coupled to chamber 148 by a passage 150. Passage 150 extends across the length of poppet 170, joining with an enlarged passage 154 in poppet 170 through orifice 198. Passage 154 opens into a chamber 156 that is fluidly coupled by a passage 158 to a chamber 138 of pilot valve 118. Thus the pressure in cavity 138 of valve 118 is maintained at the static pressure at fluid inlet 144 when there is no flow.

The first stage pilot valve 118, receives fluid pressure at its orifice 132, under the nose 130 of the poppet 160, which allows the first stage poppet 160 to act as a proportional direct acting relief valve. That is, poppet 160 opens when the pressure beneath it at orifice 132 plus the magnetic force produced when current is applied to the coil 192 of valve 118 equal the force of the bias spring 194 (as shown in FIG. 15). By varying the current, the relief pressure is varied.

Hydraulic fluid under pressure is delivered to orifice 132 in poppet 160 of valve 118. When poppet 160 is closed (plug 130 seated in orifice seat 132), passage 142 beneath orifice seat 132 is isolated from chamber 134. The isolation of orifice seat 142 creates a pressure rise which creates a greater force in chamber 156 than the pressure force applied in chamber 148. The force imbalance of poppet 170 causes a closing action (if poppet 170 is open) until poppet 170 is seated in orifice seat 172. When poppet 160 is in its open position (plug 130 not seated in orifice 132), fluid is passed through chamber 134 to passage 136. The fluid in chamber 134 and passage 136 is at a lower pressure (the load pressure) than the inlet pressure at fluid inlet 144.

With no current applied, both first stage poppet 160 and second stage poppet 114 are seated in respective orifice seats 132 and 172. When a current is applied to the coil 192 of the pilot stage valve 118, poppet 160 opens by an amount that varies with the applied current. Fluid is admitted into chamber 134 and passages 136 and 180. The pressure in cavity 156 falls and the pressure in chamber 148 remains the same (the inlet pressure). When the effective force on poppet 170 due to the pressure in chamber 148 is greater than the effective force on the spring 188 side of poppet 170 due to pressure in chamber 156 and spring force on poppet 170, the poppet 170 shifts open, allowing pressure in passage 146 to pass through the effective opening between orifice seat 172 and poppet 170 to chamber 180. The shift of poppet 170 is controlled by the change in pressure in chamber 156. The pressure is controlled by relieving the bias force produced by spring 194. The bias force is relieved by electrical current through coil 192.

Referring again to FIG. 13, passage 180 communicates with one-way check valve 122, which allows flow from passage 180 to passage 174 (but not from passage 174 to passage 180). Passage 180 opens into chamber 176 of lower second stage valve 116. Chamber 176 is connected directly to valve outlet 178, which is coupled to cylinder 206.

When pilot stage poppet 160 is closed, the pressure in chamber 156 returns to the inlet pressure, overcoming the pressure in chamber 148 and closing second stage poppet 170 against orifice 172. Check valve 122 prevents backflow from the valve outlet into passage 180, maintaining header 202 (shown in FIG. 1A) at its current height.

The operation of the lower valve assembly 116 and 120 is similar, as is understood by those skilled in the art. The orifice 133 of valve 120 is fluidly coupled to passage: 174 so that the pressure is the same (the load pressure) at the orifice 174 and passage 174. The same load pressure is applied against poppet 171 in cavity 157 to hold valve 116 closed. When the lower pilot valve 120 is opened, fluid is allowed to flow from orifice 133, through passage 137, to tank, by way of tank port 103. The pressure at orifice 133, chamber 139, passage 159 and cavity 157 all fall when valve 120 opens, while the pressure in chamber 176 remains constant, pushing poppet 171 away from its seat 173, directly coupling valve outlet 178 to tank port 103.

The exemplary embodiment features the pressure under poppet proportional direct acting relief technique. This allows the valve 118 to have a much greater control over the shift of the spool 114. The reason is that the pressure in passage 180, exerted against poppet 114, is not a fixed percentage of the fluid inlet 144 pressure as in the prior art. The present invention allows electronic control of the pressure in passage 180 against poppet 114, thereby allowing control of the stroke of second stage poppet 114.

The inventors have determined that, for the configuration described above, the opening time for the second stage poppet 114 is a function in which the only variable parameter is the current applied by input signal 104 to coil 192 of pilot valve 118.

The exemplary control valve assembly 100, coupled with the correct control structure discussed above with reference to FIGS. 3–12 ensures that the acceleration of header 202 is a continuous function so that there is no jerk. The electrohydraulic control structure detects any change in acceleration and compensates immediately. The ability to control pressure, flow and impulses in the system are unique.

The exemplary valve assembly 100 (shown in FIG. 13) includes the following advantageous aspects. Valve assembly 100 provides the ability to electronically control and vary the maximum pressure in the header cylinder 206. Second, valve assembly 100 provides the ability to control the change in acceleration when raising and lowering the header 202, through use of the second stage poppet 170 machined shape and pressure control of the first stage valve 118. This prevents transmission of any impulses in the hydraulic or mechanical systems to the frame of harvester 200. Third, valve assembly 100 provides the capability to control flow as a function of the shape of second stage poppet 170 and the pressure behind poppet 170. This third capability allows the operator to control flow or pressure depending on the control aspect desired. Finally, valve assembly 100 provides the capability to control cylinder 206 port pressure proportional to an electrical signal 104. This capability is used for the floatation function 250 described above with reference to FIG. 1A.

It is understood by one skilled in the art that the valve assembly 100 is only exemplary in nature, and that the invention may be practiced using different valve assemblies which include a proportional raise valve and a proportional lower valve. For example, these may be of the spool type, rotary type or poppet type, operated in an open center or closed center load sense configuration. The use of proportional valves is important to provide the degree of control over the fluid flow that is desired for accurate PID control.

Referring again to FIG. 17, the unload valve assembly 284 is shown schematically. Valve assembly 284 includes a two position, two-way, normally open solenoid operated poppet valve 276, a solenoid operated pilot valve 278, and a relief valve 274. All pump flow is directed to tank whenever solenoid 278 is not energized. The integral relief valve 274 limits the maximum available system pressure that enters main valve assembly 100 through fluid inlet 144 (shown in FIG. 16). An exemplary commercially available unload valve assembly 284 in accordance with FIG. 17 is the MCUNR valve, manufactured by Control Concepts of Newtown, Pa. The MCUNR valve has the advantage of being convertible in the field between open and closed center, if the other elements of the harvester (e.g., the pump) are changed to be compatible with closed center valve assemblies. In the exemplary embodiment, the unload valve assembly 284 is the system inlet, and is connected to the system pump P.

Valve assembly 286 is a solenoid operated, closed center, directional control, three position four way spool valve. The spool is hydraulically pilot operated by solenoid valves 280 and 282.

A commercially available alternative valve that may be used in place of valves 162, 280 and 282 in valve assembly 286 is the MC34X, a 3 position, 4 way pilot operated spool valve with pilot operated checks, also manufactured by Control Concepts of Newtown, Pa. The MC34X valve has two active control positions in which one cylinder side 166 (or 168) is coupled to pressure, and the other cylinder side 168 (or 166) is coupled to tank. In the third valve position, both pivot cylinder sides 166 and 168 are blocked and the cylinder holds its position. This aspect of the valve is used for active lateral tilt. The addition of two electrically operated pilot valves 288 and 290 allows both ports of cylinder 166 to couple through the tank line. With both valves activated, the cylinder is in hydraulic float mode, allowing passive lateral tilt with floatation control.

Although the exemplary valve assemblies have been described in terms of open center valve systems, it is understood by those skilled in the art that the invention may be practiced using closed center hydraulic systems, and pressure compensated systems with load sense control for the system pump.

Control Signal Switching and Amplification

Figure 18:
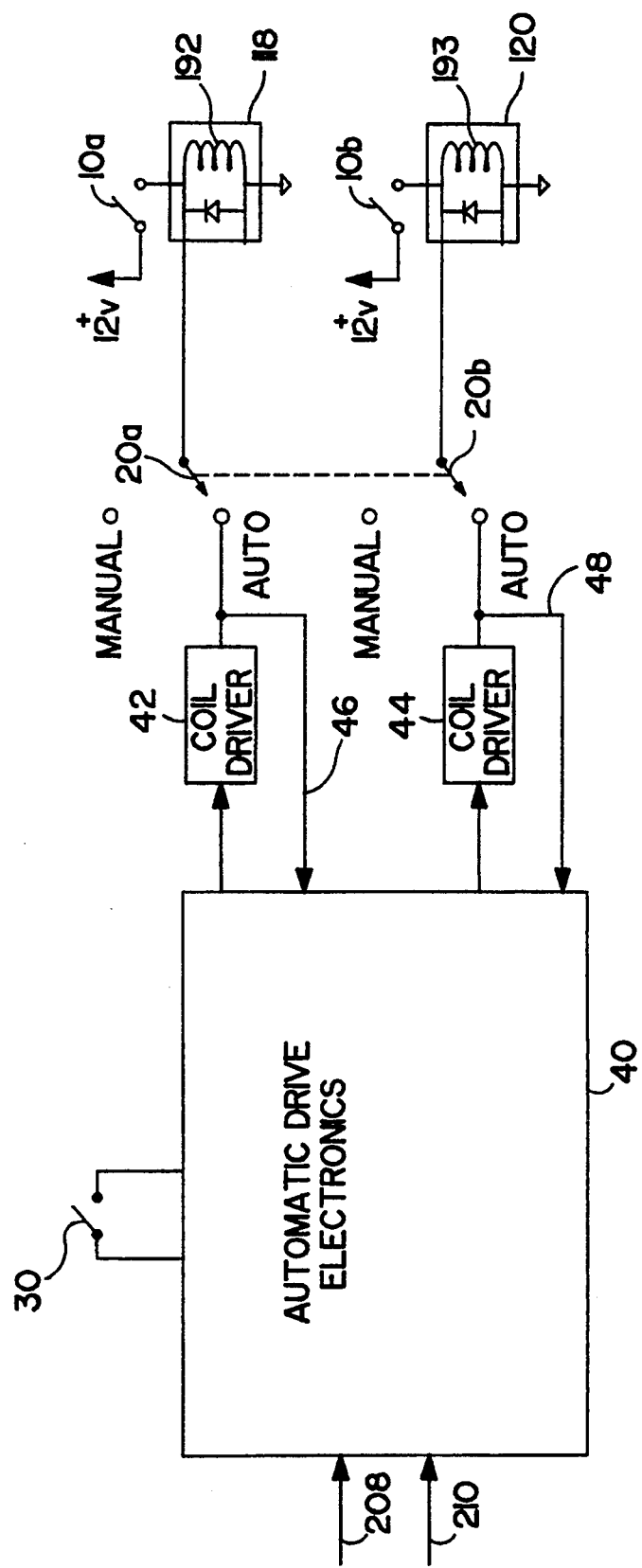
FIG. 18 is a block diagram of a switching function used in the control system shown in FIG. 1A.

FIG. 18 is a block diagram of the fail-safe control implementation. Switch 10a (10b) always allows the solenoid coil 192 (or 193) of the raise (or lower) valve to be actuated. With Switch 20a and 20b (ganged rotary switch) in manual mode, the control electronics are completely disconnected. With Switch 20a and 20b in the automatic mode, the automatic drive electronics 40 and coil driver circuitry 42 and 44 are connected.

In the automatic mode, the drive electronics 40 supplies signals to the coil drivers 42 and 44. A voltage/current sense line 46 (48) returns from the coil driver 42 (44) to the drive electronics 40 to monitor the operation of the coil 192 (193). In the event that the operator depresses switch 10 (manual operation), the additional voltage is sensed and the automatic drive electronics 40 removes the signal to the coil driver 42 (44) until the resume switch, switch 30 is manually activated by the operator. In this way, if the operator uses any of the manual controls during any automatic operation (floatation, resume, or calibration) the process is immediately aborted and the operator has full manual control. Additionally, a second safeguard exists in that the operator can move switch 20 to the manual mode and physically remove the automatic drive electronics 40 from the system.

Figure 20:
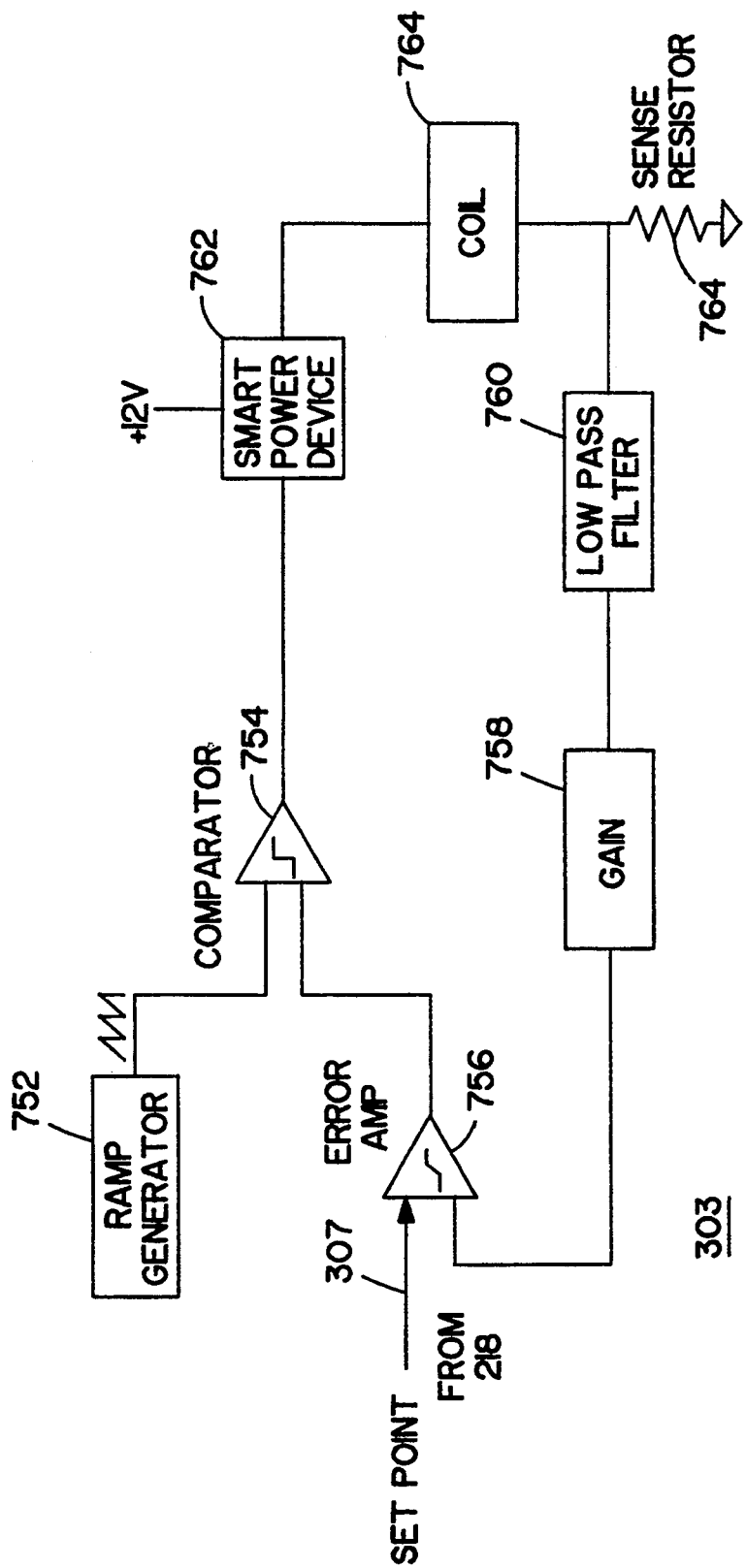
FIG. 20 is a block diagram of the power amplifier shown in FIG. 3.

FIG. 20 is a block diagram of the power amplifier 303 shown in FIG. 3. The power amplifier 303 drives the coil 192 (193) of the proportional pilot 118 (120). The power amplifier 303 receives a 0 to 5 Volt signal at the setpoint 307. There is a linear relationship between the set point 307 and the percentage of full scale coil current; 5 Volts is 100% full scale. The error amplifier 756 compares the average current in coil 192 to the set point voltage 307. The output signal of the error amplifier 756 increases when the current in coil 192 is less than that of the set point 307. The output signal of the error amplifier 756 is compared in comparators: 754 to the saw tooth ramp signal from the ramp generator circuit 752. The output signal from the comparator 754 is a pulse width modulated signal that drives a smart power device 762. The smart power device is a low drop high current driver that is commercially available, such as model No. VN02 from the SGS-Thomson company. Smart power device 762 is used to drive the coil 192. The sense resistor 764 is used to measure the pulsed current of the coil 192. The sensed current is then averaged by the low pass filter 760 and amplified by the gain device 758. The output of the gain device 758 is the averaged current in coil 192 that is compared to the set point 307.

Preferably, a single amplifier as shown in FIG. 20 is used to perform the function of amplifier 303, amplifier 484 (shown in FIG. 6), amplifier 608 (shown in FIG. 11) and amplifier 658 (shown in FIG. 12). Alternatively, each power amplifier 303, 484, 608 and 658 could be implemented as a separate device.

The attached PSEUDO CODE defines the implementation of the main loop for Flotation Control. It essentially follows the flow chart in FIG. 4 but provides a variation of the resume function which uses the position loop of the stubble height servo to lower the header. It also does not include a test for calibration since it is assumed this is taken care of at a higher level of control.

It is important to note that the main loop requires the PID Algorithm Pseudo Code function pressure_pid() to operate as a timed interrupt. Function or routine pressure_pid() controls the servo loop around the pressure transducer raise/lower valves and the header cylinder. The main loop called main_floatation() communicates with pressure_pid() through shared memory. Routine pressure_pid() is enabled or disabled using routines pressure_loop_enable() or pressure_loop_disable().

Execution of main_floatation() is invoked by another routine (not shown) that reads the operator control panel and senses a desired operational change such as manual, floatation, stubble height, header height etc.

```
void main_floatation()
{ /* begin main_floatation() */

/*      Upon entering this routine, it is assumed that any previously operational mode
        has been brought to an orderly termination. This control function is entered by a
        supervisory loop that senses a control change on the main control panel and
        dispatches control to the appropriate control code  such as floatation, header
        height, calibration etc. Modes are operational conditions within a control
        function.
*/ control_function = "floatation"
        mode = "standby";               /* set mode to standby until operator signals start */ while control_function = "floatation"
{  /* begin floatation control loop */

/* read operator input controls from main panel */
        read_operator_input_controls();
        if a_control_change_was_requested
        {
                control_function = requested_control_function;
                                        /* this will break out of while loop */
                immediately update display with appropriate message;
        }
        perform any other queuing of operator control functions;

if manual_raise_has_been_depressed
        {
                pressure_loop_disable(); /* immediately stop pressure servo loop */
                mode = standby;         /* set mode to standby until operator signals start */
```

```
                set appropriate display messages for subsequent display;
        }
if manual_lower_has_been_depressed
        {
        pressure_loop_disable();  /* immediately stop pressure servo loop */
        mode = standby;           /* set mode to standby until operator signals start */
        set appropriate display messages for subsequent display;
        } if mode == standby .and. resume_has_been_depressed
        {
                /* This section of code uses the stubble height control loop to lower
                the header until it makes nominal ground contact. Once this transition
                point is reached, the position servo is disabled and the pressure loop is
                enabled with the desired setpoint. The code is exited once the desired
                pressure setpoint is reached. At that time the mode is set to "active
                floatation" and control returns to the while loop.
                */ stubble_height_setpoint = header_height_wrt_machine_base;
                stubble_loop_enable();  /* enable closed loop position control of header */

/* The following while loop gets position versus time data which implicitly
                definies a velocity profile. This allows the head to return to the transition
                point (just at ground level) as smoothly as possible)
                */
                while header_height_wrt_machine_base > floatation_transition_point
                        {
                                next_position_value = next_point_from_profile_generator(profile_data);
                                while header_height_wrt_machine_base > stubble_height_setpoint
                                        {
                                        wait delay_time; /* synchronizes interupt driven
                                                position PID loop with input of the setpoints */
                                        stubble_height_setpoint = next_position_value;
                                        }
                        }
                stubble_loop_disable();  /* disable closed loop position control */
                /* at this point header is contacting or almost contacting ground /*
                pressure_setpoint = desired_floatation_value;
                pressure_loop_enable();       /* enable pressure servo loop */ while actual_pressure > pressure_setpoint
                        {
                                wait delay_time; /* waits until the correct pressure setpoint is
                                reached before proceeding, this portion is not profiled */

} mode = "active floatation";
                perform gain scheduling algorithm;
        }

/* gain schedule */
        ground_speed = compute_vehicle_ground_speed();  /* get vechicle ground speed
                                perform any filtering or averaging necessary */
```

```
/* compute lookup index from speed */
lookup_index =
            int(ground_speed/maximum_ground_speed)*max_table_entries;
    kp = table("floatation", "kp", lookup_index);      /* get PID coefficients */
    ki = table("floatation", "ki", lookup_index);      /* for use by interrupt driven */
    kd = table("floatation", "kd", lookup_index);      /* pressure_pid() routine */
/* perform diagnostics */
    diag_status = perform_diagnostics();  /* run diagnostic check routine */
    if diag_status = catastrophic_failure
        {
                save appropriate descriptive data;
                mode = catastrophic_failure;    /* change mode */
                control_function = stop;        /* this forces exits of outer loop */
        }
    elseif diag_status = soft_failure
        {
                mode = active_floatation plus soft_failure;
                save appropriate descriptive data;
                set appropriate display messages for later display;
        }
/* update display */
    update display with any queued messages from diagnostics;
    update operational display numbers (setpoint, actual pressure, etc.);

} /* end floatation control loop */

/*      Exit from the while loop indicates a control function change
        invoked by the main control panel or a catastrophic failure detected during
        the diagnostics.
*/ if mode == catastrophic_failure
        {
                display appropriate error message on control panel;
                update diagnostic failure history in EEPROM memory;
                take any other appropriate action(s);
                control = "hard_failure";  /* set control to prevent execution of any other */
                                           /* machine functions */
        }
    else
        {

/* this constitutes a valid control change from the main control panel */ pressure_loop_disable();  /* shut off pressure servo loop */
                display appropriate messages on control panel;
                take any other appropriate action;
                mode = standby;  /* set mode to standby signaling no automatic    */
                                 /*function is executing
        */
        }

} /* end main_floatation() */
```

The following PSEUDO CODE defines the implementation of the PID control algorithm for the Floatation Mode. Syntax is loosely based on the C Language. This module is intended to run at a constant sampling time. The routine is executed by a fixed interval interrupt which occurs say every 25 ms. The main routine determines if interrupts should be enabled or disabled and passes setpoint information and/or PID parameters to the floatation PID routine.

```
void pressure_pid()
{ /* beginning of pressure_pid */ read_pressure_setpoint(pressure_setpoint);    /* obtained from common memory */ read_actual_pressure(actual_pressure); /* conditionded pressure transducer value */ error = pressure_setpoint - actual_pressure;  /* error signal */ i = i_old + (error + error_old)/2.0;      /* integral term using trapezoidal rule */ d = error - error_old;              /* derrivative component */ c = (kp * error) + (ki * i) + (kd * d);  /* control signal */ i_old = i;                  /* update for next time through loop */
    error_old = error;          /* update for next time through loop */

/* the following lines implement a saturation non-linearity with deadband */
if magnitude(c) < deadband ;
    {
        c = 0;
        raise_solenoid_signal(c);   /* put zero onto both raise and lower */
        lower_solenoid_signal(c);   /* solenoid valves */
    }
if c > 0;  /* raise solenoid to be activated */
    {
        lower_solenoid_signal(zero);   /* put zero on lower solenoid */
        if c > max_da_value
            {
                raise_solenoid_signal(max_da_value);   /* put max value on solenoid */
            }
        else
            {
                raise_solenoid_signal(c);            /* put control value on solenoid */
            }
    } if c < 0;  /* lower solenoid to be activated */
    {
        raise_solenoid_signal(zero);   /* put zero on raise solenoid */
        if c < min_da_value
            {
                lower_solenoid_signal(min_da_value);   /* put min value on solenoid */
            }
        else
            {
                lower_solenoid_signal(c);            /* put control value on solenoid */
            }
    }

} /* end of pressure_pid */ void read_pressure_setpoint(setpoint)
{ /* beginning of read_pressure_setpoint */ read_pressure_setpoint(setpoint);    /* obtained from common memory */
```

```
} /* end of read_pressure_setpoint */ void read_actual_pressure(actual_pressuret)
{ /* beginning of read_actual_pressure */ read_pressure_setpoint(setpoint);    /* obtained from common memory */

} /* end of read_actual_pressure */ void pressure_loop_enable();
{ /* beginning of pressure_loop_enable */

Put PID variables into Pressure Control Loop
        /* use cylinder pressure transducer and pressure setpoint */
        Enable INTERRUPTS;
} /* end of pressure_loop_enable */ void pressure_loop_disable();
{ /* beginning of pressure_loop_disable */

Disable INTERRUPTS;
} /* end of pressure_loop_disable */
```

The following PSEUDO CODE defines the implementation of the automatic calibration system. As described the system covers the three main control applications: Floatation, Stubble Height and Header Height.

Prior to calibration, the Feeder House Position Transducer 234 is installed as described above. If Header Height mode is to be used, the left and right Field Tracking Sensors 236 and 237 are installed. The pressure transducer 232 associated with flotation is installed and available for use.

A logical variable: HEADER_HEIGHT indicates the absence or presence of the field tracker sensors 236 and 237 and controls the execution of appropriate code in the auto calibration routine.

Calibration may be performed whenever the operator desires to do so, typically in the event of a header change or if a major obstruction has potentially bent the field tracking sensors 236 and 237. Calibration should also be performed after any maintenance or repair that can effect any of the closed loop systems.

The operator invokes auto_cal by means of controls on the control panel 218, either by a dedicated switch, or via a menu entry. The system asks the operator to verify that the header is installed and that he wishes to perform the calibration routine. Upon verification, the auto_cal routine is executed.

```
void auto_cal()
{ /* beginning of auto_cal routine */
        start_position = header_height_wrt_machine_base; /*current value of feeder house
                                                           position transducer */
        stubble_height_setpoint = start_position; /* keeps header from moving */
        stubble_loop_enable(); /* enable closed loop position control of stubble height */

/* determine upper_limit_of_header_motion */
        while pressure_transducer < system relief pressure
            {
                stubble_height_setpoint =+ position_increment;
                wait response_time;
            }
        upper_limit_of_header_motion = header_height_wrt_machine_base;

/* determine nominal_feeder_position_at_ground_level */
        stubble_height_setpoint = start_position; /* command servo to original position */
        while header_height_wrt_machine_base > start_position;
```

```
        {
            wait response_time;
        }
        pressure_setpoint = current pressure transducer value;
        stubble_loop_disable();  /* disable position control loop */
        pressure_loop_enable(); /* enable closed loop pressure control of cylinders */ while header_height_wrt_machine_base is not a constant value
        {
            pressure_setpoint =- pressure_increment;
            wait response_time;
        }
        nominal_feeder_position_at_ground_level =
                header_height_wrt_machine_base ;

/* determine nominal_weight_feederhouse_and_header */
        stubble_height_setpoint = nominal_feeder_position_at_ground_level + ten_inch_offset;
        pressure_loop_disable(); /* disable pressure control loop */
        stubble_loop_enable(); /* enable closed loop position control of stubble height */ while header_height_wrt_machine_base not equal stubble_height_setpoint ;
        {
            wait response_time;
        }
        nominal_weight_feederhouse_and_header = measured_cylinder_pressure;

/* compute transition points of raise/lower valve and mechanism nonlinearity as shown
    in Figure 7 */ pressure_setpoint = measured_cylinder_pressure;

stubble_loop_disable();  /* disable position control loop */
        pressure_loop_enable()l /* enable closed loop pressure control of cylinders */ while header_height_wrt_machine_base remains a constant value
        {
            pressure_setpoint =+ pressure_raise_increment;
            wait response_time ;
        }
        raise_transition_point = measured_cylinder_pressure;

while header_height_wrt_machine_base is not a constant value
        {
            pressure_setpoint =- pressure_raise_increment;
            wait response_time ;
        }
        raise_transition_release = measured_cylinder_pressure;

stubble_height_setpoint = nominal_feeder_position_at_ground_level +
                twenty_inch_offset;

pressure_loop_disable(); /* disable pressure control loop */
        stubble_loop_enable(); /* enable closed loop position control of stubble height */ while measured_feeder_house_position < stubble_height_setpoint
        {
            wait response_time;
        }
```

```
pressure_setpoint = measured_cylinder_pressure;
stubble_loop_disable();  /* disable position control loop */
pressure_loop_enable()I  /* enable closed loop pressure control of cylinders */ while header_height_wrt_machine_base remains a constant value
    {
        pressure_setpoint =- pressure_lower_increment;
        wait response_time ;
    }
lower_transition_point = measured_cylinder_pressure;

while header_height_wrt_machine_base is not a constant value
    {
        pressure_setpoint =+ pressure_lower_increment;
        wait response_time ;
    } lower_transition_release = measured_cylinder_pressure;

stubble_height_setpoint = header_height_wrt_machine_base;  /*current value of feeder
                                                             position transducer*/
pressure_loop_disable();  /* disable pressure control loop */
stubble_loop_enable();  /* enable closed loop position control of stubble height */

If HEADER_HEIGHT
{
/* determine nominal maximum value of left & right field tracker sensors */
    stubble_height_setpoint = nominal_feeder_position_at_ground_level +
                                twenty_inch_offset;

while measured_feeder_house_position < stubble_height_setpoint
        {
            wait response_time;
        } left_nominal_max_height = left_sensor_value;
    right_nominal_max_height = right_sensor_value;

/* determine point of first contact of left and right field tracker sensors and save the
corresponding values of the header height with respect to the machine base */ stubble_height_setpoint = nominal_feeder_position_at_ground_level + two_inch_offset;
    left_maximum_working_height = 0;  /* set known value for one shot */
    right_maximum_working_height = 0;  /* set known value for one shot */ while measured_feeder_house_position < stubble_height_setpoint
        {
            if left_sensor_value < left_nominal_max_height &
                        left_maximum_working_height == 0
                { /* update only one time */
                    left_maximum_working_height = left_sensor_value;
                    lmwh_feeder_house_transducer = header_height_wrt_machine_base;
                }
            if right_sensor_value < right_nominal_max_height &
                        right_maximum_working_height == 0
                { /* update only one time */
                    right_maximum_working_height = right_sensor_value;
                    rmwh_feeder_house_transducer = header_height_wrt_machine_base;
                }
```

```
        }
/* make sure both sensors have provoded maximum working height values*/
        if right_maximum_working_height == 0;
        {
                notify operator right field tracker sensor failed
                set calibaration_Header_Height_Right = FALSE;
        }
        if left_maximum_working_height == 0;
        {
                notify operator left field tracker sensor failed
                set calibaration_Header_Height_LEFT = FALSE;
        }

/* determine the minimum value for the left and right field tracker sensors and save the
corresponding values of the header height with respect to the machine base */ stubble_height_setpoint = nominal_feeder_position_at_ground_level - two_inch_offset;
        left_minimum_working_height = 0;  /* set known value for one shot */
        right_minimum_working_height = 0;  /* set known value for one shot */ while measured_feeder_house_position < stubble_height_setpoint
        {
                if left_sensor_value remains constant &
                        left_minimum_working_height == 0
                { left_minimum_working_height = left_sensor_value;
                        l_min_wh_feeder_house_transducer =
                                        header_height_wrt_machine_base;
                }
                if right_sensor_value remains constant &
                        right_minimum_working_height == 0

{
                        right_maximum_working_height = right_sensor_value;
                        r_min_wh_feeder_house_transducer =
                                        header_height_wrt_machine_base;
                }
        }

/* make sure both sensors have provoded minimum working height values*/
        if right_minimum_working_height == 0;
        {
                notify operator right field tracker sensor failed
                set calibaration_Header_Height_Right = FALSE;
        }
        if left_minimum_working_height == 0;
        {
                notify operator left field tracker sensor failed
                set calibaration_Header_Height_LEFT = FALSE;
        }

} /* end of conditional HEADER_HEIGHT calibration routine */

} /* end of auto_cal routine */
```

```
void stubble_loop_enable();
{ /* beginning of stubble_loop_enable */

Put PID variables into Vertical Positioning Loop
    /* use feeder house position transducer and stubble height setpoint */
    Enable INTERRUPTS;
} /* end of stubble_loop_enable */ void stubble_loop_disable();
{ /* beginning of stubble_loop_disable */

Disable INTERRUPTS;

} /* end of stubble_loop_disable */ void pressure_loop_enable();
{ /* beginning of pressure_loop_enable */

Put PID variables into Pressure Control Loop
    /* use cylinder pressure transducer and pressure setpoint */
    Enable INTERRUPTS;
} /* end of pressure_loop_enable */ void pressure_loop_disable();
{ /* beginning of pressure_loop_disable */

Disable INTERRUPTS;
} /* end of pressure_loop_disable */
```

It is understood by one skilled in the art that many variations of the embodiments described herein are contemplated. While the invention has been described in terms of exemplary embodiments, it is contemplated that it may be practiced as outlined above with modifications within the spirit and scope of the appended claims.

What is claimed:

1. A control system for an agricultural harvester having a cut crop receiving header coupled to a hydraulic cylinder, the header applying a force against the ground which is adjusted by applying fluid under pressure to the cylinder, comprising:

first proportional control valve means fluidly coupled to the cylinder responsive to a first input signal for increasing fluid pressure in the cylinder to a setpoint value, when the pressure in the cylinder is less than the setpoint value;

second proportional control valve means fluidly coupled to the cylinder responsive to a second input signal for reducing fluid pressure in the cylinder to the setpoint pressure value when the pressure in the cylinder is greater than the setpoint value;

means for producing an electrical pressure signal that represents fluid pressure in the cylinder; and means for determining the first and second input signals as a function of the difference between the pressure signal and the setpoint value, for maintaining pressure in the cylinder substantially at the setpoint value, thereby maintaining the force applied against the ground by the header substantially constant, the determining means comprising:

(a) means for generating respective first, second and third signal components that are proportional to the difference between the pressure signal and the setpoint value, the integral of the difference with respect to time and the derivative of the difference with respect to time, and (b) means for combining the first, second and third signal components to form the first and second input signals.

2. A control system in accordance with claim 1, wherein the harvester has a frame, further comprising:

pivot means for allowing the header to pivot freely to an angle that is substantially equal to an average angle of the ground beneath the header relative to the frame of the harvester.

3. A control system in accordance with claim 1, wherein the determining means include:

gain means responsive to the signal component generating means for applying respective first, second and third gains to modify the respective first, second and third signal components, and for providing the modified first, second and third signal components to the combining means; and means coupled to the gain means for varying the first, second and third gains when a driving condition of the agricultural harvester changes.

4. A control system in accordance with claim 3, wherein the gain means include means for varying the first, second and third gains when the speed of the agricultural harvester changes 5. A control system in accordance with claim 1, further comprising:

means for interrupting transmission of the first and second input signals to the first and second control valve means, respectively;

means for transmitting a raise signal to cause the first valve means to apply sufficient fluid to the cylinder to raise the header to a predetermined position;

means for transmitting a lower signal to cause the second valve means to release sufficient fluid from the cylinder to lower the header to the ground;

means for resuming transmission of the first and second input signals.

6. A control system for an agricultural harvester having a frame and a cut crop receiving header, the header having a position which is adjusted by applying fluid under pressure to a hydraulic cylinder, comprising:

first proportional control valve means fluidly coupled to the cylinder responsive to a first input signal for applying fluid to the cylinder when the header is below a setpoint position, until the header reaches the setpoint position;

second proportional control valve means fluidly coupled to the cylinder responsive to a second input signal for receiving fluid from the cylinder when the header is above the setpoint position, until the header reaches the setpoint position;

means for producing an electrical position signal that represents the position of the header;

means for determining the first and second input signals as a function of the difference between the value of the position signal and the value of the setpoint position, for maintaining the position of the header substantially at the setpoint value, thereby maintaining the position of the header substantially constant, the determining means comprising:

(a) means for generating respective first, second and third signal components that are proportional to the difference between the position signal and the setpoint value, the integral of the difference with respect to time and the derivative of the difference with respect to time, and (b) means for combining the first, second and third signal components to form the first and second input signals.

7. A control system in accordance with claim 6, wherein the determining means include:

gain means responsive to the signal component generating means for applying respective first, second and third gains to modify the respective first, second and third signal components, and for providing the modified first, second and third signal components to the combining means; and means coupled to the gain means for varying the first, second and third gains when a driving condition of the agricultural harvester changes.

8. A control system in accordance with claim 6, further comprising:

means for interrupting transmission of the first and second input signals to the first and second valve means, respectively;

raising means for generating and transmitting a raise signal to cause the first valve means to apply sufficient fluid to the cylinder to raise the header to a raised position;

lowering means for generating and transmitting a lower signal to cause the second valve means to release sufficient fluid from the cylinder to lower the header to a predetermined transition position;

means for resuming transmission of the first and second input signals.

9. A control system in accordance with claim 8, wherein the lowering means include:

means for storing velocity profile data including respective velocity and time coordinates; and means for adjusting the lower signal, so that the header is lowered at a velocity substantially equal to each respective velocity coordinate at respective times that are related to the time coordinates.

10. A control system in accordance with claim 8, further comprising a plurality of ground sensors having a maximum working height, wherein the predetermined transition position is the maximum working height of the ground sensors.

11. A control system for an agricultural harvester having a frame, a feeder house pivotally mounted on the frame and a cut crop receiving header, the header having a position which is adjusted by applying fluid under pressure to a hydraulic cylinder, comprising:

first proportional control valve means fluidly coupled to the cylinder responsive to a first input signal for applying fluid to the cylinder when the header is below a setpoint position, until the header reaches the setpoint position;

second proportional control valve means fluidly coupled to the cylinder responsive to a second input signal for receiving fluid from the cylinder when the header is above the setpoint position, until the header reaches the setpoint position;

means for producing an electrical position signal that represents the position of the header;

means for determining the first and second input signals as a function of the difference between the value of the position signal and the value of the setpoint position, for maintaining the position of the header substantially at the setpoint value, thereby maintaining the position of the header substantially constant;

a plurality of ground sensors attached to the header, for measuring the position of the header, the ground sensors having a maximum working height; and means for measuring an angle between the feeder house and the frame and for computing the position of the header from the angle when the header is above the maximum working height.

12. A control system for an agricultural harvester having a frame and a feeder house pivotally mounted oil the frame and a cut crop receiving header coupled to the feeder house, the header having a plurality of ground sensors, comprising:

means for measuring an angle between the feeder house and the frame and for computing the position of the header from the angle;

means for monitoring a plurality of feedback signals from the ground sensors while lowering the header from a raised position to the ground;

means for identifying the highest position at which the respective feedback signal from each respective ground sensor changes in response to further lowering of the header as the maximum working height of that ground sensor;

means for identifying the highest position below the maximum working height at which the respective feedback signal from each respective ground sensor does not change in response to further lowering of the header as the minimum working height of that ground sensor;

means for correlating the respective values of the feedback signal from each sensor at its respective maximum and minimum working heights with respective measurements of the positions determined by the angle measuring means at the maximum and minimum working heights, thereby calibrating each of the ground sensors.

* * * * *

UNITED STATES PATENT AND TRADEMARK OFFICE
CERTIFICATE OF CORRECTION

PATENT NO. : 5,359,836　　　　　　　　　Page 1 of 2
DATED : November 1, 1994
INVENTOR(S) : Zeuner, et. al.

It is certified that error appears in the above-indentified patent and that said Letters Patent is hereby corrected as shown below:

Title page, item [56]
　　should read as follows:　　References Cited

U.S. PATENT DOCUMENTS

| | | | |
|---|---|---|---|
| 3,908,345 | | Oni et al. | 56/10.9X |
| 3,980,002 | 9/1976 | Jarman et al. | 91/461 |
| 4,126,293 | 11/1978 | Zeuner et al. | 251/30 |
| 4,136,508 | 1/1979 | Coleman et al. | 56/10.2 E |
| 4,204,383 | 5/1980 | Milliken, Jr. | 56/10.2 |
| 4,211,057 | 7/1980 | Dougherty et al. | 56/10.2 |
| 4,227,363 | 10/1980 | Kerber et al. | 56/10.2 |
| 4,332,126 | 6/1982 | Van Auwelaer et al. | 56/10.2 |
| 4,401,009 | 8/1983 | Zeuner et al. | 91/28 |
| 4,541,229 | 9/1985 | Elijah | 56/10.2 |
| 4,573,308 | 3/1986 | Ehrecke et al. | 56/14.4 |
| 4,594,840 | 6/1986 | D'Almeida et al. | 56/11.2 |
| 4,598,718 | 7/1986 | Glaubitz et al. | 56/209 |
| 4,612,757 | 9/1986 | Halls et al. | 56/10.2 |
| 4,622,803 | 11/1986 | Lech | 56/10.2E |
| 4,641,490 | 2/1987 | Wynn et al. | 56/10.2 |
| 4,651,118 | 3/1987 | Zeuner et al. | 335/258 |
| 4,663,921 | 5/1987 | Hagstrom et al. | 56/14.6 |
| 4,736,753 | 4/1988 | Glaubitz et al. | 56/209 |
| 4,776,153 | 10/1988 | DePauw et al. | 56/10.2 |
| 4,942,724 | 7/1990 | Diekhans et al. | 56/10.4 |

UNITED STATES PATENT AND TRADEMARK OFFICE
CERTIFICATE OF CORRECTION

PATENT NO. : 5,359,836
DATED : November 1, 1994
INVENTOR(S) : Zeuner, et. al.

It is certified that error appears in the above-indentified patent and that said Letters Patent is hereby corrected as shown below:

Col. 58, line 51, "oil" should read --on--.

Signed and Sealed this

Fourteenth Day of February, 1995

*Attest:*

BRUCE LEHMAN

*Attesting Officer*     Commissioner of Patents and Trademarks